United States Patent
Sakaguchi et al.

(10) Patent No.: US 11,610,438 B2
(45) Date of Patent: Mar. 21, 2023

(54) INFORMATION PROCESSING APPARATUS, INFORMATION PROCESSING METHOD, AND STORAGE MEDIUM

(71) Applicant: NEC Corporation, Tokyo (JP)

(72) Inventors: Osamu Sakaguchi, Tokyo (JP); Tomohiro Hatae, Tokyo (JP); Cheng Zhang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/917,315

(22) Filed: Jun. 30, 2020

(65) Prior Publication Data

US 2020/0334480 A1    Oct. 22, 2020

Related U.S. Application Data

(63) Continuation of application No. 16/360,791, filed on Mar. 21, 2019, now Pat. No. 10,963,716.

(30) Foreign Application Priority Data

Jul. 31, 2018  (WO) .................. PCT/JP2018/028764

(51) Int. Cl.
*G06V 40/50*  (2022.01)
*G06Q 10/02*  (2012.01)
(Continued)

(52) U.S. Cl.
CPC ........... *G06V 40/50* (2022.01); *G06K 9/6201* (2013.01); *G06Q 10/02* (2013.01); *G06V 40/172* (2022.01)

(58) Field of Classification Search
CPC ........... G06K 9/00926; G06K 9/00288; G06K 9/6201; G06Q 10/02; G06Q 50/265;
(Continued)

(56) References Cited

U.S. PATENT DOCUMENTS 9,245,175 B1 *  1/2016  Vladimir .................. G07C 9/37
9,679,254 B1    6/2017  Mawji
(Continued)

FOREIGN PATENT DOCUMENTS

EP       3113105 A1    1/2017
JP    2003-296766 A   10/2003
(Continued)

OTHER PUBLICATIONS

International Search Report in corresponding PCT application dated Jul. 31, 2018.
(Continued)

*Primary Examiner* — Jerome Grant, II
(74) *Attorney, Agent, or Firm* — Sughrue Mion, PLLC

(57) ABSTRACT

An information processing apparatus includes: an information management unit that registers boarding information on users regarding boarding and biometrics information on the users acquired by a check-in procedure of the users in association with each other; and a comparison unit that compares target biometrics information, which is biometrics information acquired in a procedure up to the boarding for one of the users, with registered biometrics information, which is the biometrics information registered by the information management unit, and the comparison unit selects the registered biometrics information to be compared with the target biometrics information based on status regarding the procedure up to the boarding of the user corresponding to the registered biometrics information.

15 Claims, 30 Drawing Sheets

(51) Int. Cl.
  *G06K 9/62* (2022.01)
  *G06V 40/16* (2022.01)
(58) Field of Classification Search
  CPC ...... G06Q 10/0635; G06Q 50/30; G07C 9/28;
                       G07C 9/37; G07C 1/00
  USPC .......................................................... 382/115
  See application file for complete search history.

(56) References Cited

U.S. PATENT DOCUMENTS

| | | | |
|---|---|---|---|
| 9,965,865 B1 | 5/2018 | Agrawal | |
| 2002/0100802 A1* | 8/2002 | Sehr ..................... | G06Q 20/045 235/384 |
| 2002/0198731 A1 | 12/2002 | Barnes | |
| 2003/0149343 A1 | 8/2003 | Siegel | |
| 2004/0064415 A1* | 4/2004 | Abdallah ............... | G07B 15/00 705/50 |
| 2004/0169076 A1 | 9/2004 | Beale | |
| 2004/0190757 A1 | 9/2004 | Murphy | |
| 2005/0108060 A1 | 5/2005 | Sasano | |
| 2008/0266054 A1 | 10/2008 | Crank | |
| 2012/0200390 A1 | 8/2012 | Saravanan | |
| 2013/0305059 A1 | 11/2013 | Gormley | |
| 2016/0094950 A1 | 3/2016 | Millman | |
| 2016/0307042 A1* | 10/2016 | Martin ................ | G06F 16/5846 |
| 2017/0070501 A1 | 3/2017 | Saito et al. | |
| 2017/0076082 A1 | 3/2017 | Arber | |
| 2017/0372541 A1 | 12/2017 | Attar | |
| 2018/0322483 A1 | 11/2018 | Castro Maillo | |
| 2019/0035042 A1 | 1/2019 | Attar | |
| 2019/0147558 A1 | 5/2019 | Cheikh | |
| 2019/0190718 A1 | 6/2019 | Wease | |

FOREIGN PATENT DOCUMENTS

| | | | | |
|---|---|---|---|---|
| JP | 2005-110012 A | 4/2005 | | |
| JP | 2005-149181 A | 6/2005 | | |
| JP | 4528262 B2 | 8/2010 | | |
| JP | 5851651 * | 2/2016 | ............... | H04N 7/18 |
| WO | WO-03053783 A2 * | 7/2003 | ......... | G07C 9/00087 |
| WO | 2005/055151 A1 | 6/2005 | | |
| WO | WO 2005/055151 A1 | 6/2005 | | |
| WO | 2015/128961 A1 | 9/2015 | | |
| WO | WO 2015/136938 A1 | 9/2015 | | |
| WO | WO 2018/110012 A1 | 6/2018 | | |

OTHER PUBLICATIONS

Hirofumi Konishi, Human-Friendly Technologies, OKI Technical Review, vol. 71, No. 3, Jul. 1, 2004, p. 74-77, ISSN: 1346-5961.
Extended European Search Report for EP Application No. EP18928595.0 dated Feb. 15, 2022.
Japanese Office Action for JP Application No. JP2020-533961 dated Mar. 29, 2022 with English Translation.

* cited by examiner

| User ID | User information ||||||||| Status |||||
|---|---|---|---|---|---|---|---|---|---|---|---|---|---|---|
| | Name | Nationality | Face image | Flight number | Origin | Destination | Departure time | Boarding gate | Check-in procedure | Baggage deposit procedure | Security inspection procedure | Immigration procedure | Presence or passage in front of signage terminal | Boarding on airplane |
| 10101 | AAA aaa | JPN | | AB101 | NRT | LHR | 6:00 | 50 | Completed | Completed | Completed | Completed | Unfinished | Unfinished |
| 10102 | BBB bbb | JPN | | AB102 | NRT | CDG | 6:10 | 60 | Completed | Completed | Completed | Completed | Completed | Completed |
| 10103 | CCC ccc | JPN | | AB103 | NRT | FCO | 6:20 | 40 | Completed | Completed | Completed | Completed | Completed | Unfinished |
| 10104 | DDD ddd | JPN | | AB104 | NRT | MXP | 6:30 | 50 | Completed | Completed | Completed | Completed | Unfinished | Unfinished |
| 10105 | EEE eee | JPN | | AB105 | NRT | FRA | 6:40 | 60 | Completed | Completed | Completed | Completed | Completed | Unfinished |
| 10106 | FFF fff | JPN | | AB106 | NRT | MUC | 6:50 | 40 | Completed | Completed | Completed | Unfinished | Unfinished | Unfinished |
| 10107 | GGG ggg | JPN | | AB107 | NRT | DUS | 7:00 | 50 | Completed | Completed | Completed | Unfinished | Unfinished | Unfinished |
| 10108 | HHH hhh | JPN | | AB108 | NRT | AMS | 7:10 | 60 | Completed | Completed | Unfinished | Unfinished | Unfinished | Unfinished |
| 10109 | III iii | JPN | | AB109 | NRT | ZHR | 7:20 | 40 | Completed | Unfinished | Completed | Unfinished | Unfinished | Unfinished |
| 10110 | JJJ jjj | JPN | | AB110 | NRT | VIE | 7:30 | 50 | Completed | Completed | Unfinished | Unfinished | Unfinished | Unfinished |
| 10111 | KKK kkk | JPN | | AB111 | NRT | WAW | 7:40 | 60 | Completed | Unfinished | Unfinished | Unfinished | Unfinished | Unfinished |
| 10112 | LLL lll | JPN | | AB112 | NRT | SVO | 7:50 | 40 | Completed | Unfinished | Unfinished | Unfinished | Unfinished | Unfinished |

FIG. 17

| User ID | User information | | | | | | | | | Status | | | | |
|---|---|---|---|---|---|---|---|---|---|---|---|---|---|---|
| | Name | Nationality | Face image | Flight number | Origin | Destination | Departure time | Boarding gate | Check-in procedure | Baggage deposit procedure | Security inspection procedure | Immigration procedure | Presence or passage in front of signage terminal | Boarding on airplane |
| 10109 | III iii | JPN | | AB109 | NRT | ZHR | 7:20 | 40 | Completed | Unfinished | Unfinished | Unfinished | Unfinished | Unfinished |
| 10111 | KKK kkk | JPN | | AB111 | NRT | WAW | 7:40 | 60 | Completed | Unfinished | Unfinished | Unfinished | Unfinished | Unfinished |
| 10112 | LLL lll | JPN | | AB112 | NRT | SVO | 7:50 | 40 | Completed | Unfinished | Unfinished | Unfinished | Unfinished | Unfinished |
| ... | | | | ... | | | | | Completed | Unfinished | Unfinished | Unfinished | Unfinished | Unfinished |
| ... | | | | ... | | | | | Completed | Unfinished | Unfinished | Unfinished | Unfinished | Unfinished |
| ... | | | | ... | | | | | Completed | Unfinished | Unfinished | Unfinished | Unfinished | Unfinished |

| | User information | | | | | | | | Status | | | | | |
|---|---|---|---|---|---|---|---|---|---|---|---|---|---|---|
| User ID | Name | Nationality | Face image | Flight number | Origin | Destination | Departure time | Boarding gate | Check-in procedure | Baggage deposit procedure | Security inspection procedure | Immigration procedure | Presence or passage in front of signage terminal | Boarding on airplane |
| 10107 | GGG ggg | JPN | | AB107 | NRT | DUS | 7:00 | 50 | Completed | Completed | Unfinished | Unfinished | Unfinished | Unfinished |
| 10110 | JJJ jjj | JPN | | AB110 | NRT | VIE | 7:30 | 50 | Completed | Completed | Unfinished | Unfinished | Unfinished | Unfinished |
| ... | | | | | | | | | Completed | Completed | Unfinished | Unfinished | Unfinished | Unfinished |
| ... | | | | | | | | | Completed | Completed | Unfinished | Unfinished | Unfinished | Unfinished |
| ... | | | | | | | | | Completed | Completed | Unfinished | Unfinished | Unfinished | Unfinished |

| User ID | User information | | | | | | | | Status | | | | | |
|---|---|---|---|---|---|---|---|---|---|---|---|---|---|---|
| | Name | Nationality | Face image | Flight number | Origin | Destination | Departure time | Boarding gate | Check-in procedure | Baggage deposit procedure | Security inspection procedure | Immigration procedure | Presence or passage in front of signage terminal | Boarding on airplane |
| 10106 | FFF fff | JPN | | AB106 | NRT | MUC | 6:50 | 40 | Completed | Completed | Completed | Unfinished | Unfinished | Unfinished |
| 10108 | HHH hhh | JPN | | AB108 | NRT | AMS | 7:10 | 60 | Completed | Completed | Completed | Unfinished | Unfinished | Unfinished |
| ... | | | | | | | | | Completed | Completed | Completed | Unfinished | Unfinished | Unfinished |
| ... | | | | | | | | | Completed | Completed | Completed | Unfinished | Unfinished | Unfinished |
| ... | | | | | | | | | Completed | Completed | Completed | Unfinished | Unfinished | Unfinished |

| User ID | User information | | | | | | | | Status | | | | | |
|---|---|---|---|---|---|---|---|---|---|---|---|---|---|---|
| | Name | Nationality | Face image | Flight number | Origin | Destination | Departure time | Boarding gate | Check-in procedure | Baggage deposit procedure | Security inspection procedure | Immigration procedure | Presence or passage in front of signage terminal | Boarding on airplane |
| 10101 | AAA aaa | JPN | | AB101 | NRT | LHR | 6:00 | 50 | Completed | Completed | Completed | Completed | Unfinished | Unfinished |
| 10104 | DDD ddd | JPN | | AB104 | NRT | MXP | 6:30 | 50 | Completed | Completed | Completed | Completed | Unfinished | Unfinished |
| ... | | | | | | | | | Completed | Completed | Completed | Completed | Unfinished | Unfinished |
| ... | | | | | | | | | Completed | Completed | Completed | Completed | Unfinished | Unfinished |
| ... | | | | | | | | | Completed | Completed | Completed | Completed | | |

| User information | | | | | | | | | Status | | | | | |
|---|---|---|---|---|---|---|---|---|---|---|---|---|---|---|
| User ID | Name | Nationality | Face image | Flight number | Origin | Destination | Departure time | Boarding gate | Check-in procedure | Baggage deposit procedure | Security inspection procedure | Immigration procedure | Presence or passage in front of signage terminal | Boarding on airplane |
| 10103 | CCC ccc | JPN |  | AB103 | NRT | FCO | 6:20 | 40 | Completed | Completed | Completed | Completed | Completed | Unfinished |
| 10105 | EEE eee | JPN |  | AB105 | NRT | FRA | 6:40 | 60 | Completed | Completed | Completed | Completed | Completed | Unfinished |
| ... | | | | | | | | | Completed | Completed | Completed | Completed | Completed | Unfinished |
| ... | | | | | | | | | Completed | Completed | Completed | Completed | Completed | Unfinished |
| ... | | | | | | | | | Completed | Completed | Completed | Completed | Completed | Unfinished |

FIG. 22

| User ID | Boarding time | Deadline time | | | | |
|---|---|---|---|---|---|---|
| | | Baggage deposit procedure | Security inspection procedure | Immigration procedure | Presence or passage in front of signage terminal | Boarding on airplane |
| 10101 | 5:50 | 4:50 | 5:20 | 5:30 | 5:35 | 5:40 |
| 10102 | 6:00 | 5:00 | 5:30 | 5:40 | 5:45 | 5:50 |
| 10103 | 6:10 | 5:10 | 5:40 | 5:50 | 5:55 | 6:00 |
| 10104 | 6:20 | 5:20 | 5:50 | 6:00 | 6:05 | 6:10 |
| 10105 | 6:30 | 5:30 | 6:00 | 6:10 | 6:15 | 6:20 |
| 10106 | 6:40 | 5:40 | 6:10 | 6:20 | 6:25 | 6:30 |
| 10107 | 6:50 | 5:50 | 6:20 | 6:30 | 6:35 | 6:40 |
| 10108 | 7:00 | 6:00 | 6:30 | 6:40 | 6:45 | 6:50 |
| 10109 | 7:10 | 6:10 | 6:40 | 6:50 | 6:55 | 7:00 |
| 10110 | 7:20 | 6:20 | 6:50 | 7:00 | 7:05 | 7:10 |
| 10111 | 7:30 | 6:30 | 7:00 | 7:10 | 7:15 | 7:20 |
| 10112 | 7:40 | 6:40 | 7:10 | 7:20 | 7:25 | 7:30 |
| ⋮ | | | | | | |

# INFORMATION PROCESSING APPARATUS, INFORMATION PROCESSING METHOD, AND STORAGE MEDIUM

CROSS-REFERENCE TO RELATED PATENT APPLICATIONS

This application is a continuation of U.S. patent application Ser. No. 16/360,791, filed Mar. 21, 2019, which claims the benefit of priority of International Application No. PCT/JP2018/028764, filed on Jul. 31, 2018. The entire contents of the above-referenced applications are expressly incorporated herein by reference.

INCORPORATION BY REFERENCE

This application is based upon and claims the benefit of priority from International Application No. PCT/JP2018/028764, filed on Jul. 31, 2018, the disclosure of which is incorporated herein in its entirety by reference.

TECHNICAL FIELD

The present invention relates to an information processing apparatus, an information processing method, and a storage medium.

BACKGROUND ART

International Publication No. WO 2005/055151 discloses that traceability check of passengers is performed by an identity authentication information registration unit, a behavior track management unit, and a network-camera monitor unit provided in an airport server and a network camera installed in an airport. In the traceability check disclosed in International Publication No. WO 2005/055151, an image of a passenger captured by the network camera located at a certain place within an airport is compared to an image including a face image of a passenger stored as identity authentication information. Furthermore, behavior of a passenger is tracked and managed by using position information on an installation location of the network camera and a timestamp of a captured image.

Further, International Publication No. WO 2015/136938 discloses an information processing method that, when passengers are exchanged in the middle of a path on which passengers move, detects the exchange of the passengers. The information processing method disclosed in International Publication No. WO 2005/055151 performs a first authentication process that authenticates the passenger by using first biometrics information read from a medium carried by a passenger passing through a first position and second biometrics information acquired from an image obtained by capturing the passenger passing through the first position. Further, when authentication of the passenger by the first authentication process is successful, third biometrics information based on the first biometrics information used in the first authentication process is stored in a storage unit.

Furthermore, a second authentication process that authenticates the passenger is performed by using forth biometrics information, which is acquired from an image obtained by capturing the passenger passing through a second position on the downstream side of the first position in a direction in which the passenger moves, and the third biometrics information.

SUMMARY

In the technologies disclosed in International Publication No. WO 2005/055151 and International Publication No. WO 2015/136938, an image captured by a network camera installed within an airport or an image obtained by capturing a passenger is used for comparison. Thus, in the technologies disclosed in International Publication No. WO 2005/055151 and International Publication No. WO 2015/136938, the number of populations used for comparison of biometrics information is increased and this may result in a reduction of accuracy in comparison of biometrics information.

In view of the problem described above, the example object of the present invention is to provide an information processing apparatus, an information processing method, and a storage medium that can improve accuracy in comparison of biometrics information.

According to one example aspect of the present invention, provided is an information processing apparatus including: an information management unit that registers boarding information on users regarding boarding and biometrics information on the users acquired by a check-in procedure of the users in association with each other; and a comparison unit that compares target biometrics information, which is biometrics information acquired in a procedure up to the boarding for one of the users, with registered biometrics information, which is the biometrics information registered by the information management unit, and the comparison unit selects the registered biometrics information to be compared with the target biometrics information based on status regarding the procedure up to the boarding of the user corresponding to the registered biometrics information.

According to another example aspect of the present invention, provided is an information processing apparatus including: an information management unit that registers boarding information on users regarding boarding and biometrics information acquired by a check-in procedure of the users; a transmission unit that transmits comparison information obtained by comparing biometrics information received from an apparatus that performs a procedure of the user up to the boarding with biometrics information in which status regarding the procedure is an unfinished state to the apparatus; and a status management unit that, in response to receiving status information indicating a certain procedure is completed from the apparatus, updates the status regarding the certain procedure.

According to yet another example aspect of the present invention, provided is an information processing method including: registering boarding information on users regarding boarding and biometrics information on the users acquired by a check-in procedure of the users in association with each other; comparing target biometrics information, which is biometrics information acquired in a procedure up to the boarding for one of the users, with the registered biometrics information; and selecting the registered biometrics information to be compared with the target biometrics information based on status regarding the procedure up to the boarding of the user corresponding to the registered biometrics information.

According to yet another example aspect of the present invention, provided is a non-transitory storage medium storing a program that causes a computer to perform: registering boarding information on users regarding boarding and biometrics information on the users acquired by a check-in procedure of the users in association with each other; comparing target biometrics information, which is biometrics information acquired in a procedure up to the boarding for one of the users, with the registered biometrics information; and selecting the registered biometrics information to be compared with the target biometrics information based on status regarding the procedure up to the boarding of the user corresponding to the registered biometrics information.

BRIEF DESCRIPTION OF THE DRAWINGS

FIG. 16 is a schematic diagram illustrating one example of a user information database of the management server according to the first example embodiment of the present invention.

FIG. 17 is a schematic diagram illustrating one example of a first comparison information database of the management server according to the first example embodiment of the present invention.

FIG. 18 is a schematic diagram illustrating one example of a second comparison information database of the management server according to the first example embodiment of the present invention.

FIG. 19 is a schematic diagram illustrating one example of a third comparison information database of the management server according to the first example embodiment of the present invention.

FIG. 20 is a schematic diagram illustrating one example of a fourth comparison information database of the management server according to the first example embodiment of the present invention.

FIG. 21 is a schematic diagram illustrating one example of a fifth comparison information database of the management server according to the first example embodiment of the present invention.

FIG. 22 is a schematic diagram illustrating an example of deadline time for each procedure set by the management server according to the first example embodiment of the present invention.

EXAMPLE EMBODIMENT

First Example Embodiment

An information processing system, an information processing apparatus, and an information processing method according to a first example embodiment of the present invention will be described by using FIG. 1 to FIG. 25C.

Figure 1:
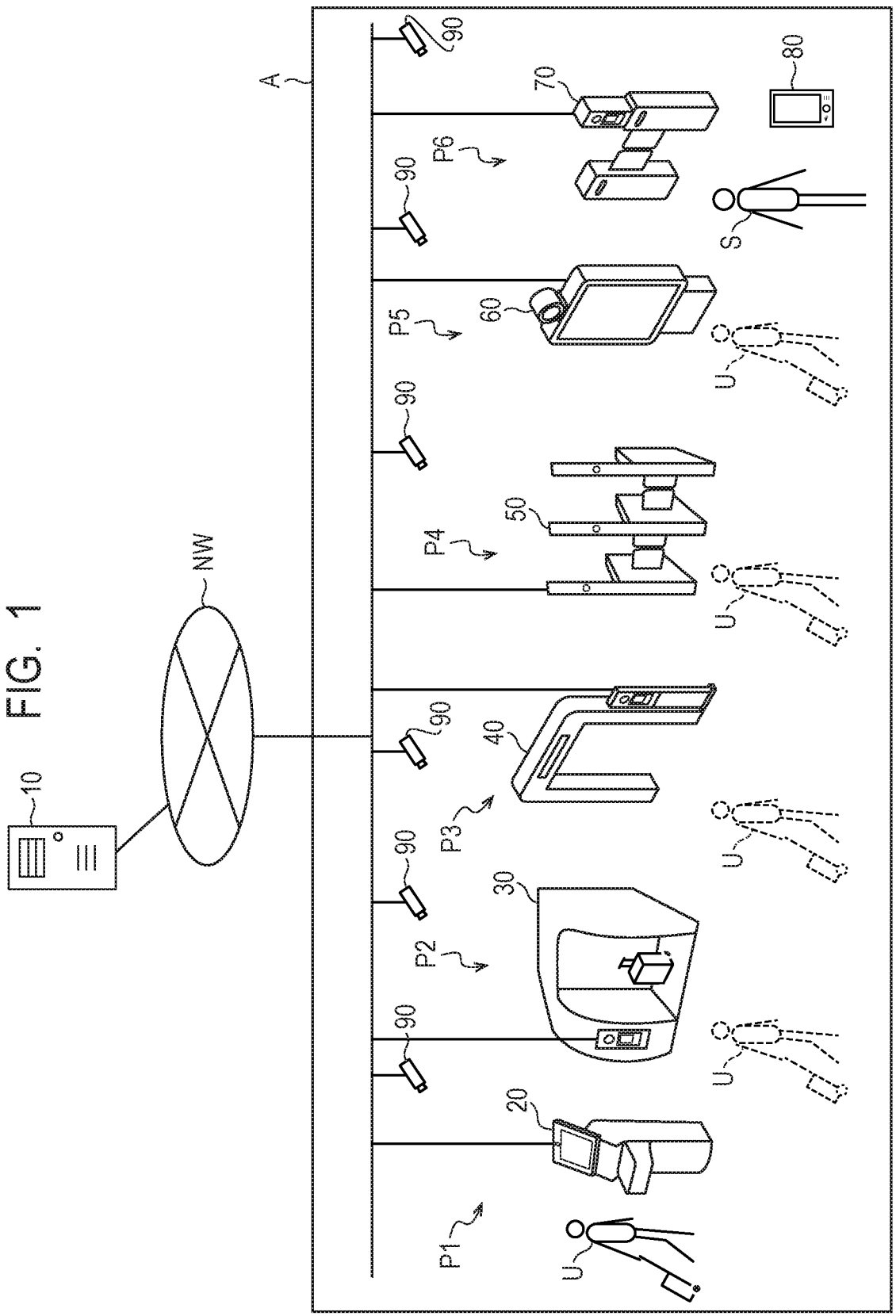
FIG. 1 is a schematic diagram illustrating the entire configuration of an information processing system according to a first example embodiment of the present invention.

First, the configuration of the information processing system according to the present example embodiment will be described by using FIG. 1. FIG. 1 is a schematic diagram illustrating the entire configuration of the information processing system according to the present example embodiment.

As illustrated in FIG. 1, the information processing system 1 according to the present example embodiment includes a management server 10, a check-in terminal 20, an automatic baggage deposit machine 30, a security inspection apparatus 40, an automated gate apparatus 50, a signage terminal 60, a boarding gate apparatus 70, and an operation terminal 80. The information processing system 1 according to the present example embodiment is, for example, a tracking system that recognizes and manages the status within an airport A of a user U scheduled to board an airplane at the airport A and tracks the user U.

Note that the information processing system 1 may recognize and manage the status of a user within a facility who is scheduled to board a vehicle in the facility used for boarding the vehicle in addition to the user U who is scheduled to board an airplane at the airport A. For example, the information processing system 1 may recognize and manage the status within a seaport of a user who is scheduled to board a ship at the seaport. Further, for example, the information processing system 1 may recognize and manage the status within a station of a user who is scheduled to board a train at the station.

The management server 10 is installed within a facility such as an airport company, an airline company, or the like run in the airport A, for example. The check-in terminal 20 is installed in a check-in lobby P1 within the airport A. The automatic baggage deposit machine 30 is installed in a baggage counter P2 within the airport A. The security inspection apparatus 40 is installed in a security inspection site P3 within the airport A. The automated gate apparatus 50 is installed in an immigration site P4 within the airport A. The signage terminal 60 is installed in a passage P5 within the airport A. The passage P5 is a passage connected between the immigration site P4 and a boarding gate P6. The boarding gate apparatus 70 is installed at the boarding gate P6 within the airport A.

The user U is able to board an airplane through the boarding gate P6. The operation terminal 80 is carried by a staff such as a staff member of an airline company, a staff member of an airport company, or the like, for example. Further, the operation terminal 80 may be installed in an operation place such as a counter where a staff engages in their operation, for example.

After arriving at the airport A, the user U scheduled to board an airplane of an international flight goes through the check-in lobby P1, the baggage counter P2, the security inspection site P3, the immigration site P4, and the passage P5 in this order, each of which is a place for each procedure to be performed or a place for passage, and then boards an airplane at the boarding gate P6. The user U performs a check-in procedure (boarding procedure) on the check-in terminal 20 in the check-in lobby P1. Further, the user U carries out a baggage deposit procedure with the automatic baggage deposit machine 30 in the baggage counter P2 if necessary. After the check-in procedure and after the baggage deposit procedure if necessary, the user U is subjected to a security inspection procedure by the security inspection apparatus 40 at the security inspection site P3. After the security inspection, the user U is subjected to an immigration procedure by the automated gate apparatus 50 in the immigration site P4. The user U who exited the immigration site P4 passes through the passage P5 on which the signage terminal 60 is installed and reaches the boarding gate P6.

The user U passes through the boarding gate apparatus 70 in the boarding gate P6 and boards an airplane.

Note that the user U may be not only a person scheduled to board an airplane of an international flight but also a person scheduled to board an airplane of a domestic flight. In a case of a user U scheduled to board an airplane of a domestic flight, the immigration in the immigration site P4 is not carried out.

A plurality of surveillance cameras 90 are installed in respective places within the airport A.

The surveillance cameras 90 are installed in the check-in lobby P1, the baggage counter P2, the security inspection site P3, the immigration site P4, the passage P5, and the boarding gate P6, respectively, for example. The determination of the location of the user U by using the surveillance cameras 90 will be described in a second example embodiment.

The management server 10, the check-in terminal 20, the automatic baggage deposit machine 30, the security inspection apparatus 40, the automated gate apparatus 50, the signage terminal 60, the boarding gate apparatus 70, and the surveillance cameras 90 are connected to a network NW. The network NW is configured with a Local Area Network (LAN) including a premise communication network of the airport A, a Wide Area Network (WAN), a mobile communication network, or the like. The operation terminal 80 is capable of connecting to the network NW by a wireless scheme or a wired scheme.

The management server 10 is able to communicate with the check-in terminal 20, the automatic baggage deposit machine 30, the security inspection apparatus 40, the automated gate apparatus 50, the signage terminal 60, the boarding gate apparatus 70, the operation terminal 80, and the surveillance cameras 90, respectively, via the network NW.

Next, each component of the information processing system 1 according to the present example embodiment will be further described by using FIG. 2 to FIG. 9.

Figure 2:
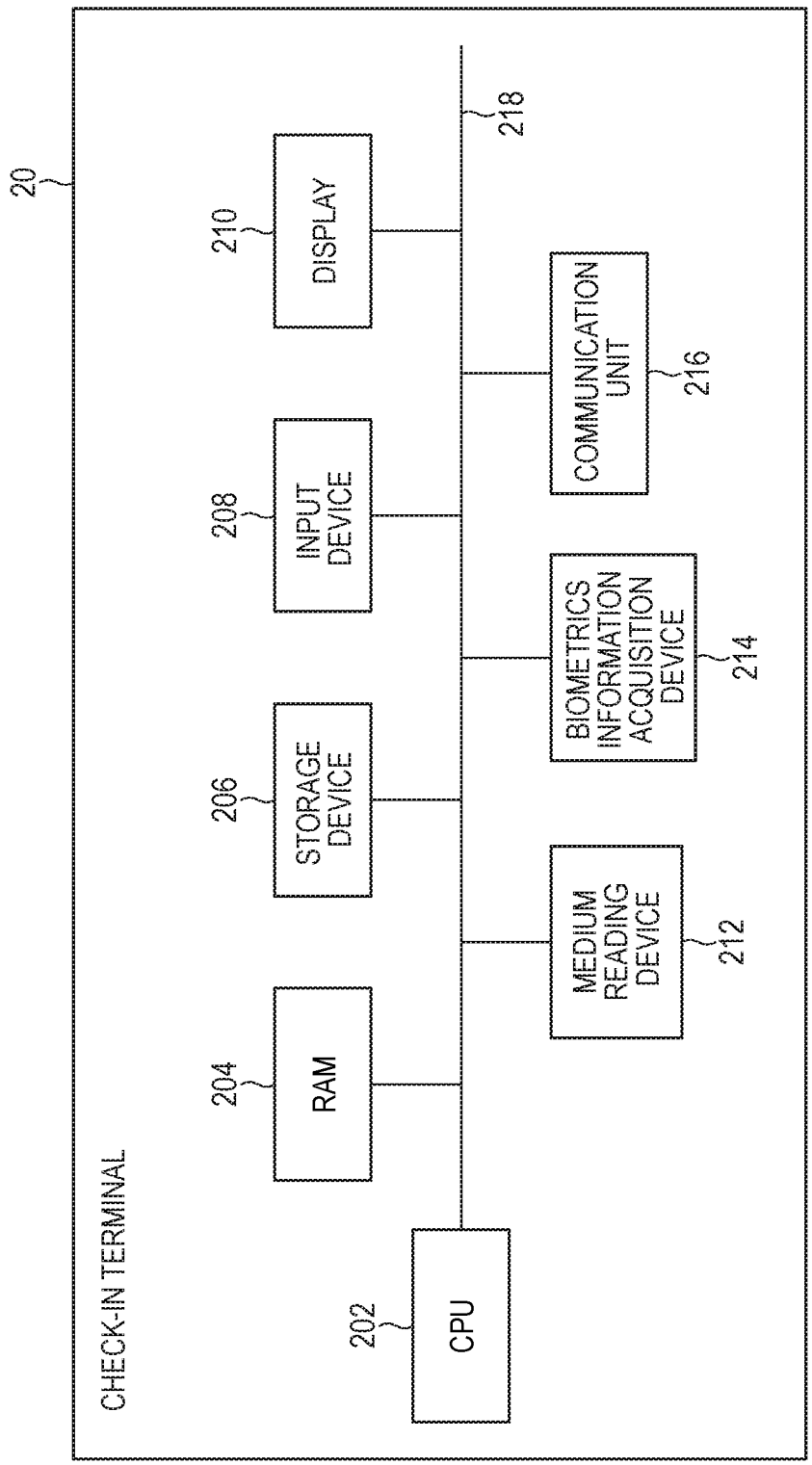
FIG. 2 is a block diagram illustrating one example of the hardware configuration of a check-in terminal according to the first example embodiment of the present invention.

First, the configuration of the check-in terminal 20 will be described by using FIG. 2. FIG. 2 is a block diagram illustrating the hardware configuration of the check-in terminal 20.

The check-in terminal 20 is an automatic check-in terminal which the user U operates by himself/herself to carry out a check-in procedure (boarding procedure).

Note that the check-in terminal 20 may be a check-in terminal operated by a staff member of an airline company and installed at a manned counter. A check-in procedure (boarding procedure) is a procedure to input at least information used for identifying the user U scheduled to board an airplane for registration.

Specifically, the check-in procedure is a procedure to input user information including identity information, face information, and boarding information on the user U for registration as described below, for example.

As illustrated in FIG. 2, the check-in terminal 20 has a central processing unit (CPU) 202, a random access memory (RAM) 204, a storage device 206, an input device 208, and a display 210. Furthermore, the check-in terminal 20 has a medium reading device 212, a biometrics information acquisition device 214, and a communication unit 216. The CPU 202, the RAM 204, the storage device 206, the input device 208, the display 210, the medium reading device 212, the biometrics information acquisition device 214, and the communication unit 216 are connected to a bus line 218.

The CPU 202 functions as a control unit that operates by executing a program stored in the storage device 206 and controls the operation of the entire check-in terminal 20. Further, the CPU 202 executes an application program stored in the storage device 206 to perform various processes as the check-in terminal 20. The RAM 204 provides a memory field necessary for the operation of the CPU 202.

More specifically, the CPU 202 functions as a comparison unit that compares a face image of the user U who utilizes the check-in terminal 20 to carry out a check-in procedure. The CPU 202 as the comparison unit compares a passport face image, which is a face image acquired from a passport of the user U by the medium reading device 212, with a captured face image, which is a face image captured by the biometrics information acquisition device 214 in a check-in procedure. In the comparison between the passport face image and the captured face image, the CPU 202 can compare both face images by comparing a face feature amount extracted from the passport face image with a face feature amount extracted from a captured face image.

Note that, instead of functioning as a comparison unit, the CPU 202 may also be configured to request an external server such as the management server 10 for comparison of a face image of the user U described above and acquire a comparison result from the external server. In such a case, the CPU 202 can transmit a passport face image and a captured image of the user U to the external server to request comparison of the face image.

Further, the CPU 202 functions as a user information transmission unit that transmits user information on the user U to the management server 10. When there is a matching in the comparison between a passport face image and a captured face image of the user U and identity verification of the user U is successful, the CPU 202 as a user information transmission unit transmits the user information on the user U to the management server 10.

The user information on the user U includes identity information, face information, and boarding information on the user U associated with each other.

Identity information is information on an individual user U, such as the name, the nationality, the sexuality, the birthday, or the like of the user U. Identity information is acquired from a passport or a flight ticket medium by the medium reading device 212. Further, identity information can include passport information such as a passport number, a passport issuance country, or the like acquired from the passport of the user U by the medium reading device 212.

Face information corresponds to a captured face image or a passport face image of the user U obtained after the comparison by the CPU 202. Further, face information may correspond to either one of a captured face image and a passport face image or may correspond to both the images. Further, face information may not correspond to a captured face image or a passport face image itself and may correspond to a face feature amount extracted from a captured face image or a passport face image.

Boarding information is information on a flight which the user U intends to use, such as an airline company, a flight number, an origin, a destination, a departure date and time, an arrival date and time of an airplane which the user U is scheduled to board.

Further, boarding information may include boarding time when boarding on an airplane performed by the user U is closed. Boarding information is acquired from a flight ticket medium of the user U by the medium reading device 212.

Note that the user information on the user U transmitted to the management server 10 is registered to a user information database (DB) 106a in the management server 10 as described later. Further, the user information on the user U transmitted to the management server 10 is also registered in first to fifth comparison information DBs 106b1, 106b2, 106b3, 106b4, and 106b5 and used for comparison as described later.

Further, the CPU 202 functions as a status information transmission unit that transmits status information, which is information on the status of the user U. After transmitting the user information on the user U to complete a check-in procedure, the CPU 202 as the status information transmission unit transmits, to the management server 10, status information on the user U indicating that the check-in procedure is completed. The status information is associated with at least any of user information on the user U or face information, passport information, and boarding information included in the user information in the management server 10.

Note that the CPU 202 may be any unit that at least transmits information used for identifying the user U scheduled to board an airplane and status information on a check-in procedure. In such a case, boarding information on the user U may be registered in advance in the DB of a server such as the management server 10.

Further, the CPU 202 functions as a display control unit that causes the display 210 to display a window such as guidance, notification, or the like to the user U. For example, the CPU 202 as the display control unit causes the display 210 to display a guidance window showing how to use the check-in terminal 20. Further, when there is no matching in the comparison between a passport face image and a captured face image of the user U and identity verification of the user U fails, the CPU 202 causes the display 210 to display a notification window that notifies the user U that the identity verification failed.

The storage device 206 is formed of a storage medium such as a non-volatile memory, a hard disk drive, or the like and functions as a storage unit. The storage device 206 stores a program executed by the CPU 202, data referenced by the CPU 202 when the program is executed, or the like.

The input device 208 is a touchscreen embedded in the display 210, for example. The input device 208 functions as an input unit that accepts input of an instruction from the user U. The user U is able to input various information or input an instruction of execution of a process to the check-in terminal 20 via the input device 208.

The display 210 functions as a display unit that displays various windows to the user U who uses the check-in terminal 20. For example, the display 210 displays a guidance window showing how to use the check-in terminal 20 or a notification window to the user U.

The medium reading device 212 functions as an information acquisition unit that reads a passport or a flight ticket medium of the user U and acquires information recorded on the passport or the flight ticket. A flight ticket medium may be, for example, a flight ticket sheet, a mobile terminal displaying a duplicate of an e-ticket, or the like. The medium reading device 212 is formed of a code reader, an image scanner, a contactless integrated circuit (IC) reader, an optical character reader (OCR) device, or the like, for example, and acquires information from various media held over the reading unit thereof.

For example, the medium reading device 212 reads and acquires identity information and passport information on the user U indicated on the passport surface by using an OCR device. Further, for example, the medium reading device 212 reads and acquires a passport face image of the user U indicated on the passport surface by using an image scanner. Further, in the case of an IC passport, the medium reading device 212 reads and acquires identity information on the user U, passport information, a passport face image, or the like stored in the IC chip of the IC passport by using a contactless IC reader. Further, for example, the medium reading device 212 reads a barcode or a QR code (registered trademark) indicated on a flight ticket medium and acquires identity information and boarding information on the user U from the flight ticket medium by using a code reader.

Note that the check-in terminal 20 can not only acquire identity information and boarding information from a flight ticket medium but also acquire identity information and boarding information by using another scheme. For example, the CPU 202 may inquire an airline company server for reservation purchase information on a flight ticket based on a credit card number, a reservation number, a confirmation number, or the like of the user U and acquire identity information and boarding information on the user U from the airline company server.

The biometrics information acquisition device 214 functions as a biometrics information acquisition unit that acquires a face image of the user U as biometrics information on the user U carrying out a check-in procedure. The biometrics information acquisition device 214 is a digital camera that captures a face of the user U standing in front of the check-in terminal 20, for example, and captures the face of the user U and acquires the face image thereof.

The communication unit 216 is connected to the network NW and transmits and receives data via the network NW. The communication unit 216 communicates with the management server 10 or the like under the control of the CPU 202.

In such a way, the check-in terminal 20 is configured.

Next, the configuration of the automatic baggage deposit machine 30 will be described by using FIG. 3.

Figure 3:
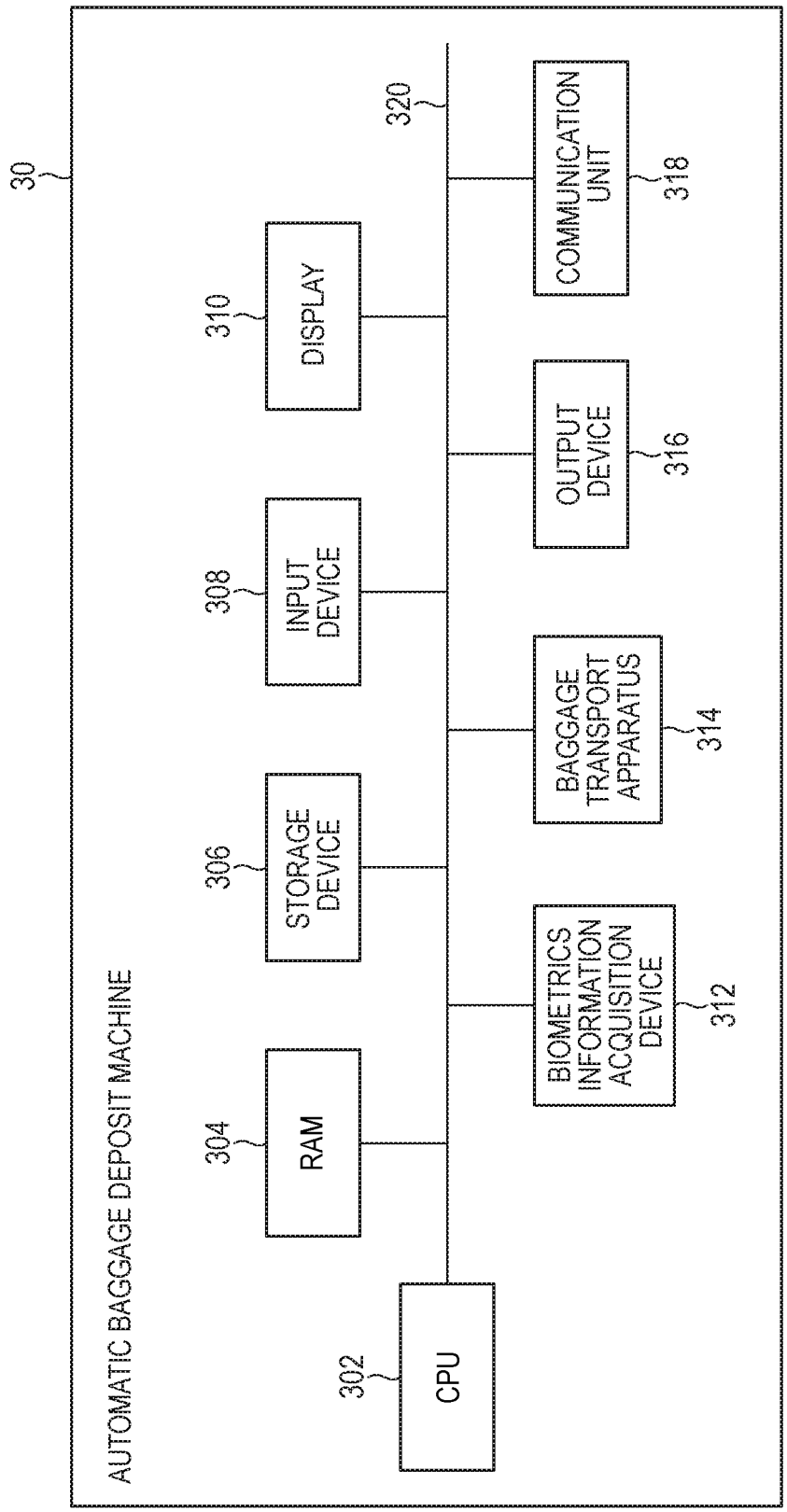
FIG. 3 is a block diagram illustrating one example of the hardware configuration of an automatic baggage deposit machine according to the first example embodiment of the present invention.

FIG. 3 is a block diagram illustrating an example of the hardware configuration of the automatic baggage deposit machine 30. The automatic baggage deposit machine 30 is an apparatus that the user U operates by himself/herself to deposit baggage which is not brought in the cabin of an airplane. The user U is able to carry out a procedure to deposit baggage by using the automatic baggage deposit machine 30 if necessary.

As illustrated in FIG. 3, the automatic baggage deposit machine 30 has a CPU 302, a RAM 304, a storage device 306, an input device 308, and a display 310.

Furthermore, the automatic baggage deposit machine 30 has a biometrics information acquisition device 312, a baggage transport apparatus 314, an output device 316, and a communication unit 318. The CPU 302, the RAM 304, the storage device 306, the input device 308, the display 310, the biometrics information acquisition device 312, the baggage transport apparatus 314, the output device 316, and the communication unit 318 are connected to a bus line 320.

The CPU 302 functions as a control unit that operates by executing a program stored in the storage device 306 and controls the operation of the entire automatic baggage deposit machine 30. Further, the CPU 302 executes an application program stored in the storage device 306 to perform various processes as the automatic baggage deposit machine 30. The RAM 304 provides a memory field necessary for operation of the CPU 302.

More specifically, the CPU 302 functions as a comparison request unit that requests comparison of a face image of the user U performing a baggage deposit procedure by using the automatic baggage deposit machine 30. The CPU 302 as the comparison request unit requests the management server 10 to compare, at 1:N, a target face image, which is a face image of the user U captured by the biometrics information acquisition device 312, with a plurality of registered face images registered in the first comparison information DB 106b1 of the management server 10. Thus, the CPU 302 transmits a target face image captured by the biometrics information acquisition device 312 to the management server 10 as target biometrics information together with a comparison request. Note that, instead of transmitting a target face image as target biometrics information, the CPU 302 may transmit a face feature amount, which is a feature amount extracted from a target face image, and request the comparison.

Note that, instead of requesting the comparison at 1:N described above, the CPU 302 may request the management server 10 to compare a target face image of the user U with a registered face image associated with information on a passport, a boarding pass, or a QR code of the user U. In such a case, when registering a captured face image or a passport face image of the user U acquired by the check-in terminal 20 to the user information DB 106a as a registered face image, the management server 10 performs registration in association with information on a passport, a boarding pass, or a QR code of the user U. The CPU 302 reads information on a passport, a boarding pass, or a QR code of the user U by using a medium reading device (not illustrated) and transmits the read information to the management server 10 together with a target face image. The management server 10 acquires, from the user information DB 106a, a registered face image associated with information on a passport, a boarding pass, or a QR code which matches information on a passport, a boarding pass, or a QR code transmitted from the automatic baggage deposit machine 30. The management server 10 compares, at 1:1, a target face image transmitted from the automatic baggage deposit machine 30 with a registered information face image acquired from the user information DB 106a. Note that the management server 10 may acquires a registered face image associated with information on a passport, a boarding pass, or a QR code from the first comparison information DB 106b1.

Further, the CPU 302 functions as a comparison result acquisition unit that acquires, from the management server 10, comparison result information indicating a result of comparison requested from the management server 10. In a case of 1:N comparison, comparison result information indicates that a registered face image matching a target face image was found and the identity verification of the user U performing a baggage deposit procedure succeeded or that no matching registered face image was found and the identity verification of the user U failed, as a result of the comparison. In a case of 1:1 comparison, comparison result information indicates that a target face image matches a registered face image and the identity verification of the user U performing a baggage deposit procedure succeeded or that no matching is obtained and the identity verification of the user U failed, as a result of the comparison.

Note that, instead of functioning as the comparison request unit and the comparison result acquisition unit, the CPU 302 may be configured to function as a comparison unit that compares a target face image with one or more registered face images at 1:N or 1:1 as described above and outputs comparison result information. In such a case, the CPU 302 can compare a face image by referencing the first comparison information DB 106b1 of the management server 10 or referencing the comparison information DB stored in the storage device 306 in synchronization with the first comparison information DB 106b1.

Further, when the comparison result information indicates that the identity verification of the user U succeeded, the CPU 302 controls the baggage transport apparatus 314 to perform reception and transportation of baggage of the user U.

Further, the CPU 302 functions as a status information transmission unit that transmits status information, which is information on the status of the user U. When reception and transportation of baggage performed by the baggage transport apparatus 314 is completed and the baggage deposit procedure is completed, the CPU 302 as the status information transmission unit transmits, to the management server 10, status information on the user U indicating that the baggage deposit procedure is completed. The status information is associated with at least any of user information on the user U or face information, passport information, and boarding information included in the user information in the management server 10.

Further, the CPU 302 functions as a display control unit that causes the display 310 to display a window such as guidance, notification, or the like to the user U. For example, the CPU 302 as the display control unit causes the display 310 to display a guidance window showing how to use the automatic baggage deposit machine 30. Further, when comparison result information indicates that the identity verification of the user U failed, the CPU 302 causes the display 310 to display a notification window that notifies the user U that the identity verification failed.

The storage device 306 is formed of a storage medium such as a non-volatile memory, a hard disk drive, or the like and functions as a storage unit. The storage device 306 stores a program executed by the CPU 302, data referenced by the CPU 302 when the program is executed, or the like.

The input device 308 is a touchscreen embedded in the display 310, for example. The input device 308 functions as an input unit that accepts input of an instruction from the user U. The user U is able to input various information or input an instruction of execution of a process to the automatic baggage deposit machine 30 via the input device 308.

The display 310 functions as a display unit that displays various windows to the user U who uses the automatic baggage deposit machine 30. For example, the display 310 displays a guidance window showing how to use the automatic baggage deposit machine 30 or a notification window to the user U.

The biometrics information acquisition device 312 functions as a biometrics information acquisition unit that acquires a face image of the user U as biometrics information on the user U performing a baggage deposit procedure. For example, the biometrics information acquisition device 312 is a digital camera that captures a front area of the automatic baggage deposit machine 30 and, when detecting a face of the user U standing in front of the automatic baggage deposit machine 30 in an image captured continuously or periodically, captures the face of the user U and acquires the face image thereof.

The baggage transport apparatus 314 transports baggage to load the baggage on an airplane which the user U boards when identity verification of the user U is successful. The baggage transport apparatus 314 transports baggage placed on a receiving part by the user U and attached with a baggage tag toward a cargo sorting site.

The output device 316 outputs a baggage tag to be attached to deposited baggage and outputs a baggage claim tag necessary for claiming baggage after arrival. The user U attaches the baggage tag output from the output device 316 to the baggage to be deposited. Further, for receiving the baggage after arrival, the user U receives a baggage claim tag output from the output device 316. The baggage tag is associated with at least any of user information on the user U or face information, passport information, and boarding information included in the user information in the management server 10.

The communication unit 318 is connected to the network NW and transmits and receives data via the network NW. The communication unit 318 communicates with the management server 10 or the like under the control of the CPU 302.

In such a way, the automatic baggage deposit machine 30 is configured.

Figure 4:
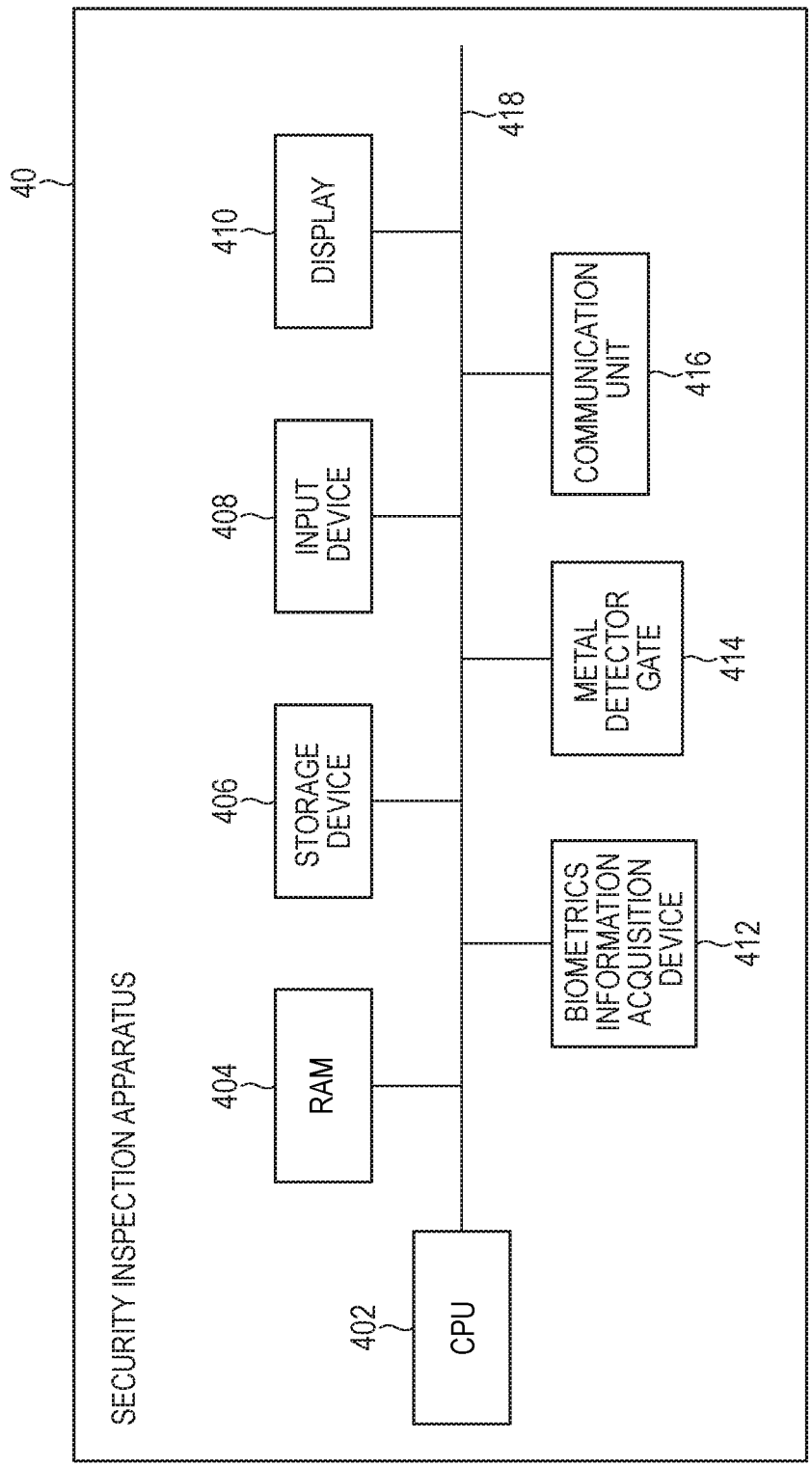
FIG. 4 is a block diagram illustrating one example of the hardware configuration of a security inspection apparatus according to the first example embodiment of the present invention.

Next, the configuration of the security inspection apparatus 40 will be described by using FIG. 4. FIG. 4 is a block diagram illustrating one example of the hardware configuration of the security inspection apparatus 40. The security inspection apparatus 40 is an apparatus that checks whether the user U wears any metal that may be a dangerous object by using a metal detector gate 414, which is a metal detector. Note that the security inspection apparatus 40 may be an apparatus that checks whether or not there is a dangerous object inside carry-on baggage or the like by using an X-ray inspection device or the like other than a metal detector such as the metal detector gate 414.

As illustrated in FIG. 4, the security inspection apparatus 40 has a CPU 402, a RAM 404, a storage device 406, an input device 408, a display 410, a biometrics information acquisition device 412, the metal detector gate 414, and a communication unit 416. The CPU 402, the RAM 404, the storage device 406, the input device 408, the display 410, the biometrics information acquisition device 412, the metal detector gate 414, and the communication unit 416 are connected to a bus line 418.

The CPU 402 functions as a control unit that operates by executing a program stored in the storage device 406 and controls the operation of the entire security inspection apparatus 40. Further, the CPU 402 executes an application program stored in the storage device 406 to perform various processes as the security inspection apparatus 40. The RAM 404 provides a memory field necessary for the operation of the CPU 402.

More specifically, the CPU 402 functions as a comparison request unit that requests comparison of a face image of the user U subjected to a security inspection procedure by the security inspection apparatus 40. The CPU 402 as the comparison request unit requests the management server 10 to compare, at 1:N, a target face image, which is a face image of the user U captured by the biometrics information acquisition device 412, with a plurality of registered face images registered in the second comparison information DB 106b2 of the management server 10. Thus, the CPU 402 transmits a target face image captured by the biometrics information acquisition device 412 to the management server 10 as target biometrics information together with a comparison request. Note that, instead of transmitting a target face image as target biometrics information, the CPU 402 may transmit a face feature amount, which is a feature amount extracted from a target face image, and request the comparison.

Note that, instead of requesting the comparison at 1:N described above, the CPU 402 may request the management server 10 to compare a target face image of the user U with registered face images associated with information on a passport, a boarding pass, or a code symbol such as a QR code of the user U. In such a case, when registering a captured face image or a passport face image of the user U acquired by the check-in terminal 20 to the user information DB 106a as a registered face image, the management server 10 performs registration in association with information on a passport, a boarding pass, or a code symbol of the user U. The CPU 402 reads information on a passport, a boarding pass, or a code symbol of the user U by using a medium reading device (not illustrated) and transmits the read information to the management server 10 together with a target face image. The management server 10 acquires, from the user information DB 106a, a registered face image associated with information on a passport, a boarding pass, or a code symbol which matches information on a passport, a boarding pass, or a code symbol transmitted from the security inspection apparatus 40. The management server 10 compares, at 1:1, a target face image transmitted from the security inspection apparatus 40 with a registered information face image acquired from the user information DB 106a.

Note that the management server 10 may acquires a registered face image associated with information on a passport, a boarding pass, or a QR code from the second comparison information DB 106b2.

Further, the CPU 402 functions as a comparison result acquisition unit that acquires, from the management server 10, comparison result information indicating a result of comparison requested from the management server 10. In a case of 1:N comparison, comparison result information indicates that a registered face image matching a target face image was found and the identity verification of the user U subjected to the security inspection procedure succeeded or that no matching registered face image was found and the identity verification of the user U failed, as a result of the comparison. In a case of 1:1 comparison, comparison result information indicates that a target face image matches a registered face image and the identity verification of the user U subjected to the security inspection procedure succeeded or that no matching is obtained and the identity verification of the user U failed, as a result of the comparison.

Note that, instead of functioning as the comparison request unit and the comparison result acquisition unit, the CPU 402 may be configured to function as a comparison unit that compares a target face image with one or more registered face images at 1:N or 1:1 as described above and outputs comparison result information. In such a case, the CPU 402 can compare a face image by referencing the second comparison information DB 106b2 of the management server 10 or referencing the comparison information DB stored in the storage device 406 in synchronization with the second comparison information DB 106b2.

Further, when the comparison result information indicates that the identity verification of the user U succeeded, the CPU 402 continues inspection performed by the metal detector gate 414.

Further, the CPU 402 functions as a status information transmission unit that transmits status information, which is information on the status of the user U. When inspection performed by the metal detector gate 414 is completed without an anomaly, the CPU 402 as the status information transmission unit transmits, to the management server 10, status information on the user U indicating that the security inspection procedure is completed. The status information is associated with at least any of user information on the user U or face information, passport information, and boarding information included in the user information in the management server 10.

Further, the CPU 402 functions as a display control unit that causes the display 410 to display a window such as guidance, notification, or the like to the user U. For example, the CPU 402 as the display control unit causes the display 410 to display a window that guides the user U to pass through the metal detector gate 414. Further, when comparison result information indicates that the identity verification of the user U failed, the CPU 402 causes the display 410 to display a notification window that notifies the user U that the identity verification failed. Further, when a metal is detected in the inspection performed by the metal detector gate 414, the CPU 402 causes the display 410 to display a notification window to confirm whether no metal is included in carried belongings and again instruct the user U to pass through the metal detector gate 414.

The storage device 406 is formed of a storage medium such as a non-volatile memory, a hard disk drive, or the like and functions as a storage unit. The storage device 406 stores a program executed by the CPU 402, data referenced by the CPU 402 when the program is executed, or the like.

The input device 408 is a touchscreen embedded in the display 410, for example. The input device 408 functions as an input unit that accepts input of an instruction from the user U. The user U is able to input various information or input an instruction of execution of a process to the security inspection apparatus 40 via the input device 408.

The display 410 functions as a display unit that displays various windows to the user U subjected to a security inspection procedure by the security inspection apparatus 40. For example, the display 410 displays a window that guides the user U to pass through the metal detector gate 414 or a notification window to the user U.

The biometrics information acquisition device 412 functions as a biometrics information acquisition unit that acquires a face image of the user U as biometrics information on the user U subjected to a security inspection procedure. For example, the biometrics information acquisition device 412 is a digital camera that captures a front area of the metal detector gate 414 and, when detecting a face of the user U standing in front of the metal detector gate 414 in an image captured continuously or periodically, captures the face of the user U and acquires the face image thereof.

The metal detector gate 414 is a gate-type metal detector and detects a metal carried by the user U passing through the metal detector gate 414.

The communication unit 416 is connected to the network NW and transmits and receives data via the network NW. The communication unit 416 communicates with the management server 10 or the like under the control of the CPU 402.

In such a way, the security inspection apparatus 40 is configured.

Figure 5:
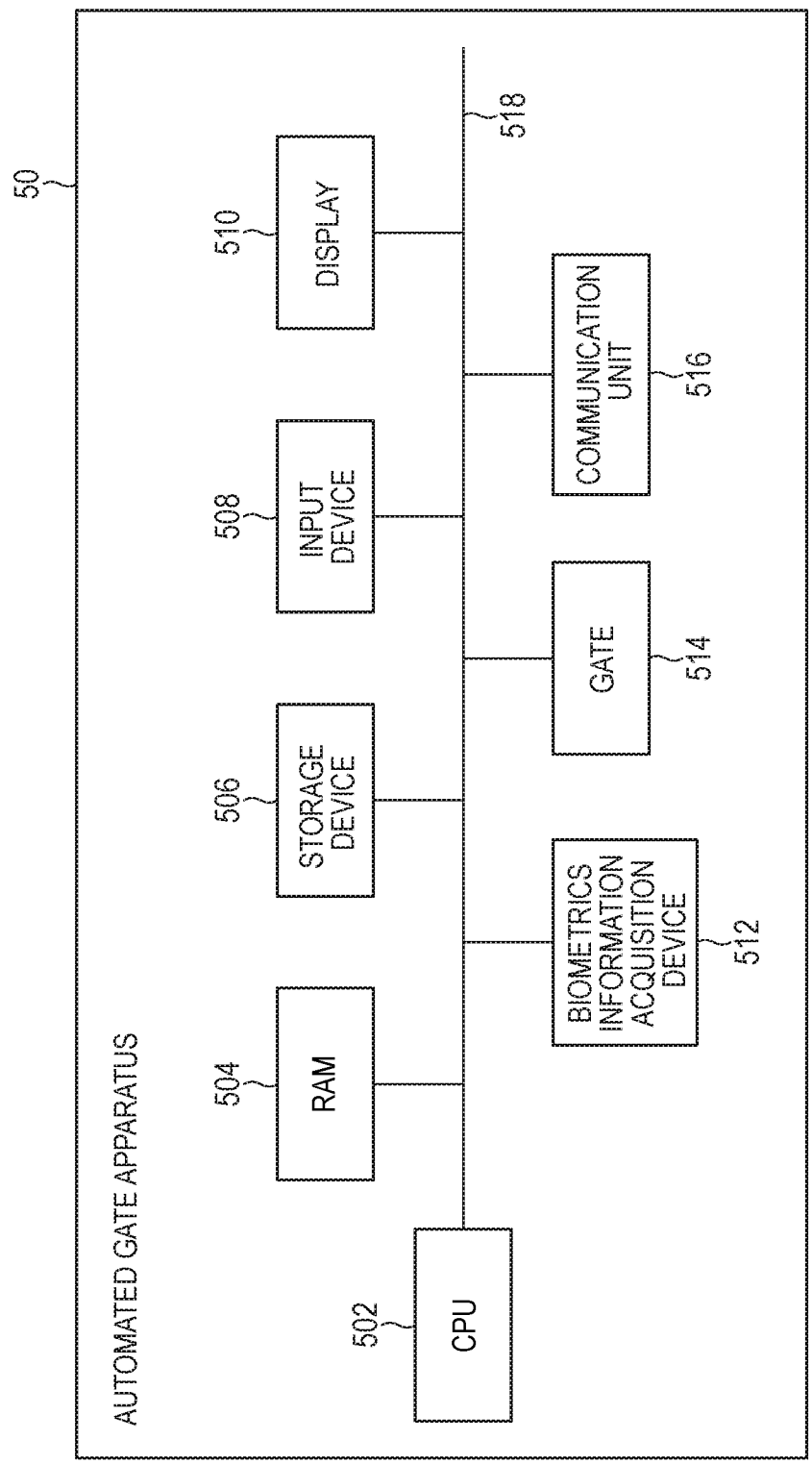
FIG. 5 is a block diagram illustrating one example of the hardware configuration of an automated gate apparatus according to the first example embodiment of the present invention.

Next, the configuration of the automated gate apparatus 50 will be described by using FIG. 5. FIG. 5 is a block diagram illustrating one example of the hardware configuration of the automated gate apparatus 50. The automated gate apparatus 50 is an apparatus that automatically performs an immigration procedure on the user U. The user U who is able to use an immigration procedure with the automated gate apparatus 50 may be, for example, a passenger who has been examined through pre-application and completed user registration for the automated gate apparatus 50, a passenger who is allowed to use it based on a travel history such as the number of times of traveling, a passenger who has completed user registration based on bilateral agreement, or the like.

As illustrated in FIG. 5, the automated gate apparatus 50 has a CPU 502, a RAM 504, a storage device 506, an input device 508, a display 510, a biometrics information acquisition device 512, a gate 514, and a communication unit 516. The CPU 502, the RAM 504, the storage device 506, the input device 508, the display 510, the biometrics information acquisition device 512, the gate 514, and the communication unit 516 are connected to a bus line 518.

The CPU 502 functions as a control unit that operates by executing a program stored in the storage device 506 and controls the operation of the entire automated gate apparatus 50. Further, the CPU 502 executes an application program stored in the storage device 506 to perform various processes as the automated gate apparatus 50. The RAM 504 provides a memory field necessary for the operation of the CPU 502.

More specifically, the CPU 502 functions as a comparison request unit that requests comparison of a face image of the user U subjected to an immigration procedure by using the automated gate apparatus 50. The CPU 502 as the comparison request unit requests the management server 10 to compare, at 1:N, a target face image, which is a face image of the user U captured by the biometrics information acquisition device 512, with a plurality of registered face images registered in the third comparison information DB 106b3 of the management server 10. Thus, the CPU 502 transmits a target face image captured by the biometrics information acquisition device 512 to the management server 10 as target biometrics information together with a comparison request. Note that, instead of transmitting a target face image as target biometrics information, the CPU 502 may transmit a face feature amount, which is a feature amount extracted from a target face image, and request the comparison.

Note that, instead of requesting the comparison at 1:N described above, the CPU 502 may request the management server 10 to compare a target face image of the user U with registered face images associated with information on a passport, a boarding pass, or a code symbol such as a QR code of the user U. In such a case, when registering a captured face image or a passport face image of the user U acquired by the check-in terminal 20 to the user information DB 106a as a registered face image, the management server 10 performs registration in association with information on a passport, a boarding pass, or a code symbol of the user U. The CPU 502 reads information on a passport, a boarding pass, or a code symbol of the user U by using a medium reading device (not illustrated) and transmits the read information to the management server 10 together with a target face image. The management server 10 acquires, from the user information DB 106a, a registered face image associated with information on a passport, a boarding pass, or a code symbol which matches information on a passport, a boarding pass, or a code symbol transmitted from the automated gate apparatus 50. The management server 10 compares, at 1:1, a target face image transmitted from the automated gate apparatus 50 with a registered information face image acquired from the user information DB 106a. Note that the management server 10 may acquires a registered face image associated with information on a passport, a boarding pass, or a QR code from the third comparison information DB 106b3.

Further, the CPU 502 functions as a comparison result acquisition unit that acquires, from the management server 10, comparison result information indicating a result of comparison requested from the management server 10. In a case of 1:N comparison, comparison result information indicates that a registered face image matching a target face image was found and the identity verification of the user U subjected to the immigration procedure succeeded or that no matching registered face image was found and the identity verification of the user U failed, as a result of the comparison. In a case of 1:1 comparison, comparison result information indicates that a target face image matches a registered face image and the identity verification of the user U subjected to the immigration procedure succeeded or that no matching is obtained and the identity verification of the user U failed, as a result of the comparison.

Note that, instead of functioning as the comparison request unit and the comparison result acquisition unit, the CPU 502 may be configured to function as a comparison unit that compares a target face image with one or more registered face images at 1:N or 1:1 as described above and outputs comparison result information. In such a case, the CPU 502 can compare a face image by referencing the third comparison information DB 106b3 of the management server 10 or referencing the comparison information DB stored in the storage device 506 in synchronization with the third comparison information DB 106b3.

Further, when the comparison result information indicates that the identity verification of the user U succeeded, the CPU 502 controls the gate 514 to permit the user U to pass through the gate 514.

Further, the CPU 502 functions as a status information transmission unit that transmits status information, which is information on the status of the user U. When permitting the user U to pass through the gate 514 to complete the immigration procedure, the CPU 502 as the status information transmission unit transmits, to the management server 10, status information on the user U indicating that the immigration procedure is completed. The status information is associated with at least any of user information on the user U or face information, passport information, and boarding information included in the user information in the management server 10.

Further, the CPU 502 functions as a display control unit that causes the display 510 to display a window such as guidance, notification, or the like to the user U. For example, the CPU 502 as the display control unit causes the display 510 to display a guidance window showing how to use the automated gate apparatus 50. Further, when comparison result information indicates that the identity verification of the user U failed, the CPU 502 causes the display 510 to display a notification window that notifies the user U that the identity verification failed.

The storage device 506 is formed of a storage medium such as a non-volatile memory, a hard disk drive, or the like and functions as a storage unit. The storage device 506 stores a program executed by the CPU 502, data referenced by the CPU 502 when the program is executed, or the like.

The input device 508 is a touchscreen embedded in the display 510, for example. The input device 508 functions as an input unit that accepts input of an instruction from the user U. The user U is able to input various information or input an instruction of execution of a process to the automated gate apparatus 50 via the input device 508.

The display 510 functions as a display unit that displays various windows to the user U subjected to an immigration procedure by using the automated gate apparatus 50. For example, the display 510 displays a guidance window showing how to use the automated gate apparatus 50, a notification window to the user U, or the like.

The biometrics information acquisition device 512 functions as a biometrics information acquisition unit that acquires a face image of the user U as biometrics information on the user U subjected to an immigration procedure. For example, the biometrics information acquisition device 512 is a digital camera that captures a front area of the automated gate apparatus 50 and, when detecting a face of the user U standing in front of the automated gate apparatus 50 in an image captured continuously or periodically, captures the face of the user U and acquires the face image thereof.

When identity verification of the user U is successful in the automated gate apparatus 50 and the user U passes through an immigration, the gate 514 transfers from a closed state for a standby to block passage of the user U to an opened state to permit passage of the user U under the control of the CPU 502.

The scheme of the gate 514 is not particularly limited and may be, for example, a flapper gate in which one or more flappers provided on one side or both side of the passage are opened or closed, a turn-style gate in which three bars are revolved, or the like.

The communication unit 516 is connected to the network NW and transmits and receives data via the network NW. The communication unit 516 communicates with the management server 10 or the like under the control of the CPU 502.

In such a way, the automated gate apparatus 50 is configured.

Figure 6:
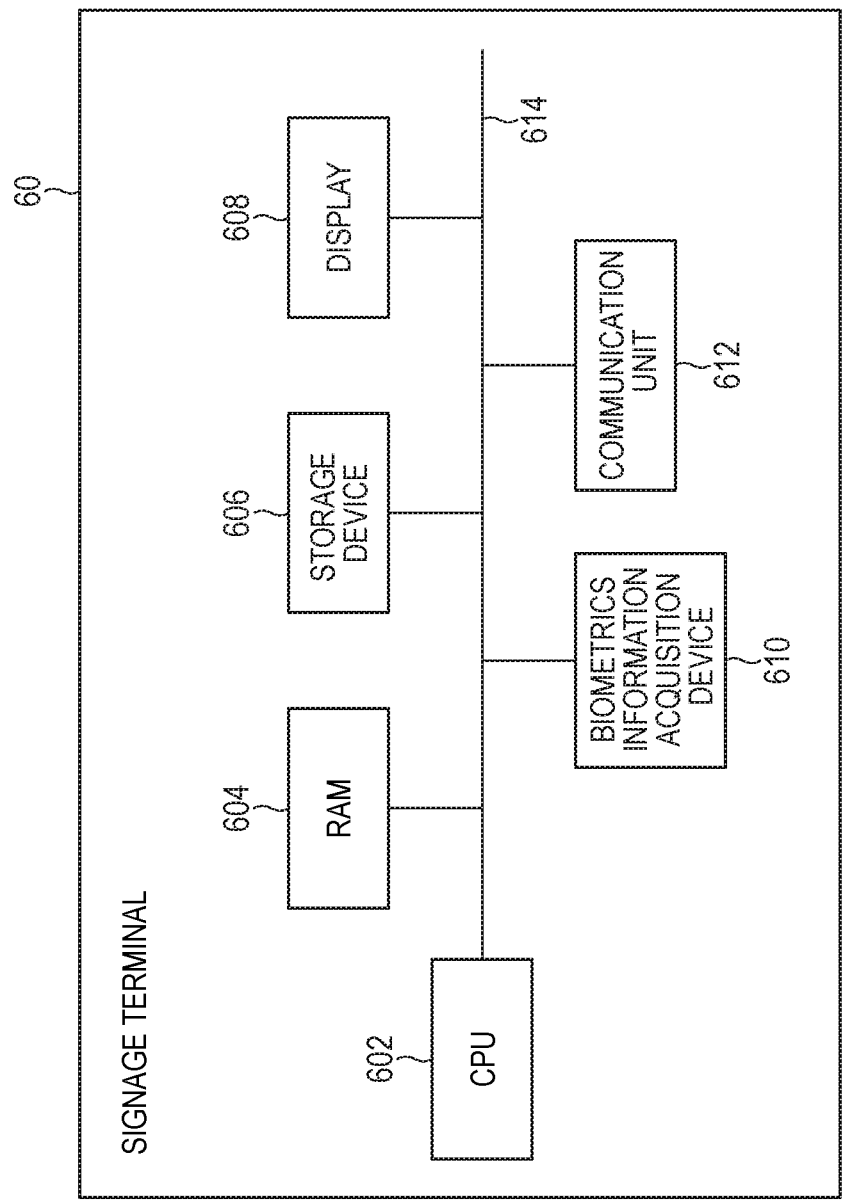
FIG. 6 is a block diagram illustrating one example of the hardware configuration of a signage terminal according to the first example embodiment of the present invention.

Next, the configuration of the signage terminal 60 will be described by using FIG. 6. FIG. 6 is a block diagram illustrating one example of the hardware configuration of the signage terminal 60. The signage terminal 60 is a terminal that displays a guide showing the direction to the boarding gate P6, an advertisement, or the like.

As illustrated in FIG. 6, the signage terminal 60 has a CPU 602, a RAM 604, a storage device 606, a display 608, a biometrics information acquisition device 610, and a communication unit 612. The CPU 602, the RAM 604, the storage device 606, the display 608, the biometrics information acquisition device 610, and the communication unit 612 are connected to a bus line 614.

The CPU 602 functions as a control unit that operates by executing a program stored in the storage device 606 and controls the operation of the entire signage terminal 60. Further, the CPU 602 executes an application program stored in the storage device 606 to perform various processes as the signage terminal 60. The RAM 604 provides a memory field necessary for the operation of the CPU 602.

More specifically, the CPU 602 functions as a face information transmission unit that transmits a face image of the user U in front of the signage terminal 60 to the management server 10. The user U in front of the signage terminal 60 may be, for example, a user who is present in front of the signage terminal 60 and confirms a guidance displayed on the signage terminal 60, the user U who passes by in front of the signage terminal 60, or the like. The CPU 602 as a face information transmission unit transmits a target face image, which is a face image of the user U captured by the biometrics information acquisition device 610, to the management server 10 as target biometrics information. Note that, instead of transmitting a target face image as target biometrics information, the CPU 602 may transmit a face feature amount, which is a feature amount extracted from a target face image. The management server 10 that has received a target face image from the signage terminal 60 compares, at 1:N, the received target face image with a plurality of registered face images registered in the fourth comparison information DB 106*b*4.

Further, the CPU 602 functions as a display control unit that causes the display 608 to display a window such as a guide showing the direction to the boarding gate P6, an advertisement, or the like.

Note that the CPU 602 of the signage terminal 60 can also function as a comparison request unit, a comparison result acquisition unit, and a status information transmission unit as described below in a similar manner to the CPU 302 of the automatic baggage deposit machine 30 or the like.

More specifically, the CPU 602 functions as a comparison result request unit that requests comparison of a face image of the user U who is present in front of the signage terminal 60 or passes by in front of the signage terminal 60. The CPU 602 as the comparison request unit requests the management server 10 to compare, at 1:N, a target face image, which is a face image of the user U captured by the biometrics information acquisition device 610, with a plurality of registered face images registered in the fourth comparison information DB 106*b*4 of the management server 10. Thus, the CPU 602 transmits a target face image captured by the biometrics information acquisition device 610 to the management server 10 as target biometrics information together with a comparison request. Note that, instead of transmitting a target face image as target biometrics information, the CPU 602 may transmit a face feature amount, which is a feature amount extracted from a target face image, to request the comparison.

Note that, instead of requesting the comparison at 1:N described above, the CPU 602 may request the management server 10 to compare a target face image of the user U with registered face images associated with information on a passport, a boarding pass, or a code symbol such as a QR code of the user U. In such a case, when registering a captured face image or a passport face image of the user U acquired by the check-in terminal 20 to the user information DB 106*a* as a registered face image, the management server 10 performs registration in association with information on a passport, a boarding pass, or a code symbol of the user U. The CPU 602 reads information on a passport, a boarding pass, or a code symbol of the user U by using a medium reading device (not illustrated) and transmits the read information to the management server 10 together with a target face image. The management server 10 acquires, from the user information DB 106*a*, a registered face image associated with information on a passport, a boarding pass, or a code symbol which matches information on a passport, a boarding pass, or a code symbol transmitted from the signage terminal 60. The management server 10 compares, at 1:1, a target face image transmitted from the signage terminal 60 with a registered information face image acquired from the user information DB 106*a*. Note that the management server 10 may acquires a registered face image associated with information on a passport, a boarding pass, or a QR code from the fourth comparison information DB 106*b*4.

Further, the CPU 602 functions as a comparison result acquisition unit that acquires, from the management server 10, comparison result information indicating a result of comparison requested from the management server 10. In a case of 1:N comparison, comparison result information indicates that a registered face image matching a target face image was found and the identity verification of the user U in front of the signage terminal 60 succeeded or that no matching registered face image was found and the identity verification of the user U failed as a result of the comparison. In a case of 1:1 comparison, comparison result information indicates that a target face image matches a registered face image and the identity verification of the user U in front of the signage terminal 60 succeeded or that no matching is obtained and the identity verification of the user U failed, as a result of the comparison.

Note that, instead of functioning as the comparison request unit and the comparison result acquisition unit, the CPU 602 may be configured to function as a comparison unit that compares a target face image with one or more registered face images at 1:N or 1:1 as described above and outputs comparison result information. In such a case, the CPU 602 can compare a face image by referencing the fourth comparison information DB 106b4 of the management server 10 or referencing the comparison information DB stored in the storage device 606 in synchronization with the fourth comparison information DB 106b4.

Further, the CPU 602 functions as a status information transmission unit that transmits status information, which is information on the status of the user U. When identity verification of the user U in front of the signage terminal 60 is successful, the CPU 602 as the status information transmission unit transmits, to the management server 10, status information indicating the presence of the user U in front of the signage terminal 60 or the completion of passage of the user U. The status information is associated with at least any of user information on the user U or face information, passport information, and boarding information included in the user information in the management server 10.

The storage device 606 is formed of a storage medium such as a non-volatile memory, a hard disk drive, or the like and functions as a storage unit. The storage device 606 stores a program executed by the CPU 602, data referenced by the CPU 602 when the program is executed, or the like.

The display 608 functions as a display unit that displays various windows. For example, the display 608 displays a window of a guide showing the direction to the boarding gate P6, an advertisement, or the like.

The guide showing directions, the advertisement or the like displayed on the display 608 corresponds to an individual identified as the user U in front of the signage terminal 60, for example.

The biometrics information acquisition device 610 functions as a biometrics information acquisition unit that acquires a face image of the user U as biometrics information on the user U in front of the signage terminal 60. For example, the biometrics information acquisition device 610 is a digital camera that captures a front area of the signage terminal 60 and, when detecting a face of the user U in front of the signage terminal 60 in an image captured continuously or periodically, captures the face of the user U and acquires the face image thereof.

The communication unit 612 is connected to the network NW and transmits and receives data via the network NW. The communication unit 612 communicates with the management server 10 or the like under the control of the CPU 602.

In such a way, the signage terminal 60 is configured.

Figure 7:
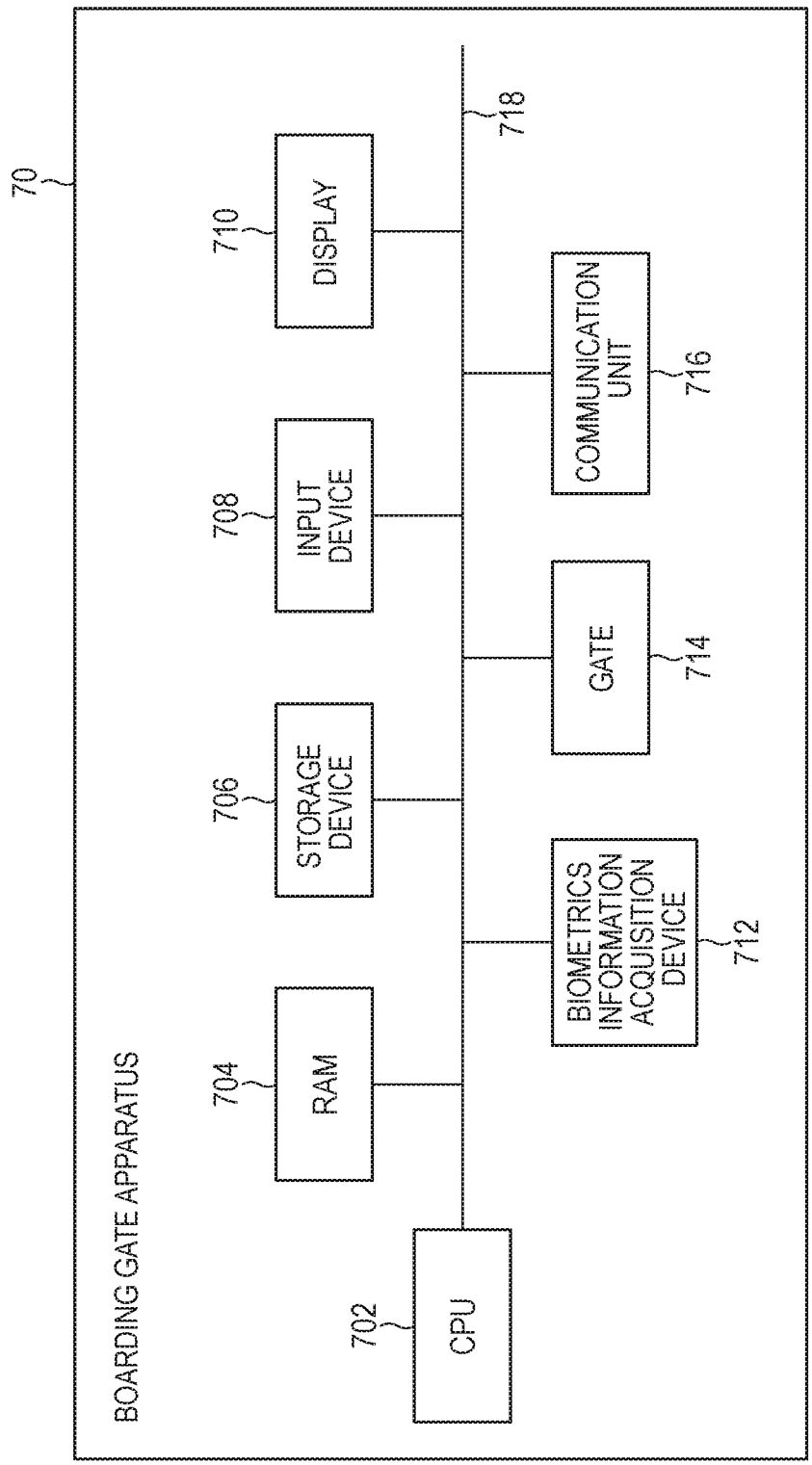
FIG. 7 is a block diagram illustrating one example of the hardware configuration of a boarding gate apparatus according to the first example embodiment of the present invention.

Next, the configuration of the boarding gate apparatus 70 will be described by using FIG. 7. FIG. 7 is a block diagram illustrating one example of the hardware configuration of the boarding gate apparatus 70. The boarding gate apparatus 70 is an apparatus that confirms that the user U is a passenger of an airplane that is boardable from the boarding gate P6 to which the boarding gate apparatus 70 is installed.

As illustrated in FIG. 7, the boarding gate apparatus 70 has a CPU 702, a RAM 704, a storage device 706, an input device 708, a display 710, a biometrics information acquisition device 712, a gate 714, and a communication unit 716. The CPU 702, the RAM 704, the storage device 706, the input device 708, the display 710, the biometrics information acquisition device 712, the gate 714, and the communication unit 716 are connected to a bus line 718.

The CPU 702 functions as a control unit that operates by executing a program stored in the storage device 706 and controls the operation of the entire boarding gate apparatus 70. Further, the CPU 702 executes an application program stored in the storage device 706 to perform various processes as the boarding gate apparatus 70. The RAM 704 provides a memory field necessary for the operation of the CPU 702.

More specifically, the CPU 702 functions as a comparison request unit that requests comparison of a face image and confirmation of boarding information on the user U boarding an airplane from the boarding gate P6.

The CPU 702 as the comparison request unit requests the management server 10 to compare, at 1:N, a target face image, which is a face image of the user U captured by the biometrics information acquisition device 712, with a plurality of registered face images registered in the fifth comparison information DB 106b5 of the management server 10. Thus, the CPU 702 transmits a target face image captured by the biometrics information acquisition device 712 to the management server 10 as target biometrics information together with a comparison request. Note that, instead of transmitting a target face image as target biometrics information, the CPU 702 may transmit a face feature amount, which is a feature amount extracted from a target face image, and request the comparison.

Note that, instead of requesting the comparison at 1:N described above, the CPU 702 may request the management server 10 to compare a target face image of the user U with registered face images associated with information on a passport, a boarding pass, or a code symbol such as a QR code of the user U. In such a case, when registering a captured face image or a passport face image of the user U acquired by the check-in terminal 20 to the user information DB 106a as a registered face image, the management server 10 performs registration in association with information on a passport, a boarding pass, or a code symbol of the user U. The CPU 702 reads information on a passport, a boarding pass, or a code symbol of the user U by using a medium reading device (not illustrated) and transmits the read information to the management server 10 together with a target face image. The management server 10 acquires, from the user information DB 106a, a registered face image associated with information on a passport, a boarding pass, or a code symbol which matches information on a passport, a boarding pass, or a code symbol transmitted from the boarding gate apparatus 70. The management server 10 compares, at 1:1, a target face image transmitted from the boarding gate apparatus 70 with a registered information face image acquired from the user information DB 106a. Note that the management server 10 may acquires a registered face image associated with information on a passport, a boarding pass, or a QR code from the fifth comparison information DB 106b5.

Further, the CPU 702 as the comparison request unit requests the management server 10 to confirm that boarding information associated with a registered face image matching a target face image is associated with an airplane boardable from the boarding gate P6.

Further, the CPU 702 functions as a comparison result acquisition unit that acquires, from the management server 10, comparison result information indicating a result of comparison requested from the management server 10. In a case of 1:N comparison, comparison result information indicates that a registered face image matching a target face image was found and the identity verification of the user U boarding an airplane succeeded or that no matching registered face image was found and the identity verification of the user U failed, as a result of the comparison. Further, comparison result information indicates that the boarding information is confirmed to be related to an airplane and the confirmation of the boarding information succeeded or that the boarding information is not confirmed to be related to the airplane and the confirmation of the boarding information failed. In a case of 1:1 comparison, comparison result information indicates that a target face image matches a registered face image and the identity verification of the user U boarding an airplane succeeded or that no matching is obtained and the identity verification of the user U failed, as a result of the comparison.

Note that, instead of functioning as the comparison request unit and the comparison result acquisition unit, the CPU 702 may be configured to function as a comparison unit that compares a target face image with one or more registered face images in the fifth comparison information DB 106b5 at 1:N or 1:1 as described above and outputs comparison result information. Further, the CPU 702 may be configured to confirm that boarding information associated with a registered face image matching a target face image is associated with an airplane boardable from the boarding gate P6. In such cases, the CPU 702 can compare a face image and confirm boarding information by referencing the fifth comparison information DB 106b5 of the management server 10 or referencing the comparison information DB stored in the storage device 706 in synchronization with the fifth comparison information DB 106b5.

Further, when the comparison result information indicates that the identity verification of the user U succeeded and the confirmation of boarding information succeeded, the CPU 702 controls the gate 714 to permit the user U to pass through the gate 714.

Further, the CPU 702 functions as a status information transmission unit that transmits status information, which is information on the status of the user U. When permitting the user U to pass through the gate 714 to complete the boarding on the airplane, the CPU 702 as the status information transmission unit transmits, to the management server 10, status information on the user U indicating that the boarding on an airplane is completed. The status information is associated with at least any of user information on the user U or face information, passport information, and boarding information included in the user information in the management server 10.

Further, the CPU 702 functions as a display control unit that causes the display 710 to display a window such as guidance, notification, or the like to the user U. For example, the CPU 702 as the display control unit causes the display 710 to display a guidance window showing how to use the boarding gate apparatus 70. Further, when comparison result information indicates that the identity verification of the user U failed, the CPU 702 causes the display 710 to display a notification window that notifies the user U that the identity verification failed. Further, when comparison result information indicates that the confirmation of boarding information failed, the CPU 702 causes the display 710 to display a notification window that notifies the user U that the confirmation of boarding information failed.

The storage device 706 is formed of a storage medium such as a non-volatile memory, a hard disk drive, or the like and functions as a storage unit. The storage device 706 stores a program executed by the CPU 702, data referenced by the CPU 702 when the program is executed, or the like.

The input device 708 is a touchscreen embedded in the display 710, for example. The input device 708 functions as an input unit that accepts input of an instruction from the user U. The user U is able to input various information or input an instruction of execution of a process to the boarding gate apparatus 70 via the input device 708.

The display 710 functions as a display unit that displays various windows to the user U boarding an airplane from the boarding gate P6. For example, the display 710 displays a guidance window showing how to use the boarding gate apparatus 70, a notification window to the user U, or the like.

The biometrics information acquisition device 712 functions as a biometrics information acquisition unit that acquires a face image of the user U as biometrics information on the user U boarding an airplane from the boarding gate P6. For example, the biometrics information acquisition device 712 is a digital camera that captures a front area of the boarding gate apparatus 70 and, when detecting a face of the user U standing in front of the boarding gate apparatus 70 in an image captured continuously or periodically, captures the face of the user U and acquires the face image thereof.

When identity verification of the user U and confirmation of boarding information are successful in the boarding gate apparatus 70, the gate 714 transfers from a closed state for a standby to block passage of the user U to an opened state to permit passage of the user U under the control of the CPU 702. The scheme of the gate 714 is not particularly limited and may be, for example, a flapper gate in which one or more flappers provided on one side or both sides of the passage are opened or closed, a turn-style gate in which three bars are revolved, or the like.

The communication unit 716 is connected to the network NW and transmits and receives data via the network NW. The communication unit 716 communicates with the management server 10 or the like under the control of the CPU 702.

In such a way, the boarding gate apparatus 70 is configured.

Figure 8:
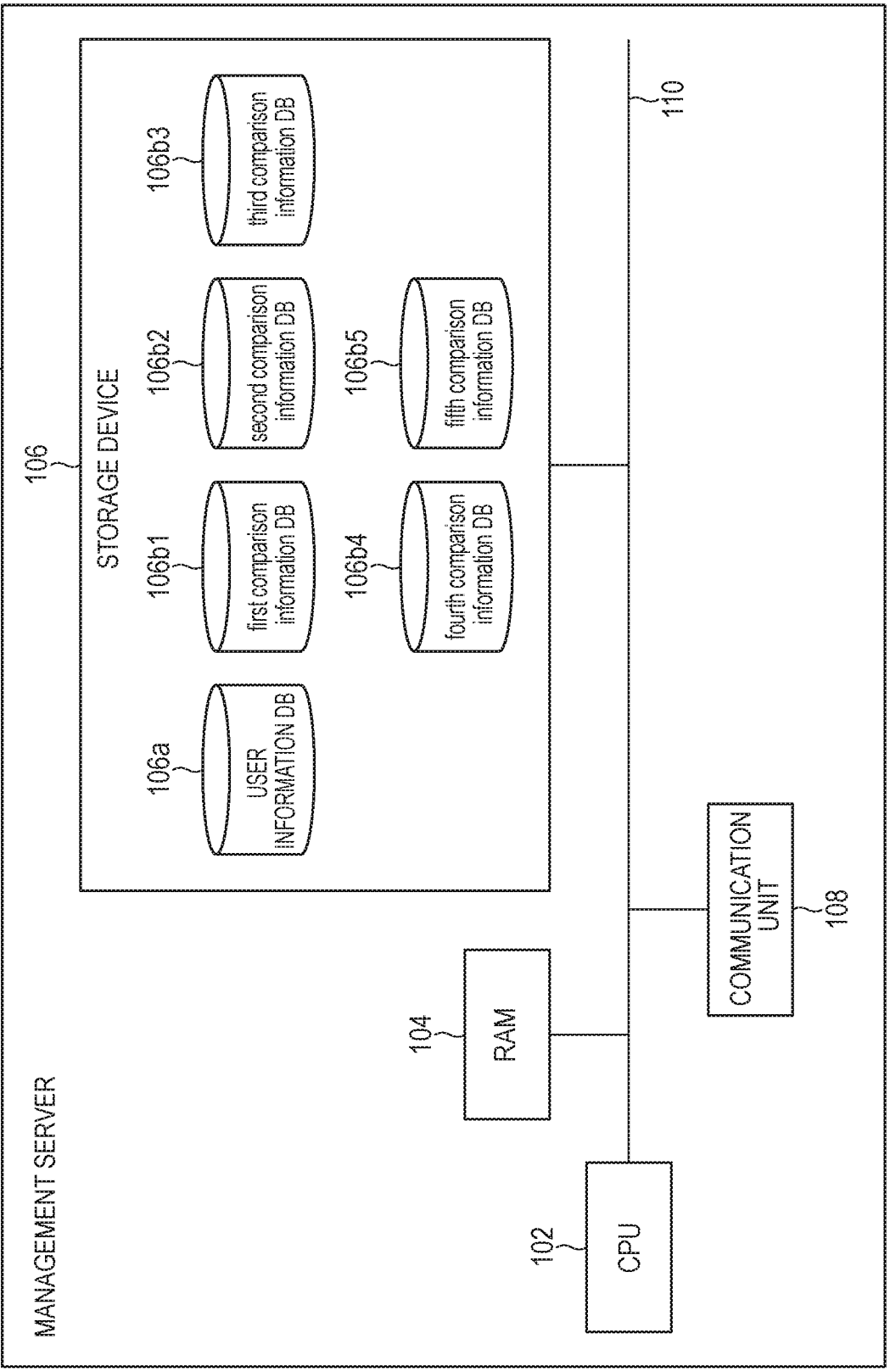
FIG. 8 is a block diagram illustrating one example of the hardware configuration of a management server according to the first example embodiment of the present invention.

Next, the configuration of the management server 10 will be described by using FIG. 8. FIG. 8 is a block diagram illustrating one example of the hardware configuration of the management server 10. The management server 10 is an information processing apparatus that manages user information and the status on the user U and compares a target face image with a plurality of registered face images in the first to fifth comparison information DBs 106b1 to 106b5 in response to a face image comparison request. Note that the function of the management server 10 may be implemented by a single server or may be implemented by a plurality of server apparatuses.

As illustrated in FIG. 8, the management server 10 has a CPU 102, a RAM 104, a storage device 106, and a communication unit 108. The CPU 102, the RAM 104, the storage device 106, and the communication unit 108 are connected to a bus line 110.

The CPU 102 functions as a control unit that operates by executing a program stored in the storage device 106 and controls the operation of the entire management server 10. Further, the CPU 102 executes an application program stored in the storage device 106 to perform various processes as the management server 10. The RAM 104 provides a memory field necessary for the operation of the CPU 102.

More specifically, the CPU 102 functions as an information management unit that stores user information on the user U received from the check-in terminal 20 in the storage device 106 and manages the stored user information. The CPU 102 as the information management unit registers user information received from the check-in terminal 20 to the user information DB 106*a* stored in the storage device 106 and manages the registered user information. The CPU 102 registers the received user information to the user information DB 106*a* every time user information is received from the check-in terminal 20. As described above, user information on the user U includes identity information, face information, and boarding information on the user U associated with each other. Face information corresponds to a captured face image or a passport face image acquired by the check-in terminal 20. A registered face image, which is a captured face image or a passport face image registered in the user information DB 106*a*, is used for comparison of a face image used for identity verification of the user U in the automatic baggage deposit machine 30, the security inspection apparatus 40, the automated gate apparatus 50, and the boarding gate apparatus 70.

Further, the CPU 102 functions as a status management unit that stores the status of the user U regarding a plurality of procedures up to the boarding on an airplane by the user U in the storage device 106 and manages the stored status. The CPU 102 as the status management unit stores and manages the status of the user U in the user information DB 106*a* in association with the user information on the user U.

The CPU 102 manages the status of the user U regarding each procedure based on status information received from the check-in terminal 20, the automatic baggage deposit machine 30, the security inspection apparatus 40, the automated gate apparatus 50, and the boarding gate apparatus 70, which are external apparatuses. Further, the CPU 102 manages the status of the user U regarding presence or passage in front of the signage terminal 60, which is a procedure performed by the user U, based on a comparison result of a target face image received from the signage terminal 60. The CPU 102 manages the status regarding each procedure of the user U together with deadline time, which is a deadline set as described later for a plurality of procedures up to boarding on an airplane by the user U.

Specifically, the CPU 102 manages the status of the user U regarding a check-in procedure. That is, in response to receiving status information on the user U from the check-in terminal 20 that indicates the completion of the check-in procedure, the CPU 102 updates the status of the user U of interest regarding the check-in procedure in the user information DB 106*a* from an unfinished state to a completed state.

Further, the CPU 102 manages the status of the user U regarding a baggage deposit procedure. That is, in response to receiving status information on the user U from the automatic baggage deposit machine 30 that indicates the completion of the baggage deposit procedure, the CPU 102 updates the status of the user U of interest regarding the baggage deposit procedure in the user information DB 106*a* from an unfinished state to a completed state. Note that a baggage deposit procedure by the user U is an optional procedure performed when it is necessary to deposit baggage. Thus, the status of the user U regarding a baggage deposit procedure may remain unfinished. This is intended for a case where some users U have less baggage and do not deposit their baggage.

Further, the CPU 102 manages the status of the user U regarding a security inspection procedure. That is, in response to receiving status information on the user U from the security inspection apparatus 40 that indicates the completion of the security inspection procedure, the CPU 102 updates the status of the user U of interest regarding the security inspection procedure in the user information DB 106*a* from an unfinished state to a completed state.

Further, the CPU 102 manages the status of the user U regarding an immigration procedure. That is, in response to receiving status information on the user U from the automated gate apparatus 50 that indicates the completion of the immigration procedure, the CPU 102 updates the status of the user U of interest regarding the immigration procedure in the user information DB 106*a* from an unfinished state to a completed state.

Further, the CPU 102 manages the status of the user U regarding boarding on an airplane. That is, in response to receiving status information on the user U from the boarding gate apparatus 70 that indicates the completion of the boarding on the airplane, the CPU 102 updates the status of the user U of interest regarding the boarding on the airplane in the user information DB 106*a* from an unfinished state to a completed state.

Furthermore, the CPU 102 also manages the status of the user U regarding the presence or passage in front of the signage terminal 60. In such a case, in response to receiving a target face image from the signage terminal 60, the CPU 102 compares the received target face image with a plurality of registered face images in the user information DB 106*a*. When a matching registered face image is found as a result of the comparison, the CPU 102 updates the status of the user U of interest regarding the presence or passage in front of the signage terminal 60 in the user information DB 106*a* from an unfinished state to a completed state.

In such a way, the CPU 102 as the status management unit manages the status regarding a check-in procedure, a baggage deposit procedure, a security inspection procedure, an immigration procedure, presence or passage in front of the signage terminal 60, and boarding on the airplane, which are a plurality of procedures of the user U up to the boarding. The CPU 102 manages the status of the user U regarding each procedure based on a result of the comparison between a target face image acquired in each procedure and one or more registered face images. That is, when there is a matching in comparison between a target face image acquired in each procedure and a registered face image, the CPU 102 updates the status of the user U of interest regarding each procedure from an unfinished state to a completed state. One procedure included in the plurality of procedures in the airport A and another procedure subsequent to the one procedure mean two procedures adjacent in the order of the plurality of procedures from a check-in procedure to boarding on an airplane, for example, and another procedure subsequent to one procedure means the next procedure to the one procedure. For example, specifically, when the security inspection procedure is one procedure, the immigration procedure is another procedure subsequent to the one procedure.

Note that the CPU 102 is not necessarily required to manage the status of the user U regarding all the above plurality of procedures and may manage the status of the user U regarding any one or more procedures out of the above procedures.

Further, the CPU 102 as the information management unit and the status management unit registers and manages the user information and the status on the user U in the first to fifth comparison information DBs 106*b*1 to 106*b*5 in addition to or instead of the user information DB 106*a* described above. The CPU 102 updates and manages the status of the user U registered in the first to fifth comparison information DBs 106*b*1 to 106*b*5 in the same manner as the case of the user information DB 106*a*. The CPU 102 registers the user information and the status on the user U to any of the first to fifth comparison information DBs 106*b*1 to 106*b*5 in accordance with the status of the user U updated according to a procedure of the user U as described above. The user information registered in the first to fifth comparison information DBs 106b1 to 106b5 may have the same content as the user information registered in the user information DB 106a, for example, and any information as long as it includes at least a registered face image.

More specifically, the CPU 102 registers, to the first comparison information DBs 106b1, the user information and the status on the user U having the completed status regarding a check-in procedure and the unfinished status regarding other procedures. The status regarding other procedures as used herein is the status regarding a baggage deposit procedure, a security inspection procedure, an immigration procedure, presence or passage in front of the signage terminal 60, and boarding on an airplane.

Once the status regarding a baggage deposit procedure of the user U whose user information is registered in the first comparison information DBs 106b1 is updated from an unfinished state to a completed state, the CPU 102 moves and registers the user information and the status on the user U of interest. That is, the CPU 102 moves and registers the user information and the status on the user U of interest from the first comparison information DBs 106b1 to the second comparison information DBs 106b2.

Further, the CPU 102 registers, to the second comparison information DBs 106b2, the user information and the status on the user U having the completed status regarding a check-in procedure and a baggage deposit procedure and the unfinished status regarding other procedures. The status regarding other procedures as used herein is the status regarding a security inspection procedure, an immigration procedure, presence or passage in front of the signage terminal 60, and boarding on an airplane.

Once the status regarding a security inspection procedure of the user U whose user information is registered in the second comparison information DBs 106b2 is updated from an unfinished state to a completed state, the CPU 102 moves and registers the user information and the status on the user U of interest. That is, the CPU 102 moves and registers the user information and the status on the user U of interest from the second comparison information DBs 106b2 to the third comparison information DBs 106b3.

Further, the CPU 102 registers, to the third comparison information DBs 106b3, the user information and the status on the user U having the completed status regarding a check-in procedure, a baggage deposit procedure, and a security inspection procedure and the unfinished status regarding other procedures.

The status regarding other procedures as used herein is the status regarding an immigration procedure, presence or passage in front of the signage terminal 60 and boarding on an airplane.

Once the status regarding an immigration procedure of the user U whose user information is registered in the third comparison information DBs 106b3 is updated from an unfinished state to a completed state, the CPU 102 moves and registers the user information and the status on the user U of interest. That is, the CPU 102 moves and registers the user information and the status on the user U of interest from the third comparison information DBs 106b3 to the fourth comparison information DBs 106b4.

Further, the CPU 102 registers, to the fourth comparison information DBs 106b4, the user information and the status on the user U having the completed status regarding a check-in procedure, a baggage deposit procedure, a security inspection procedure, and an immigration procedure and the unfinished status regarding other procedures. The status regarding other procedures as used herein is the status regarding presence or passage in front of the signage terminal 60, and boarding on an airplane.

Once the status regarding presence or passage in front of the signage terminal 60 by the user U whose user information is registered in the fourth comparison information DBs 106b4 is updated from an unfinished state to a completed state, the CPU 102 moves and registers the user information and the status on the user U of interest. That is, the CPU 102 moves and registers the user information and the status on the user U of interest from the fourth comparison information DBs 106b4 to the fifth comparison information DBs 106b5.

Further, the CPU 102 registers, to the fifth comparison information DBs 106b5, the user information and the status on the user U having the unfinished status regarding boarding on an airplane and the completed status regarding other procedures. The status regarding other procedures as used herein is the status regarding a check-in procedure, a baggage deposit procedure, a security inspection procedure, an immigration procedure, and presence or passage in front of the signage terminal 60.

Once the status regarding boarding on an airplane by the user U whose user information is registered in the fifth comparison information DBs 106b5 is updated from an unfinished state to a completed state, the CPU 102 deletes the user information and the status on the user of interest from the fifth comparison information DBs 106b5.

In such a way, in accordance with the status regarding the procedure of the user U corresponding to the user information including a registered face image, the CPU 102 registers the user information to a plurality of DBs, namely, the first to fifth comparison information DBs 106b1 to 106b5. That is, once the status regarding one procedure of a series of procedures after a check-in procedure becomes a completed state, the CPU 102 moves and registers the user information including the registered face image of the user of interest from one DB corresponding to the one procedure to another DB corresponding to another procedure subsequent to the one procedure. The CPU 102 uses a registered face image included in user information registered in the first to fifth comparison information DBs 106b1 to 106b5 for comparison in a baggage deposit procedure, a security inspection procedure, an immigration procedure, presence or passage in front of the signage terminal 60, and boarding on an airplane, respectively.

Further, the CPU 102 functions as a deadline setting unit that, based on boarding information on the user U, sets deadline time, which is predetermined time by which the user U has to complete a plurality of procedures of the user U including each procedure in the airport A. The procedures for which deadline time is set are a baggage deposit procedure, a security inspection procedure, an immigration procedure, and boarding on an airplane after a check-in procedure.

Further, the CPU 102 handles the presence or passage of the user U in front of the signage terminal 60 as a procedure for which deadline time is set. The CPU 102 sets deadline time for the plurality of procedures up to the boarding on an airplane by the user U.

The CPU 102 as the deadline setting unit calculates, from the departure time in the departure date and time included in boarding information on the user U, the boarding time when boarding on the airplane by the use U is closed. For example, the CPU 102 can calculate the time of 10 minutes before the departure time of an airplane as the boarding time. Further, the CPU 102 can acquire the boarding time included in the boarding information itself on the user U from the boarding information.

From the calculated or acquired boarding time, the CPU 102 as the deadline setting unit calculates, for each procedure each deadline time by which the user U has to complete each procedure of a baggage deposit procedure, a security inspection procedure, an immigration procedure, presence or passage in front of the signage terminal 60, and boarding on the airplane.

The CPU 102 can set respective deadlines for a plurality of procedures based on the order of the plurality of procedures up to the boarding on the airplane by the user U and the boarding information.

That is, the CPU 102 can set a later deadline of the procedure of interest for the order of the plurality of procedures up to the boarding on the airplane by the user U is closer to the boarding.

For example, the CPU 102 can calculate the time of 60 minutes before the boarding time as the deadline time for the baggage deposit procedure. Further, for example, the CPU 102 can calculate the time of 30 minutes before the boarding time as the deadline time for the security inspection procedure. Further, for example, the CPU 102 can calculate the time of 20 minutes before the boarding time as the deadline time for the immigration procedure. Further, for example, the CPU 102 can calculate the time of 15 minutes before the boarding time as the deadline time for the presence or passage in front of the signage terminal 60. Further, for example, the CPU 102 can calculate the time of 10 minutes before the boarding time as the deadline time for the boarding on the airplane. Note that the CPU 102 can calculate each deadline time for each procedure from the departure time itself included in the boarding information. Further, the CPU 102 can acquire the boarding time or the departure time with reference to a database or the like regarding the flight schedule from the flight number of the airplane included in the boarding information and calculate the deadline time for each procedure.

Note that the CPU 102 as the deadline setting unit may set deadline time in accordance with the number of users U who have performed the check-in procedure. That is, the CPU 102 may set a time period between the deadline time and the boarding time to be shorter when the number of users U who have performed the check-in procedure is larger.

Further, the CPU 102 as the deadline setting unit may appropriately change and set the deadline time for each procedure described above in accordance with the degree of congestion in the airport A, which is a facility in which the user U boards on an airplane, in other words, in accordance with the number of users U of the airport A. For example, the CPU 102 can determine the degree of congestion in the airport A based on the number of pieces of user information registered to the user information DB 106a per unit time. That is, when the number of pieces of user information registered to the user information DB 106a per unit time is larger, it can be determined that the airport A is more congested. When the airport A is more congested, the CPU 102 may set the deadline time to earlier time.

Further, the CPU 102 as the deadline setting unit stores in the user information DB 106a and manages the set deadline time for each procedure in association with the user information and the status on the user U in the user information DB 106a, for example. That is, the CPU 102 as the status management unit can manage the status of the user U regarding each procedure together with the deadline time that is a set deadline.

The CPU 102 as the deadline setting unit sets deadline time as deadlines for a check-in procedure, a security inspection procedure, an immigration procedure, presence or passage in front of the signage terminal 60, and boarding on an airplane, which are a plurality of procedures of the user U up to boarding, as described above. Note that the CPU 102 is not necessarily required to set deadline time for all the above plurality of procedures and may set deadline time for any one or more procedures out of the above procedures.

Further, the CPU 102 functions as a determination unit that, for each procedure of the user U up to boarding for which deadline time is set as described above, determines whether or not the deadline time has expired with the unfinished status. The CPU 102 as the determination unit can determine whether or not the deadline time has expired for an unfinished procedure regularly or irregularly, for example.

Further, the CPU 102 functions as an alert unit to generate and transmit an alert indicating that a procedure of the user U for which the deadline time is determined to expire with the unfinished status after the deadline time has expired. The CPU 102 as the alert unit may be transmitted to the operation terminal 80 carried by a staff member S. When the location of the user U is determined as described in a third example embodiment, for example, the CPU 102 may transmit an alert to the operation terminal 80 carried by the staff member S near the place. Furthermore, the CPU 102 may notify the operation terminals 80 carried by the nearby staff member S and other staff members S of the staff member S who is near the determined location of the user U or display the staff member S who is near the determined location of the user U on the operation terminals 80 carried by the nearby staff member S and other staff members S. Thereby, the CPU 102 can teach which staff member S is appropriate to address the alert.

For example, an alert may include a part or whole of the user information on the user U who has not yet completed the procedure, a part or whole of the boarding information, the status regarding each procedure, or the like. An alert may include a registered face image of the user U, preferably, a registered face image which is a captured face image of the user U captured by the check-in terminal 20. The staff member S who has received an alert by the operation terminal 80 is able to rely on a registered face image included in the alert to search for the user U who has not yet completed the procedure. Note that, while a registered face image included in an alert may be a passport face image of the user U, a registered face image included in an alert is preferably a captured face image captured by the check-in terminal 20 that indicates the recent face of the user U, namely, the face captured at the time of check-in procedure.

Further, the CPU 102 functions as a comparison unit that compares a face image of the user U when receiving a target face image and a comparison request or a target face image from the automatic baggage deposit machine 30, the security inspection apparatus 40, the automated gate apparatus 50, the signage terminal 60, and the boarding gate apparatus 70. The CPU 102 as the comparison unit compares, at 1:N, a target face image corresponding to target biometrics information with a plurality of registered face images corresponding to registered biometrics information registered in any of the first to fifth comparison information DBs 106b1 to 106b5. Pieces of user information on the plurality of users U who have performed the check-in procedure on the check-in terminal 20 are registered in the first to fifth comparison information DBs 106b1 to 106b5 in accordance with the status. When comparing a target face image with a registered face image, the CPU 102 can compare a face feature amount extracted from the target face image corresponding to target biometrics information with a face feature amount extracted from the registered face image corresponding to registered biometrics information and thereby compare both face images.

The CPU 102 as a comparison unit selects a plurality of registered face images to be compared with a target face image based on the status of the users U corresponding to the registered face images. That is, the CPU 102 compares target biometrics information acquired in a procedure with registered face images of the users U having the latest status of an unfinished state regarding a procedure in which a target face image has been acquired. Thus, the CPU 102 compares registered face images registered in a DB selected from the first to fifth comparison information DBs 106*b*1 to 106*b*5 with the target face image.

More specifically, when a target face image and a comparison request are received from the automatic baggage deposit machine 30, the CPU 102 as the comparison unit compares the received target face image with a plurality of registered face images registered in the first comparison information DB 106*b*1. In the first comparison information DB 106*b*1, registered face images of the users U having the completed status regarding the check-in procedure and the unfinished status regarding other procedures are registered.

Thereby, the CPU 102 can compare the target face image acquired in a baggage deposit procedure with registered face images of the users U having the completed status regarding the check-in procedure and the unfinished status regarding a baggage deposit procedure. Thus, the CPU 102 neither performs comparison with registered face images of the user U who have not yet completed a check-in procedure, which is a procedure immediately before the baggage deposit procedure, nor performs comparison with registered face images of the user U who have already completed the baggage deposit procedure. Therefore, unnecessary comparison with registered face images can be avoided in the comparison of the target face image acquired in a baggage deposit procedure.

Further, when a target face image and a comparison request are received from the security inspection apparatus 40, the CPU 102 as the comparison unit compares the received target face image with a plurality of registered face images registered in the second comparison information DB 106*b*2. In the second comparison information DB 106*b*2, registered face images of the users U having the completed status regarding the check-in procedure and the baggage deposit procedure and the unfinished status regarding other procedures are registered. Thereby, the CPU 102 can compare the target face image acquired in a security inspection procedure with registered face images of the users U having the completed status regarding the baggage deposit procedure and the unfinished status regarding a security inspection procedure. Thus, the CPU 102 neither performs comparison with registered face images of the user U who have not yet completed a baggage deposit procedure, which is a procedure immediately before the security inspection procedure, nor performs comparison with registered face images of the user U who have already completed the security inspection procedure. Therefore, unnecessary comparison with registered face images can be avoided in the comparison of the target face image acquired in a security inspection procedure.

Further, when a target face image and a comparison request are received from the automated gate apparatus 50, the CPU 102 as the comparison unit compares the received target face image with a plurality of registered face images registered in the third comparison information DB 106*b*3. In the third comparison information DB 106*b*3, registered face images of the users U having the completed status regarding the check-in procedure, the baggage deposit procedure, and the security inspection procedure and the unfinished status regarding other procedures are registered. Thereby, the CPU 102 can compare the target face image acquired in an immigration procedure with registered face images of the users U having the completed status regarding the security inspection procedure and the unfinished status regarding an immigration procedure. Thus, the CPU 102 neither performs comparison with registered face images of the user U who have not yet completed a security inspection procedure, which is a procedure immediately before the immigration procedure, nor performs comparison with registered face images of the user U who have already completed the immigration procedure. Therefore, unnecessary comparison with registered face images can be avoided in the comparison of the target face image acquired in an immigration procedure.

Further, when a target face image is received from the signage terminal 60, the CPU 102 as the comparison unit compares the received target face image with a plurality of registered face images registered in the fourth comparison information DB 106*b*4. In the fourth comparison information DB 106*b*4, registered face images of the users U having the completed status regarding the check-in procedure, the baggage deposit procedure, the security inspection procedure, and the immigration procedure and the unfinished status regarding other procedures are registered. Thereby, the CPU 102 can compare the target face image acquired in presence or passage in front of the signage terminal 60 with registered face images of the users U having the completed status regarding the immigration procedure and the unfinished status regarding presence or passage in front of the signage terminal 60. Thus, the CPU 102 neither performs comparison with registered face images of the user U who have not yet completed an immigration procedure, which is a procedure immediately before the presence or passage in front of the signage terminal 60, nor performs comparison with registered face images of the user U who have already completed the presence or passage in front of the signage terminal 60. Therefore, unnecessary comparison with registered face images can be avoided in the comparison of the target face image acquired in presence or absence in front of the signage terminal 60.

Further, when a target face image is received from the boarding gate apparatus 70, the CPU 102 as the comparison unit compares the received target face image with a plurality of registered face images registered in the fifth comparison information DB 106*b*5. In the fifth comparison information DB 106*b*5, registered face images of the users U having the unfinished status regarding boarding on an airplane and the completed status regarding other procedures are registered. Thereby, the CPU 102 can compare the target face image acquired in boarding on an airplane with registered face images of the users U having the completed status regarding the presence or passage in front of the signage terminal 60 and the unfinished status regarding boarding on an airplane. Thus, the CPU 102 neither performs comparison with registered face images of the user U who have not yet completed presence or passage in front of the signage terminal 60, which is a procedure immediately before the boarding on the airplane, nor performs comparison with registered face images of the user U who have already completed the boarding on the airplane. Therefore, unnecessary comparison with registered face images can be avoided in the comparison of the target face image acquired in boarding on an airplane.

A series of procedures up to boarding on an airplane include one procedure and another procedure subsequent thereto. The CPU 102 as the comparison unit compares a target face image acquired in another procedure with registered face images of the users U having the completed status regarding one procedure and the unfinished status regarding another procedure.

The CPU 102 as the comparison unit selects and uses the first to fifth comparison information DBs 106*b*1 to 106*b*5 in which user information in accordance with the status of the users U is registered as DBs of registered face images to be compared with a target face image in accordance with each procedure as described above. Thus, according to the present example embodiment, it is possible to reduce the number of multiple registered face images, which are populations to be compared with a target face image, and improve the accuracy in comparison of a face image that is biometrics information.

The CPU 102 as the comparison unit attempts to find a registered face image which matches a target face image out of a plurality of registered face images by comparison between a target face image and a plurality of registered face images in the first to fifth comparison information DBs 106*b*1 to 106*b*5, respectively. The CPU 102 also functions as a transmission unit to transmit comparison result information indicating a result of comparison to each apparatus of the automatic baggage deposit machine 30, the security inspection apparatus 40, the automated gate apparatus 50, and the boarding gate apparatus 70 which have transmitted a comparison request. The comparison result information indicates that there is a matching in the comparison or there is no matching in the comparison. That is, the comparison result information indicates that a registered face image matching a target face image was found and identity verification of the user U performing a baggage deposit procedure succeeded or that no matching registered face image was found and identity verification of the user U failed as a result of the comparison. Note that the CPU 102 may compare a target face image with registered images in respective ones or any one of the first to fifth comparison information DBs 106*b*1 to 106*b*5.

Further, instead of the CPU 202 of the check-in terminal 20, the CPU 102 may also compare, at 1:1, a captured face image captured by the biometrics information acquisition device 214 with a passport face image acquired by the medium reading device 212. In such a case, the CPU 102 receives a captured face image and a passport face image to be compared or a face feature amount thereof from the check-in terminal 20. Further, the CPU 102 transmits comparison result information indicating a result of the comparison between the captured face image and the passport face image to the check-in terminal 20.

The storage device 106 is formed of a storage medium such as a non-volatile memory, a hard disk drive, or the like and functions as a storage unit. The storage device 106 stores a program executed by the CPU 102, data referenced by the CPU 102 when the program is executed, or the like.

Further, the storage device 106 stores the user information DB 106*a* and the first to fifth comparison information DBs 106*b*1 to 106*b*5. In the user information DB 106*a*, the whole user information of the plurality of users U who have performed a check-in procedure on the check-in terminal 20 is registered. Also, in the user information DB 106*a*, the status of the users U is registered in the user information DB 106*a* in association with user information. In the first to fifth comparison information DBs 106*b*1 to 106*b*5, the user information and the status in accordance with the status of respective users U are registered. Note that the storage device 106 may store both the user information DB 106*a* and the first to fifth comparison information DBs 106*b*1 to 106*b*5 or may store only the first to fifth comparison information DBs 106*b*1 to 106*b*5.

The communication unit 108 is connected to the network NW and transmits and receives data via the network NW. The communication unit 108 communicates with the check-in terminal 20, the automatic baggage deposit machine 30, the security inspection apparatus 40, the automated gate apparatus 50, the signage terminal 60, the boarding gate apparatus 70, or the like under the control of the CPU 102.

In such a way, the management server 10 is configured.

Figure 9:
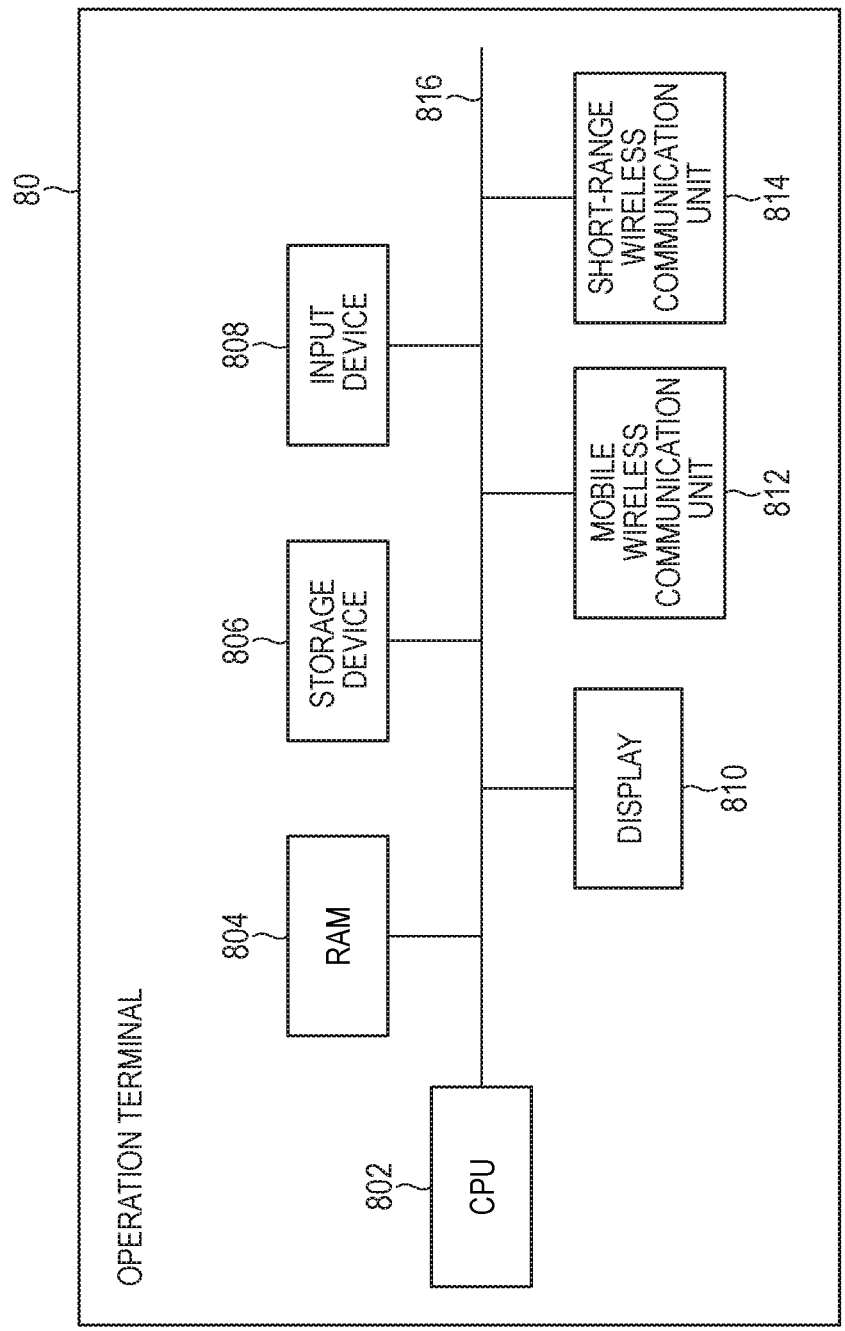
FIG. 9 is a block diagram illustrating one example of the hardware configuration of an operation terminal according to the first example embodiment of the present invention.

Next, the configuration of the operation terminal 80 will be described by using FIG. 9. FIG. 9 is a block diagram illustrating one example of the hardware configuration of the operation terminal 80. The operation terminal 80 is a terminal carried by the staff member S such as a staff of the airline company, a staff of an airport company, or the like to use for their operation and may be, for example, a tablet terminal, a smartphone, a mobile phone, or the like. Note that the operation terminal 80 may be, for example, a stationary type information processing terminal installed in an operation place such as a counter where a staff engages in their operation.

As illustrated in FIG. 9, the operation terminal 80 has a CPU 802, a RAM 804, a storage device 806, an input device 808, a display 810, a mobile communication unit 812, and a short-range wireless communication unit 814. The CPU 802, the RAM 804, the storage device 806, the input device 808, the display 810, the mobile communication unit 812, and the short-range wireless communication unit 814 are connected to a bus line 816.

The CPU 802 functions as a control unit that operates by executing a program stored in the storage device 806 and controls the operation of the entire operation terminal 80. Further, the CPU 802 executes an application program stored in the storage device 806 to perform various processes as the operation terminal 80. The RAM 804 provides a memory field necessary for the operation of the CPU 802.

More specifically, the CPU 802 functions as an information acquisition unit and can access the user information DB 106*a* of the management server 10 to acquire the user information and the status on the user U stored in the user information DB 106*a*. The CPU 802 as the information acquisition unit can cause the display 810 to display the acquired user information and status.

Further, the CPU 802 function as an alert receiving unit and can receive an alert transmitted from the management server 10. The CPU 802 as the alert receiving unit can cause the display 810 to display the received alert.

The storage device 806 is formed of a storage medium such as a non-volatile memory, a hard disk drive, or the like and functions as a storage unit. The storage device 806 stores a program executed by the CPU 802, data referenced by the CPU 802 when the program is executed, or the like.

The input device 808 is a touchscreen embedded in the display 810, for example. The input device 808 functions as an input unit that accepts input of an instruction from the staff member S. The staff member S is able to input various information or input an instruction of execution of a process to the operation terminal 80 via the input device 808.

The display 810 functions as a display unit that displays various windows to the staff member S. For example, the display 810 displays a window indicating the content of the user information and the status on the user U stored in the user information DB 106a, a window indicating the contents of an alert received from the management server 10, or the like.

The mobile communication unit 812 is connected to the network NW via a mobile communication network under the control of the CPU 802. Without being limited in particular, the communication scheme of the mobile communication unit 812 may be, for example, the third generation mobile communication scheme, the Long Term Evolution (LTE) scheme, the fourth generation mobile communication scheme, or the like.

The short-range wireless communication unit 814 performs wireless communication with an access point, an external device, or the like under the control of the CPU 802 and is connected to the network NW via an access point in a premise of the airport A, for example. Without being limited in particular, the communication scheme of the short-range wireless communication unit 814 may be, for example, a wireless LAN scheme such as Wi-Fi (registered trademark), a Bluetooth (registered trademark) communication scheme, a Near Field Communication (NFC) scheme, an infrared communication scheme, or the like.

In such a way, the operation terminal 80 is configured.

The information processing system 1 according to the present example embodiment selectively uses the first to fifth comparison information DBs 106b1 to 106b5 in which user information in accordance with the status of the users U is registered as the DB of registered face images to be compared with a target face image in accordance with each procedure in the management server 10. Thus, according to the present example embodiment, it is possible to reduce the number of multiple registered face images, which are populations to be compared with a target face image, and improve the accuracy in comparison.

Further, the information processing system 1 according to the present example embodiment sets deadline time for each procedure up to boarding based on boarding information acquired by the check-in terminal 20 for the user U scheduled to board an airplane and manages the status of the user U regarding each procedure in the management server 10. Therefore, according to the information processing system 1 of the present example embodiment, it is possible to recognize and manage in more detail the status of the user U scheduled to board an airplane.

Further, in the information processing system 1 according to the present example embodiment, when deadline time has expired with the status of a procedure still being in an unfinished state, the management server 10 generates an alert indicating the expiration and transmits the alert to the operation terminal 80. Further, the alert includes a registered face image of the user U. Therefore, according to the information processing system 1 of the present example embodiment, the staff member S is able to rely on the registered face image of the user U and easily search for the user U who has not yet completed the procedure.

The operation of each component in the information processing system 1 according to the present example embodiment will be further described below by using FIG. 10 to FIG. 25C.

Figure 10:
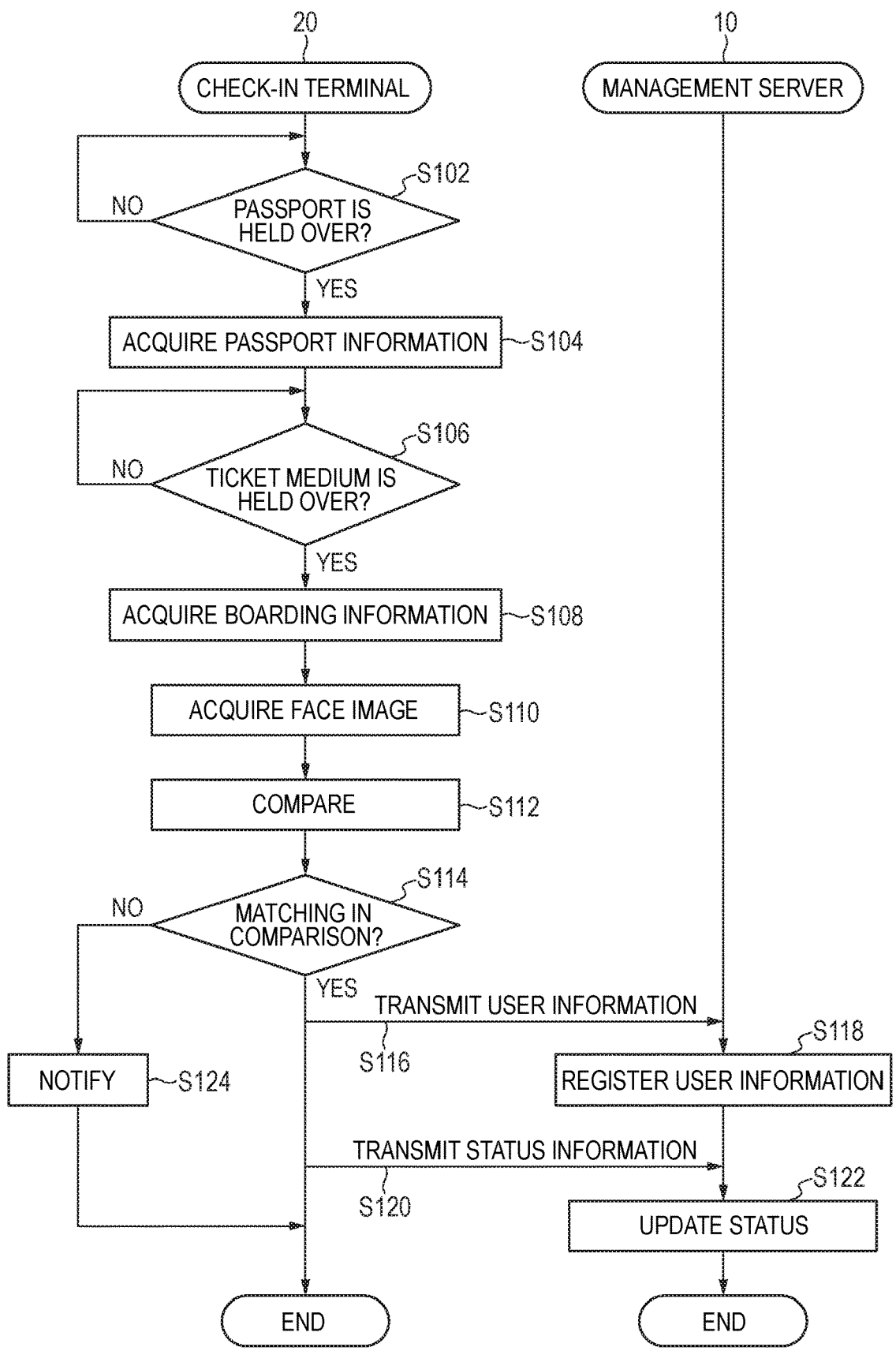
FIG. 10 is a sequence diagram illustrating the operation performed by the check-in terminal and the management server in the information processing system according to the first example embodiment of the present invention.

First, the operation performed by the check-in terminal 20 will be described by using FIG. 10 together with the operation performed by the management server 10. FIG. 10 is a sequence diagram illustrating the operation performed by the check-in terminal 20 and the management server 10.

The user U who arrived at the airport A moves to the check-in lobby P1 and performs a check-in procedure on the check-in terminal 20. The check-in terminal 20 and the management server 10 perform a process illustrated in FIG. 10 every time each of the plurality of users U performs a check-in procedure.

As illustrated in FIG. 10, the medium reading device 212 of the check-in terminal 20 determines whether or not a passport of the user U is held over the reading unit (step S102) and waits until a passport is held over (step S102, NO).

In response to determining that a passport is held over (step S102, YES), the medium reading device 212 acquires passport information on the user U from the held passport (step S104). The acquired passport information includes a passport face image of the user U. At this time, the medium reading device 212 can also acquire identity information on the user U from the passport.

Next, the medium reading device 212 determines whether or not a flight ticket medium of the user U is held over the reading unit (step S106) and waits until a flight ticket medium is held over (step S106, NO).

In response to determining that a boarding pass medium is held over (step S106, YES), the medium reading device 212 acquires boarding information on the user U from the held flight ticket medium (step S108). At this time, the medium reading device 212 can also acquire identity information on the user U from the flight ticket medium.

Note that the order of step S104 of acquiring passport information, step S108 of acquiring boarding information, and step S110 of acquiring a face image is not limited to the above. Some steps of steps S104, S108, and S110 may be performed in earlier order, or a combination of all or some of steps S104, S108, and S110 may be performed at the same time.

Next, the biometrics information acquisition device 214 of the check-in terminal 20 captures the face of the user U standing in front of the check-in terminal 20 and acquires a captured face image, which is a face image of the user U (step S110).

Next, the CPU 202 of the check-in terminal 20 compares, at 1:1, a captured face image captured by the biometrics information acquisition device 214 with the passport face image acquired by the medium reading device 212 (step S112).

As a result of the comparison, if the CPU 202 determines that there is a matching in the comparison between the captured face image and the passport face image and identity verification is successful (step S114, YES), the CPU 202 transmits the user information on the user U to the management server 10 via the network NW (step S116). The user information includes identity information, face information, and boarding information on the user U associated with each other.

In response to receiving user information from the check-in terminal 20, the CPU 102 of the management server 10 registers the received user information to the user information DB 106a (step S118). The CPU 102 registers a captured face image or a passport face image included in user information to the user information DB 106a as a registered face image. In such a way, the check-in terminal 20 completes a check-in procedure on the user U. The user U who has completed a check-in procedure moves to the baggage counter P2 if it is necessary to deposit baggage or, if not, moves to the security inspection site P3.

Furthermore, the CPU 202 of the check-in terminal 20 transmits, to the management server 10 via the network NW, status information on the user U indicating that the check-in procedure is completed after the comparison of a face image after the transmission or along with the transmission of user information (step S120).

In response to receiving status information from the check-in terminal 20, which is the external apparatus, the CPU 102 of the management server 10 updates the status of the user U of interest regarding the check-in procedure in the user information DB 106*a* from an unfinished state to a completed state (step S122). In such a way, the CPU 102 manages the status of the user U regarding the check-in procedure based on a comparison result with a passport face image of a captured face image acquired at a check-in procedure. That is, when there is a matching in the comparison between a captured face image acquired at a check-in procedure and a passport face image, the CPU 102 updates the status of the user U of interest regarding a check-in procedure from an unfinished state to a completed state.

Further, the CPU 102 registers, to the first comparison information DB 106*b*1, the user information and the status on the user U of interest whose status regarding a check-in procedure has been updated from an unfinished state to a completed state.

On the other hand, as a result of the comparison, if there is no matching in the comparison between a captured face image and a passport face image and the CPU determines that identity verification fails (step S114, NO), the CPU 202 notifies the user U that the identity verification failed (step S124). At this time, the CPU 202 causes the display 210 to display a notification window notifying that the identity verification failed. Note that the CPU 202 may notify the user U that the identity verification failed by using a voice, for example, in addition to the display of the notification window or instead of the display of the notification window.

In such a way, a check-in procedure by the user U is performed on the check-in terminal 20.

Note that the user U may perform a check-in procedure at a manned check-in counter instead of a check-in procedure with the check-in terminal 20. In such a case, a terminal operated by a staff member in the check-in counter can perform the same process as that of the check-in terminal 20 described above. Further, the user U may utilize online check-in performed from a website of an airline company instead of a check-in procedure with the check-in terminal 20.

In such a case, for example, the user U may separately register a face image as a registered face image from a dedicated terminal installed in the airport A to the user information DB 106*a* of the management server 10.

The CPU 102 of the management server 10 sequentially moves and registers the user information and the status on the user U registered in the user information DB 106*a* as described above to the first to fifth comparison information DBs 106*b*1 to 106*b*5 in accordance with the status of the user U.

Figure 11:
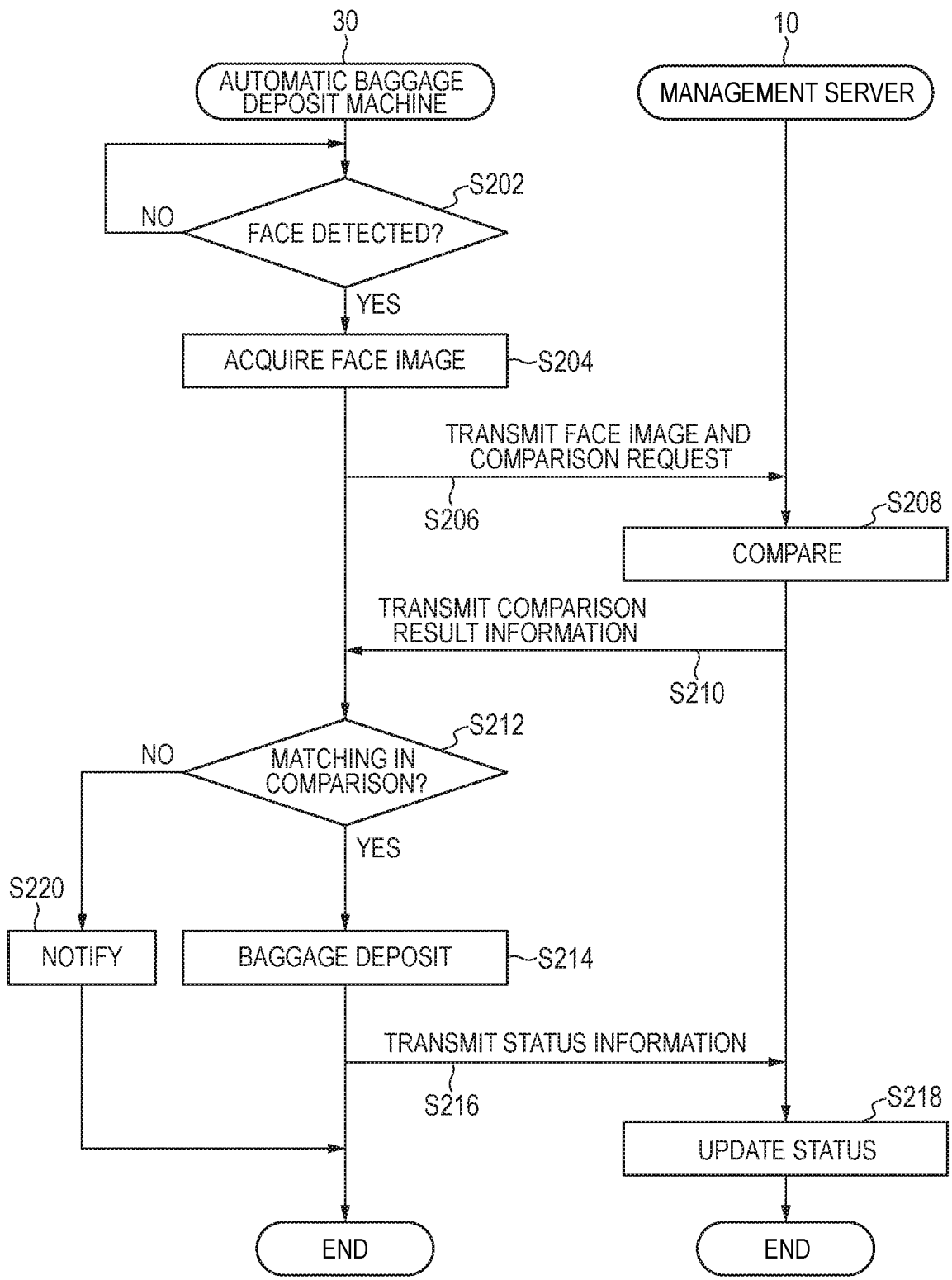
FIG. 11 is a sequence diagram illustrating the operation performed by the automatic baggage deposit machine and the management server in the information processing system according to the first example embodiment of the present invention.

Next, the operation performed by the automatic baggage deposit machine 30 will be described by using FIG. 11 together with the operation performed by the management server 10. FIG. 11 is a sequence diagram illustrating the operation performed by the automatic baggage deposit machine 30 and the management server 10.

The user U who has completed a check-in procedure moves to the baggage counter P2 if necessary and performs a baggage deposit procedure with the automatic baggage deposit machine 30. The automatic baggage deposit machine 30 and the management server 10 perform the process illustrated in FIG. 11 every time each of the plurality of users U performs a baggage deposit procedure.

As illustrated in FIG. 11, the biometrics information acquisition device 312 of the automatic baggage deposit machine 30 continuously or periodically captures a front area of the automatic baggage deposit machine 30 and determines whether or not a face of the user U standing in front of the automatic baggage deposit machine 30 is detected in the captured image (step S202). The biometrics information acquisition device 312 waits until a face of the user U is detected in the image (step S202, NO).

If the biometrics information acquisition device 312 determines that a face of the user U is detected (step S202, YES), the biometrics information acquisition device 312 captures the face of the user U and acquires the face image of the user U as a target face image (step S204).

Next, the CPU 302 of the automatic baggage deposit machine 30 transmits the target face image of the user U captured by the biometrics information acquisition device 312 to the management server 10 via the network NW together with a comparison request (step S206). Thereby, the CPU 302 requests the management server 10 to compare, at 1:N, the target face image of the user U captured by the biometrics information acquisition device 312 with a plurality of registered face images registered in the first comparison information DB 106*b*1 of the management server 10.

In response to receiving a target face image and a comparison request from the automatic baggage deposit machine 30, the CPU 102 of the management server 10 performs comparison of the face image of the user U (step S208). The CPU 102 compares, at 1:N, a target face image received from the automatic baggage deposit machine 30 with a plurality of registered face images registered in the first comparison information DB 106*b*1.

Next, the CPU 102 transmits comparison result information indicating a result of the comparison to the automatic baggage deposit machine 30 via the network NW (step S210).

The CPU 302 of the automatic baggage deposit machine 30 receives comparison result information from the management server 10. If the comparison result information indicates that a registered face image matching the target face image is found and identity verification of the user U performing the baggage deposit procedure is successful (step S212, YES), the CPU 302 performs a baggage deposit process on the user U (step S214). In the deposit process, the CPU 302 acquires boarding information or passport information associated with the registered face image matching the target face image to use the boarding information or passport information in the deposit process. The CPU 302 controls each unit of the automatic baggage deposit machine 30. Thereby, the output device 316 outputs a baggage tag and a baggage claim tag in association with the boarding information or the passport information associated with the registered face image. Further, the baggage transport apparatus 314 transports baggage, which is placed on a receiving part by the user U and attached with the baggage tag, to a cargo sorting site. The user U who has deposited baggage moves to the security inspection site P3.

Next, the CPU 302 transmits, to the management server 10 via the network NW, status information on the user U indicating that the baggage deposit procedure is completed after the comparison of the face image (step S216).

In response to receiving status information from the automatic baggage deposit machine 30, which is an external apparatus, the CPU 102 of the management server 10 updates the status of the user U of interest regarding the baggage deposit procedure in the user information DB 106a from an unfinished state to a completed state (step S218). In such a way, the CPU 102 manages the status of the user U regarding the baggage deposit procedure based on a result of the comparison between a target face image acquired in the baggage deposit procedure and a registered face image.

That is, when there is a matching in the comparison between a target face image acquired in a baggage deposit procedure and registered face images, the CPU 102 updates the status of the user U of interest regarding the baggage deposit procedure from an unfinished state to a completed state.

Further, the CPU 102 moves and registers, from the first comparison information DB 106b1 to the second comparison information DB 106b2, the user information and the status on the user U of interest whose status regarding a baggage deposit procedure has been updated from an unfinished state to a completed state.

On the other hand, if the comparison result information indicates that no matching registered face image is found and identity verification of the user U fails (step S212, NO), the CPU 302 of the automatic baggage deposit machine 30 notifies the user U that the identity verification failed (step S220). At this time, the CPU 302 causes the display 310 to display a notification window notifying that the identity verification failed. Note that the CPU 302 may notify the user U that the identity verification failed by using a voice, for example, in addition to the display of the notification window or instead of the display of the notification window. When identity verification failed in such a way, a baggage deposit process may be performed with a normal process by causing a medium reading device (not illustrated) to read a boarding pass or a passport.

In such a way, a baggage deposit procedure is performed at the automatic baggage deposit machine 30.

Figure 12:
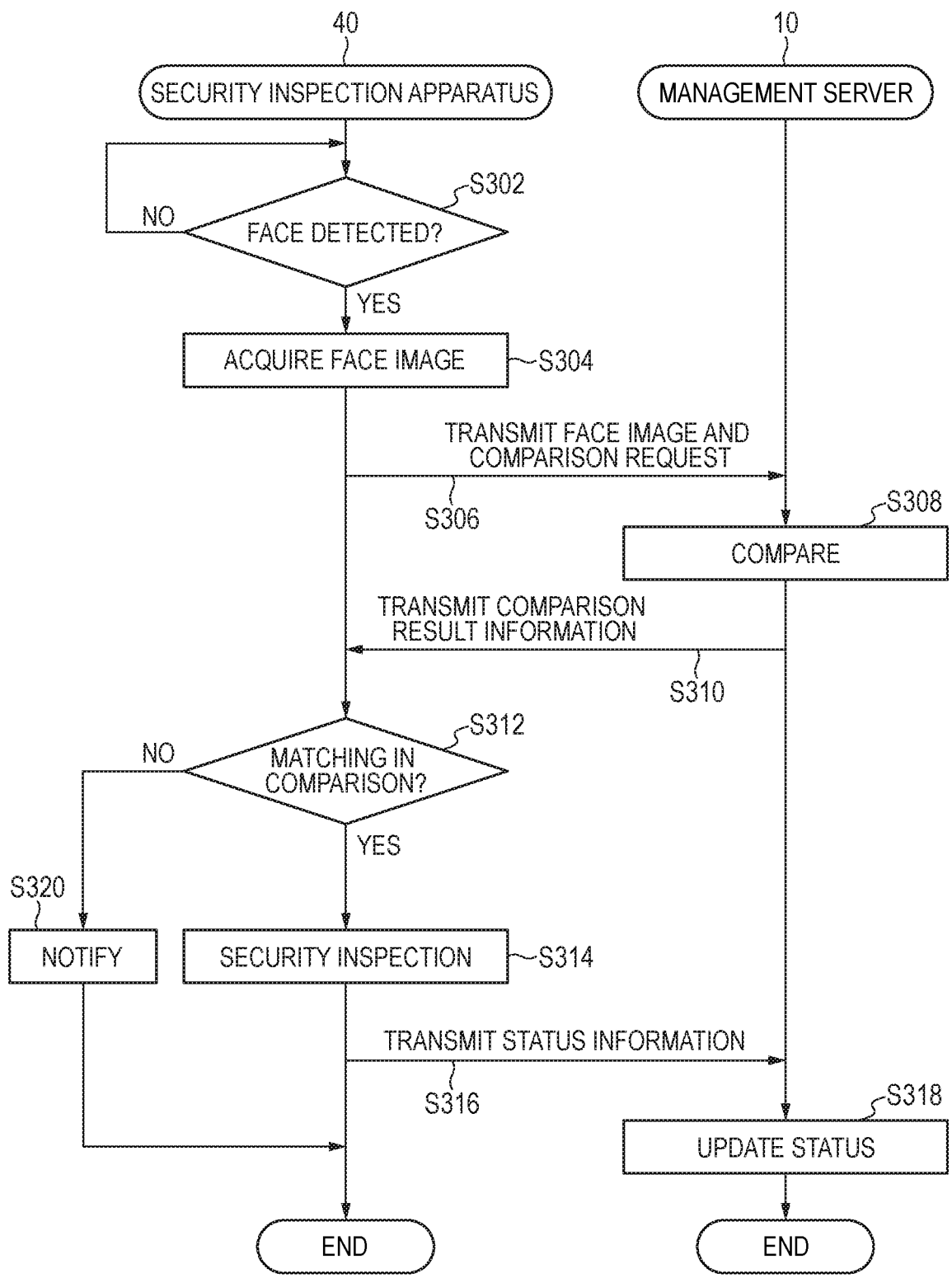
FIG. 12 is a sequence diagram illustrating the operation performed by the security inspection apparatus and the management server in the information processing system according to the first example embodiment of the present invention.

Next, the operation performed by the security inspection apparatus 40 will be described by using FIG. 12 together with the operation performed by the management server 10. FIG. 12 is a sequence diagram illustrating the operation performed by the security inspection apparatus 40 and the management server 10.

The user who has completed the check-in procedure and completed the baggage deposit procedure as necessity moves to the security inspection site P3 and is subjected to a security inspection procedure by the security inspection apparatus 40. The security inspection apparatus 40 and the management server 10 perform the process illustrated in FIG. 12 every time each of the plurality of users U is subjected to the security inspection procedure.

As illustrated in FIG. 12, the biometrics information acquisition device 412 of the security inspection apparatus 40 continuously or periodically captures a front area of the metal detector gate 414 and determines whether or not a face of the user U standing in front of the metal detector gate 414 is detected in the captured image (step S302). The biometrics information acquisition device 412 waits until a face of the user U is detected in the image (step S302, NO).

If the biometrics information acquisition device 412 determines that a face of the user U is detected (step S302, YES), the biometrics information acquisition device 412 captures the face of the user U and acquires the face image of the user U as a target face image (step S304).

Next, the CPU 402 of the security inspection apparatus 40 transmits the target face image of the user U captured by the biometrics information acquisition device 412 to the management server 10 via the network NW together with a comparison request (step S306). Thereby, the CPU 402 requests the management server 10 to compare, at 1:N, the target face image of the user U captured by the biometrics information acquisition device 412 with a plurality of registered face images registered in the second comparison information DB 106b2 of the management server 10.

In response to receiving a target face image and a comparison request from the security inspection apparatus 40, the CPU 102 of the management server 10 performs comparison of the face image of the user U (step S308). The CPU 102 compares, at 1:N, a target face image received from the security inspection apparatus 40 with a plurality of registered face images registered in the second comparison information DB 106b2.

Next, the CPU 102 transmits comparison result information indicating a result of the comparison to the security inspection apparatus 40 via the network NW (step S310).

The CPU 402 of the security inspection apparatus 40 receives comparison result information from the management server 10. If the comparison result information indicates that a registered face image matching the target face image is found and identity verification of the user U subjected to the security inspection procedure is successful (step S312, YES), the CPU 402 performs a security inspection process of the user U (step S314). In the security inspection process, the CPU 402 controls each unit of the security inspection apparatus 40. Thereby, the metal detector gate 414 detects a metal worn by the user U who is passing through the metal detector gate 414. The user U who has passed through the metal detector gate 414 moves to the immigration site P4.

Next, the CPU 402 transmits, to the management server 10 via the network NW, status information on the user U indicating that the security inspection procedure is completed after the comparison of the face image (step S316).

In response to receiving status information from the security inspection apparatus 40, which is an external apparatus, the CPU 102 of the management server 10 updates the status of the user U of interest regarding the security inspection procedure in the user information DB 106a from an unfinished state to a completed state (step S318). In such a way, the CPU 102 manages the status of the user U regarding the security inspection procedure based on a result of the comparison between a target face image acquired in the security inspection procedure and a registered face image. That is, when there is a matching in the comparison between a target face image acquired in a security inspection procedure and registered face images, the CPU 102 updates the status of the user U of interest regarding the security inspection procedure from an unfinished state to a completed state.

Further, the CPU 102 moves and registers, from the second comparison information DB 106b2 to the third comparison information DB 106b3, the user information and the status on the user U of interest whose status regarding a security inspection procedure has been updated from an unfinished state to a completed state.

On the other hand, if the comparison result information indicates that no matching registered face image is found and identity verification of the user U fails (step S312, NO), the CPU 402 of the security inspection apparatus 40 notifies the user U that the identity verification failed (step S320). At this time, the CPU 402 causes the display 410 to display a notification window notifying that the identity verification failed. Note that the CPU 402 may notify the user U that the identity verification failed by using a voice, for example, in addition to the display of the notification window or instead of the display of the notification window.

In such a way, a security inspection procedure is performed by the security inspection apparatus 40.

Figure 13:
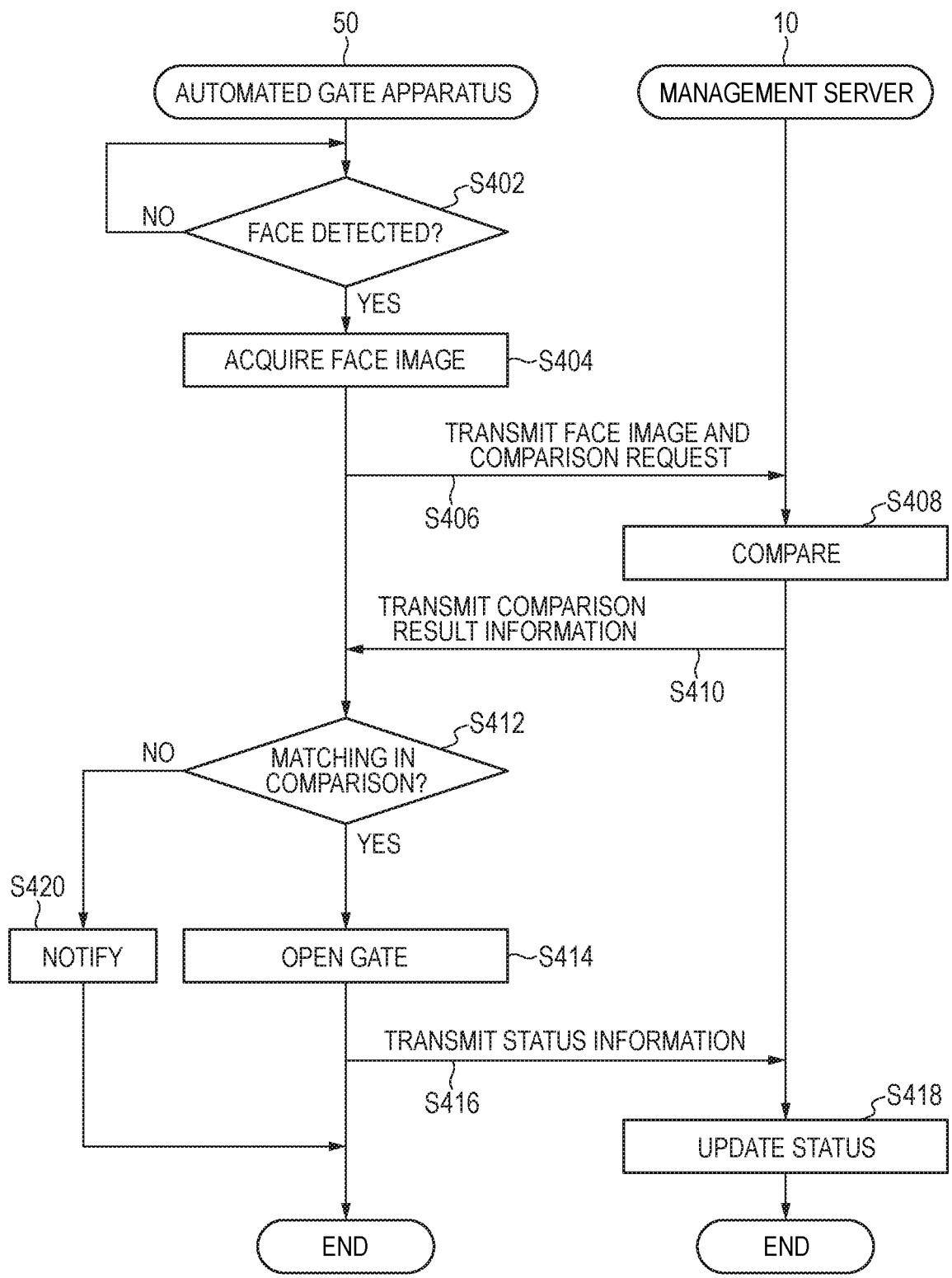
FIG. 13 is a sequence diagram illustrating the operation performed by the automated gate apparatus and the management server in the information processing system according to the first example embodiment of the present invention.

Next, the operation performed by the automated gate apparatus 50 will be described by using FIG. 13 together with the operation performed by the management server 10. FIG. 13 is a sequence diagram illustrating the operation performed by the automated gate apparatus 50 and the management server 10.

The user U who has completed the security inspection procedure moves to the immigration site P4 and is subjected to an immigration procedure by the automated gate apparatus 50. The automated gate apparatus 50 and the management server 10 perform the process illustrated in FIG. 13 every time each of the plurality of users U is subjected to the immigration procedure.

As illustrated in FIG. 13, the biometrics information acquisition device 512 of the automated gate apparatus 50 continuously or periodically captures a front area of the automated gate apparatus 50 and determines whether or not a face of the user U standing in front of the automated gate apparatus 50 is detected in the captured image (step S402). The biometrics information acquisition device 512 waits until a face of the user U is detected in the image (step S402, NO).

If the biometrics information acquisition device 512 determines that a face of the user U is detected (step S402, YES), the biometrics information acquisition device 512 captures the face of the user U and acquires the face image of the user U as a target face image (step S404).

Next, the CPU 502 of the automated gate apparatus 50 transmits the target face image of the user U captured by the biometrics information acquisition device 512 to the management server 10 via the network NW together with a comparison request (step S406).

Thereby, the CPU 502 requests the management server 10 to compare, at 1:N, the target face image of the user U captured by the biometrics information acquisition device 512 with a plurality of registered face images registered in the third comparison information DB 106*b*3 of the management server 10.

In response to receiving a target face image and a comparison request from the automated gate apparatus 50, the CPU 102 of the management server 10 performs comparison of the face image of the user U (step S408). The CPU 102 compares, at 1:N, a target face image received from the automated gate apparatus 50 with a plurality of registered face images registered in the third comparison information DB 106*b*3.

Next, the CPU 102 transmits comparison result information indicating a result of the comparison to the automated gate apparatus 50 via the network NW (step S410).

The CPU 502 of the automated gate apparatus 50 receives comparison result information from the management server 10. If the comparison result information indicates that a registered face image matching the target face image is found and identity verification of the user U subjected to the immigration procedure is successful (step S412, YES), the CPU 502 performs an opening process of the gate 514 (step S414) Thereby, the CPU 502 transfers the gate 514 from a closed state for standby that blocks passage of the user U to an opened state that allows passage of the user U. The user U passes through the opened gate 514 and moves to the boarding gate P6.

Next, the CPU 502 transmits, to the management server 10 via the network NW, status information indicating that the immigration procedure on the user U is completed after the comparison of the face image (step S416).

In response to receiving status information from the automated gate apparatus 50, which is an external apparatus, the CPU 102 of the management server 10 updates the status of the user U of interest regarding the immigration procedure in the user information DB 106*a* from an unfinished state to a completed state (step S418). In such a way, the CPU 102 manages the status of the user U regarding the immigration procedure based on a result of the comparison between a target face image acquired in the immigration procedure and a registered face image. That is, when there is a matching in the comparison between a target face image acquired in an immigration procedure and registered face images, the CPU 102 updates the status of the user U of interest regarding the immigration procedure from an unfinished state to a completed state.

Further, the CPU 102 moves and registers, from the third comparison information DB 106*b*3 to the fourth comparison information DB 106*b*4, the user information and the status on the user U of interest whose status regarding an immigration procedure has been updated from an unfinished state to a completed state.

On the other hand, if the comparison result information indicates that no matching registered face image is found and identity verification of the user U fails (step S412, NO), the CPU 502 of the automated gate apparatus 50 notifies the user U that the identity verification failed (step S420). At this time, the CPU 502 causes the display 510 to display a notification window notifying that the identity verification failed.

Note that the CPU 502 may notify the user U that the identity verification failed by using a voice, for example, in addition to the display of the notification window or instead of the display of the notification window.

In such a way, an immigration procedure is performed by the automated gate apparatus 50.

Figure 14:
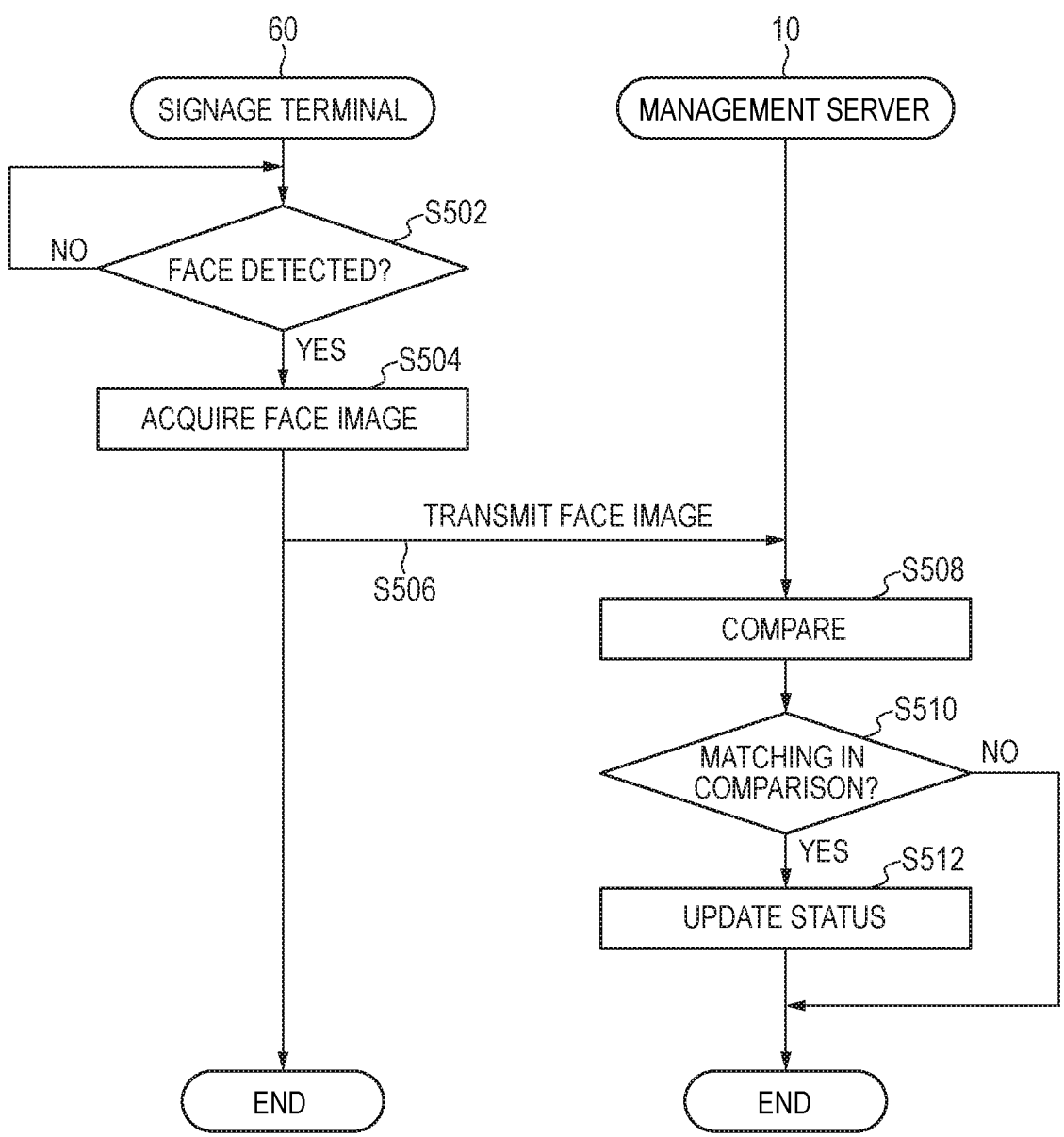
FIG. 14 is a sequence diagram illustrating the operation performed by the signage terminal and the management server in the information processing system according to the first example embodiment of the present invention.

Next, the operation performed by the signage terminal 60 will be described by using FIG. 14 together with the operation performed by the management server 10. FIG. 14 is a sequence diagram illustrating the operation performed by the signage terminal 60 and the management server 10.

The user U who has completed the immigration procedure passes through the passage P5 on which the signage terminal 60 is installed and moves to the boarding gate P6. At this time, the user U passes by in front of the signage terminal 60 or once stops to be present in front of the signage terminal 60 to check the guide showing the direction to the boarding gate P6 displayed on the signage terminal 60. The signage terminal 60 and the management server 10 perform the process illustrated in FIG. 14 every time each of the plurality of users U passes by in front of the signage terminal 60 or is present in front of the signage terminal 60.

As illustrated in FIG. 14, the biometrics information acquisition device 610 of the signage terminal 60 continuously or periodically captures a front area of the signage terminal 60 and determines whether or not a face of the user U in front of the signage terminal 60 is detected in the captured image (step S502). The user U in front of the signage terminal 60 is the user U who passes by the area in front of the signage terminal 60 or is present in front of the signage terminal 60. The biometrics information acquisition device 610 waits until a face of the user U is detected in the image (step S502, NO).

If the biometrics information acquisition device 610 determines that a face of the user U is detected (step S502, YES), the biometrics information acquisition device 610 captures the face of the user U and acquires the face image of the user U as a target face image (step S504).

Next, the CPU 602 of the signage terminal 60 transmits the target face image of the user U captured by the biometrics information acquisition device 610 to the management server 10 via the network NW (step S506).

In response to receiving a target face image from the signage terminal 60, which is an external apparatus, the CPU 102 of the management server 10 performs comparison of the face image of the user U (step S508). The CPU 102 compares, at 1:N, a target face image received from the signage terminal 60 with a plurality of registered face images registered in the fourth comparison information DB 106b4.

Note that the CPU 602 of the signage terminal 60 can be configured to stream a video of the front area of the signage terminal 60 to the management server 10. In such a case, the CPU 102 of the management server 10 may detect and acquire a target face image of the user U from the video streamed from the signage terminal 60 instead of receiving a target face image from the signage terminal 60.

As a result of the comparison, if a registered face image matching the target face image is found and the user U in front of the signage terminal 60 is identified (step S510, YES), the CPU 102 updates the status of the user U of interest (step S512). That is, the CPU 102 updates the status of the user U of interest regarding the presence or passage in front of the signage terminal 60 in the user information DB 106a from an unfinished state to a completed state. In such a way, the CPU 102 manages the status of the user U regarding the presence or passage in front of the signage terminal 60 based on a result of the comparison between a target face image acquired in the presence or passage in front of the signage terminal 60 and the registered face images. That is, when there is a matching in the comparison between the target face image acquired in the presence or passage in front of the signage terminal 60 and registered face images, the CPU 102 updates the status of the user U of interest regarding the presence or passage in front of the signage terminal 60 from an unfinished state to a completed state.

Further, the CPU 102 moves and registers, from the fourth comparison information DB 106b4 to the fifth comparison information DB 106b5, the user information and the status on the user U of interest whose status regarding presence or passage in front of the signage terminal 60 has been updated from an unfinished state to a completed state.

On the other hand, as a result of the comparison, if no registered face image matching the target face image is found and the user U in front of the signage terminal 60 is not identified (step S510, NO), the CPU 102 ends the process for the target face image transmitted from the signage terminal 60.

Figure 15:
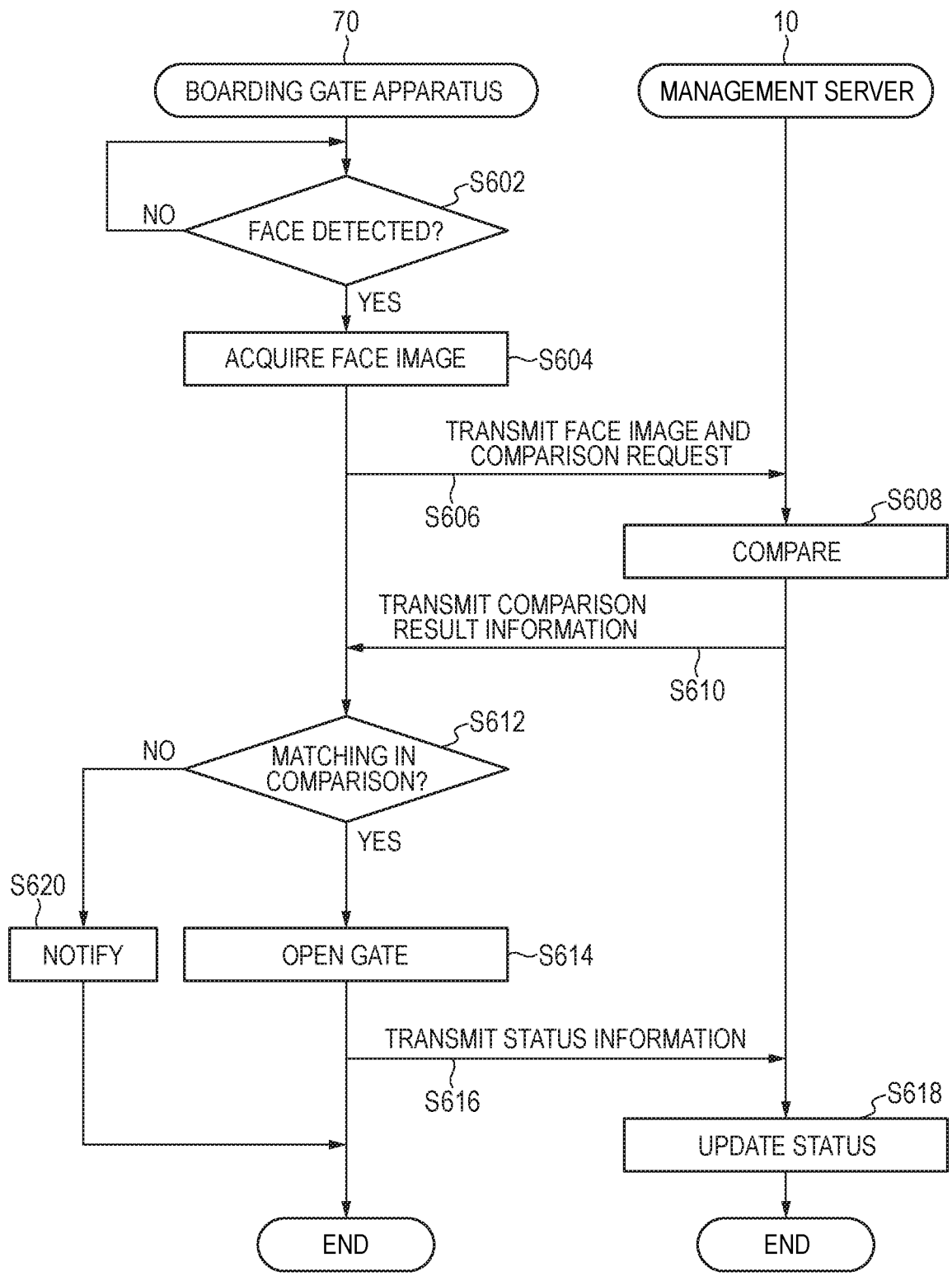
FIG. 15 is a sequence diagram illustrating the operation performed by the boarding gate apparatus and the management server in the information processing system according to the first example embodiment of the present invention.

Next, the operation performed by the boarding gate apparatus 70 will be described by using FIG. 15 together with the operation performed by the management server 10. FIG. 15 is a sequence diagram illustrating the operation performed by the boarding gate apparatus 70 and the management server 10.

The user U who has passed through the passage P5 on which the signage terminal 60 is installed moves to the boarding gate P6 and walks through the boarding gate apparatus 70 to board an airplane. The boarding gate apparatus 70 and the management server 10 perform the process illustrated in FIG. 15 every time each of the plurality of users U boards an airplane.

As illustrated in FIG. 15, the biometrics information acquisition device 712 of the boarding gate apparatus 70 continuously or periodically captures a front area of the boarding gate apparatus 70 and determines whether or not a face of the user U standing in front of the boarding gate apparatus 70 is detected in the captured image (step S602). The biometrics information acquisition device 712 waits until a face of the user U is detected in the image (step S602, NO).

If the biometrics information acquisition device 712 determines that a face of the user U is detected (step S602, YES), the biometrics information acquisition device 712 captures the face of the user U and acquires the face image of the user U as a target face image (step S604).

Next, the CPU 702 of the boarding gate apparatus 70 transmits the target face image of the user U captured by the biometrics information acquisition device 712 to the management server 10 via the network NW together with a comparison request (step S606). Thereby, the CPU 702 requests the management server 10 to compare, at 1:N, the target face image of the user U captured by the biometrics information acquisition device 712 with a plurality of registered face images registered in the fifth comparison information DB 106b5 of the management server 10.

In response to receiving a target face image and a comparison request from the boarding gate apparatus 70, the CPU 102 of the management server 10 performs comparison of the face image of the user U (step S608).

The CPU 102 compares, at 1:N, a target face image received from the boarding gate apparatus 70 with a plurality of registered face images registered in the fifth comparison information DB 106b5. Furthermore, when a registered face image matching the target face image is found, the CPU 102 confirms that boarding information associated with the registered face image associates with an airplane boardable from the boarding gate P6.

Next, the CPU 102 transmits comparison result information indicating a result of the comparison to the boarding gate apparatus 70 via the network NW (step S610).

The CPU 702 of the boarding gate apparatus 70 receives comparison result information from the management server 10. If the comparison result information indicates that a registered face image matching the target face image is found and identity verification of the boarding user U is successful and that confirmation of boarding information is successful (step S612, YES), the CPU 702 performs an opening process of the gate 714 (step S614). Thereby, the CPU 702 transfers the gate 714 from a closed state for standby that blocks passage of the user U to an opened state that allows passage of the user U. The user U passes through the opened gate 714 and boards the airplane.

Next, the CPU 702 transmits, to the management server 10 via the network NW, status information indicating that the boarding on the airplane of the user U is completed after the comparison of the face image (step S616).

In response to receiving status information from the boarding gate apparatus 70, which is an external apparatus, the CPU 102 of the management server 10 updates the status of the user U of interest regarding the boarding on the airplane in the user information DB 106a from an unfinished state to a completed state (step S618). In such a way, the CPU 102 manages the status of the user U regarding boarding on an airplane based on a result of the comparison between a target face image acquired in the boarding on the airplane and a registered face image. That is, when there is a matching in the comparison between a target face image acquired in boarding on an airplane with registered face images, the CPU 102 updates the status of the user U of interest regarding the boarding on the airplane from an unfinished state to a completed state.

Further, the CPU 102 deletes the user information and the status on the user U of interest whose status regarding boarding on an airplane has been updated from an unfinished state to a completed state from the fifth comparison information DB 106b5.

On the other hand, if the comparison result information indicates that no matching registered face image is found and identity verification of the user U fails or that confirmation of boarding information fails (step S612, NO), the CPU 702 of the boarding gate apparatus 70 notifies the user U (step S620). That is, the CPU 702 performs notification indicating that the identity verification failed or that the confirmation of boarding information failed. At this time, the CPU 702 causes the display 710 to display a notification window notifying that the identity verification failed or that the confirmation of boarding information failed. Note that the CPU 702 may notify the user U that the identity verification failed or that the confirmation of boarding information failed by using a voice, for example, in addition to the display of the notification window or instead of the display of the notification window.

In such a way, the user U who has passed through the boarding gate apparatus 70 boards an airplane.

As described above, the management server 10 recognizes and manages the status up to boarding on an airplane in the user information DB 106a for each of the plurality of users U who have performed a check-in procedure with the check-in terminal 20.

FIG. 16 is a schematic diagram illustrating an example of the user information DB 106a of the management server 10. As illustrated, the user information and the status on each user U are registered for each user identification (ID), which is an identifier that identifies each of the plurality of users U in the user information DB 106a.

The user information registered in the user information DB 106a includes identity information such as the name, the nationality, or the like, face information, namely, a face image of the user U, and boarding information such as a flight number, an origin, a destination, departure time, a boarding gate, or the like of an airplane which the user U boards in association with each other. Note that the identity information and the boarding information may include information other than illustrated in FIG. 16, respectively.

Further, the status of the user U registered in the user information DB 106a records whether each procedure of a check-in procedure, a baggage deposit procedure, a security inspection procedure, an immigration procedure, presence or passage in front of the signage terminal 60, and boarding on an airplane is completed or unfinished. The status of the user U is updated at any time in accordance with the process illustrated in FIG. 10 to FIG. 15 described above.

Further, the user information and the status on the user U are sequentially moved and registered to the first to fifth comparison information DBs 106b1 to 106b5 by the CPU 102 of the management server 10 in accordance with the status of the user U. FIG. 17 to FIG. 21 are schematic diagrams illustrating one example of each of the first to fifth comparison information DBs 106b1 to 106b5.

As illustrated in FIG. 17, in the first comparison information DB 106b1, the user information and the status on the user U having the status of "completed" regarding a check-in procedure and the status of "unfinished" regarding other procedures are registered. Once the status regarding a baggage deposit procedure is updated from "unfinished" to "completed", the user information and the status on the user U registered in the first comparison information DB 106b1 are moved and registered from the first comparison information DB 106b1 to the second comparison information DB 106b2.

As illustrated in FIG. 18, in the second comparison information DB 106b2, the user information and the status on the user U having the status of "completed" regarding a check-in procedure and a baggage deposit procedure and the status of "unfinished" regarding other procedures are registered.

Once the status regarding a security inspection procedure is updated from "unfinished" to "completed", the user information and the status on the user U registered in the second comparison information DB 106b2 are moved and registered from the second comparison information DB 106b2 to the third comparison information DB 106b3.

As illustrated in FIG. 19, in the third comparison information DB 106b3, the user information and the status on the user U having the status of "completed" regarding a check-in procedure, a baggage deposit procedure, and a security inspection procedure and the status of "unfinished" regarding other procedures are registered. Once the status regarding an immigration procedure is updated from "unfinished" to "completed", the user information and the status registered in the third comparison information DB 106b3 are moved and registered from the third comparison information DB 106b3 to the fourth comparison information DB 106b4.

As illustrated in FIG. 20, in the fourth comparison information DB 106b4, the user information and the status on the user U having the status of "completed" regarding a check-in procedure, a baggage deposit procedure, a security inspection procedure, and an immigration procedure and the status of "unfinished" regarding other procedures are registered. Once the status regarding presence or passage in front of the signage terminal 60 is updated from "unfinished" to "completed", the user information and the status registered in the fourth comparison information DB 106b4 are moved and registered from the fourth comparison information DB 106b4 to the fifth comparison information DB 106b5.

As illustrated in FIG. 21, in the fifth comparison information DB 106b5, the user information and the status on the user U having the status of "unfinished" regarding boarding on an airplane and the status of "completed" regarding other procedures are registered. Once the status regarding boarding on an airplane is updated from "unfinished" to "completed", the user information and the status registered in the fifth comparison information DB 106b5 are deleted from the fifth comparison information DB 106b5.

The CPU 102 of the management server 10 registers and manages user information and the status on the user U in the user information DB 106a and the first to fifth comparison information DBs 106b1 to 106b5, as described above. Note that the CPU 102 may manage user information and the status on the user U by using the first to fifth comparison information DBs 106b1 to 106b5 without using the user information DB 106a.

Furthermore, for each procedure, the CPU 102 of the management server 10 calculates and sets deadline time by which the user U has to complete the procedure and generates an alert when the deadline time has expired with the procedure still unfinished. FIG. 22 is a schematic diagram illustrating an example of the deadline time of each procedure set by the CPU 102 of the management server 10. As illustrated, the deadline time is set for each procedure of a baggage deposit procedure, a security inspection procedure, an immigration procedure, presence or passage in front of the signage terminal 60, and boarding on an airplane with respect to the user U on a user ID basis. The CPU 102 of the management server 10 can record and manage the deadline time illustrated in FIG. 22 in the user information DB 106*a* in association with the user information and the status on the user U in the user information DB 106*a* illustrated in FIG. 16. Further, the CPU 102 may record and manage the deadline time illustrated in FIG. 22 in the first to fifth comparison information DBs 106*b*1 to 106*b*5 in association with the user information and the status on the user U in the first to fifth comparison information DBs 106*b*1 to 106*b*5 illustrated in FIG. 17 to FIG. 21.

The staff member S is able to use the operation terminal 80 to access the management server 10 and confirm the details of the user information and the status on the user U and the deadline time for each procedure recorded in the user information DB 106*a*. In such a case, the CPU 802 of the operation terminal 80 can acquire, from the user information DB 106*a*, the user information and the status on the user U and the deadline time for each procedure recorded in the user information DB 106*a* and cause the display 810 to display the acquired the user information and the status on the user U and the deadline time for each procedure. The CPU 802 can display a part or whole of identity information included in the user information and can display a part or whole of boarding information included in the user information. Further, for the status of the user U, the CPU 802 can use and display indication such as a bar-like or circular progress bar whose length changes in accordance with the progress status indicating which procedure or procedures of respective procedures have been completed so far, for example.

Figure 23:
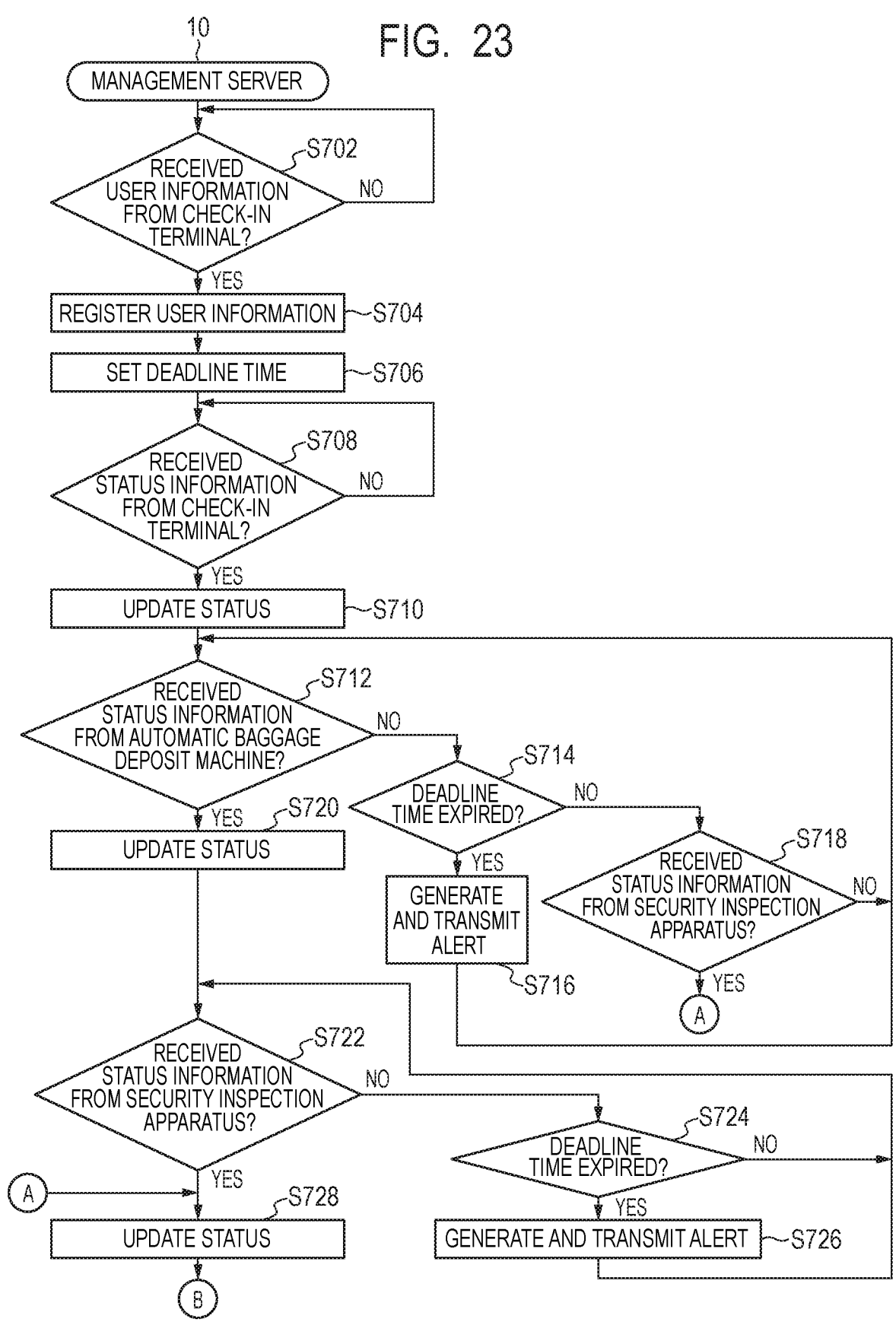
FIG. 23 is a flowchart (part 1) illustrating the operation including a status management operation and an alert operation performed by the management server in the information processing system according to the first example embodiment of the present invention.
Figure 24:
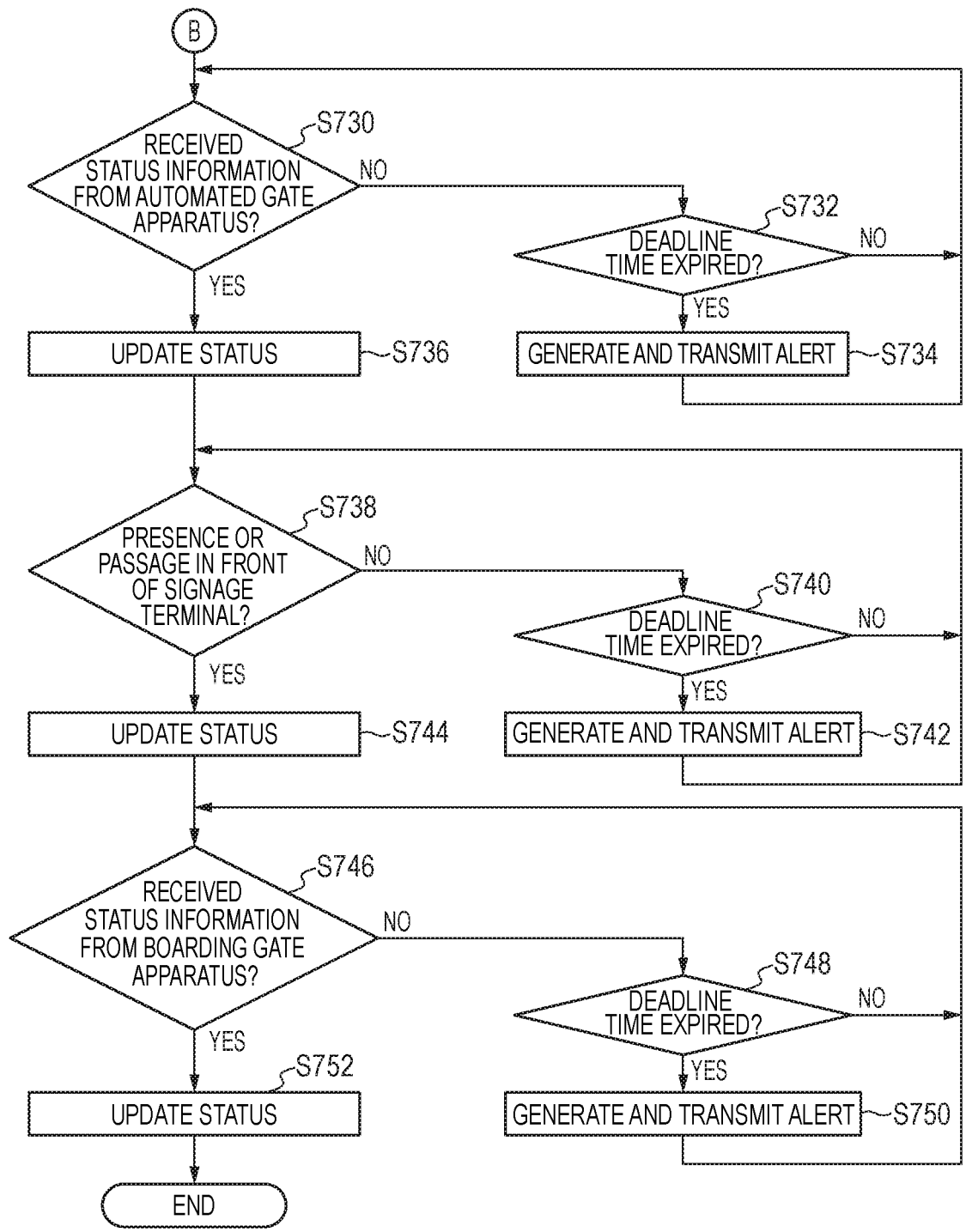
FIG. 24 is a flowchart (part 2) illustrating the operation including a status management operation and an alert operation performed by the management server in the information processing system according to the first example embodiment of the present invention.
Figure 25A:
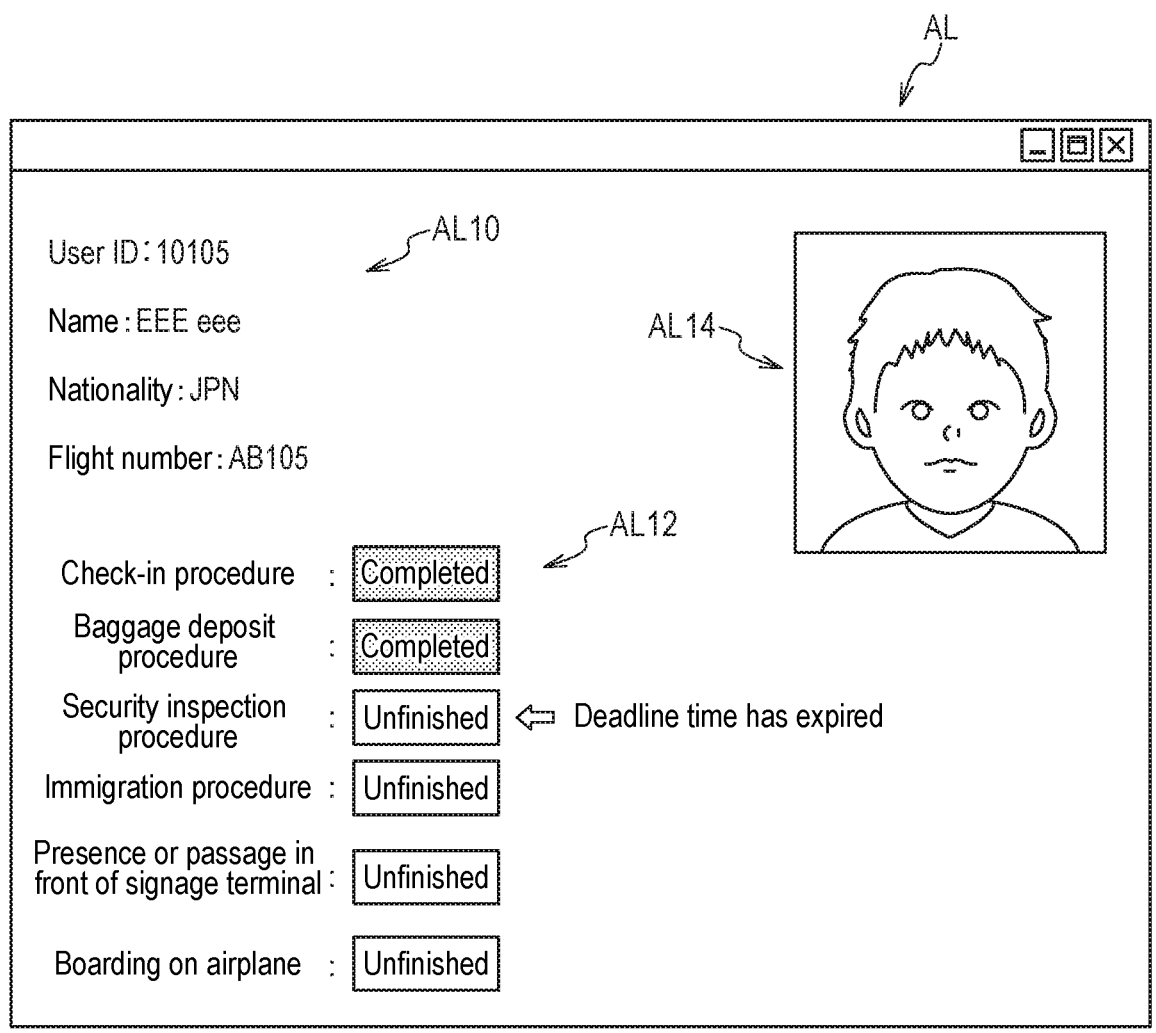
FIG. 25A is a schematic diagram illustrating one example of an alert displayed on the operation terminal according to the first example embodiment of the present invention.
Figure 25B:
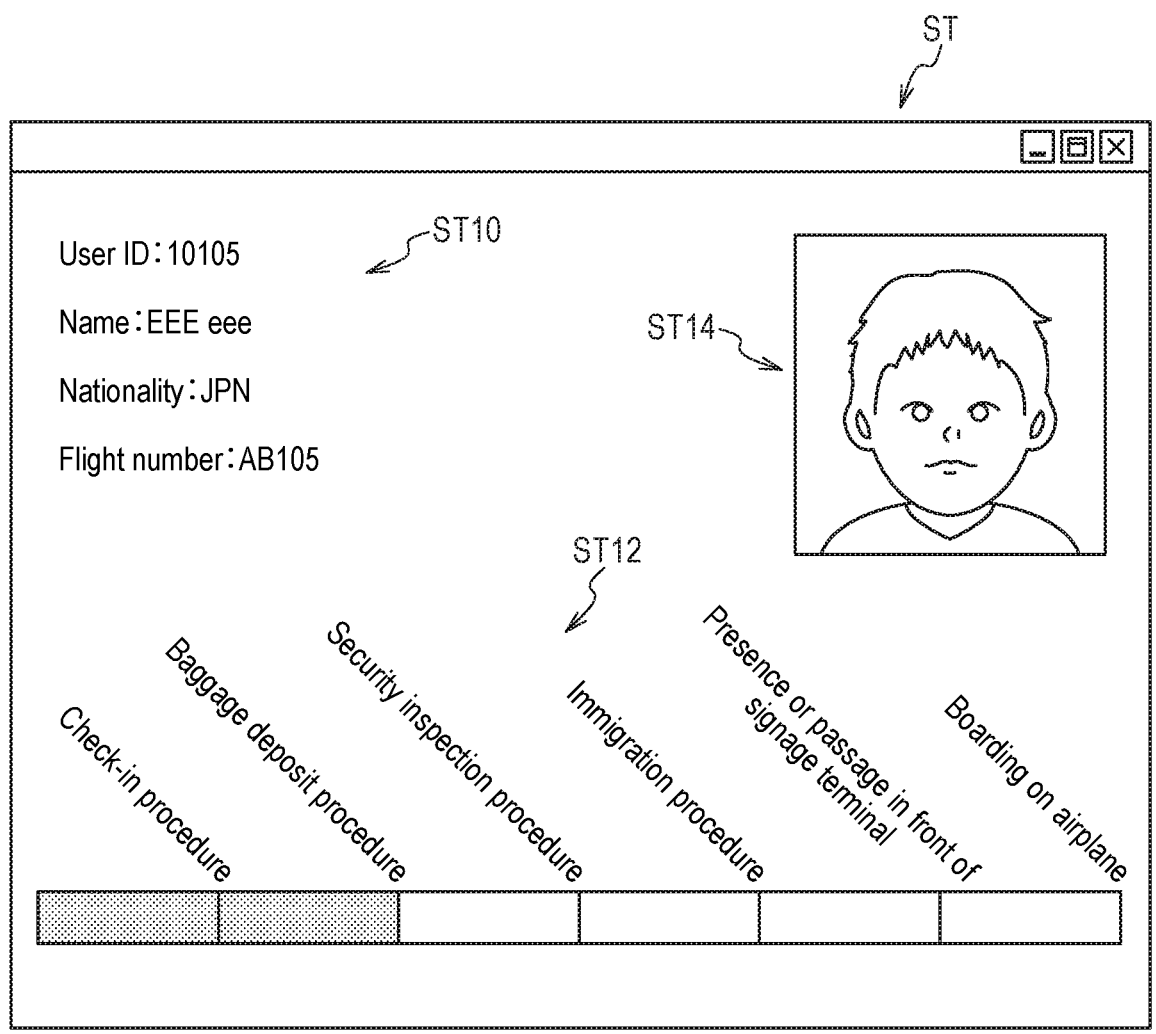
FIG. 25B is a schematic diagram illustrating one example of a status review window displayed on the operation terminal according to the first example embodiment of the present invention.
Figure 25C:
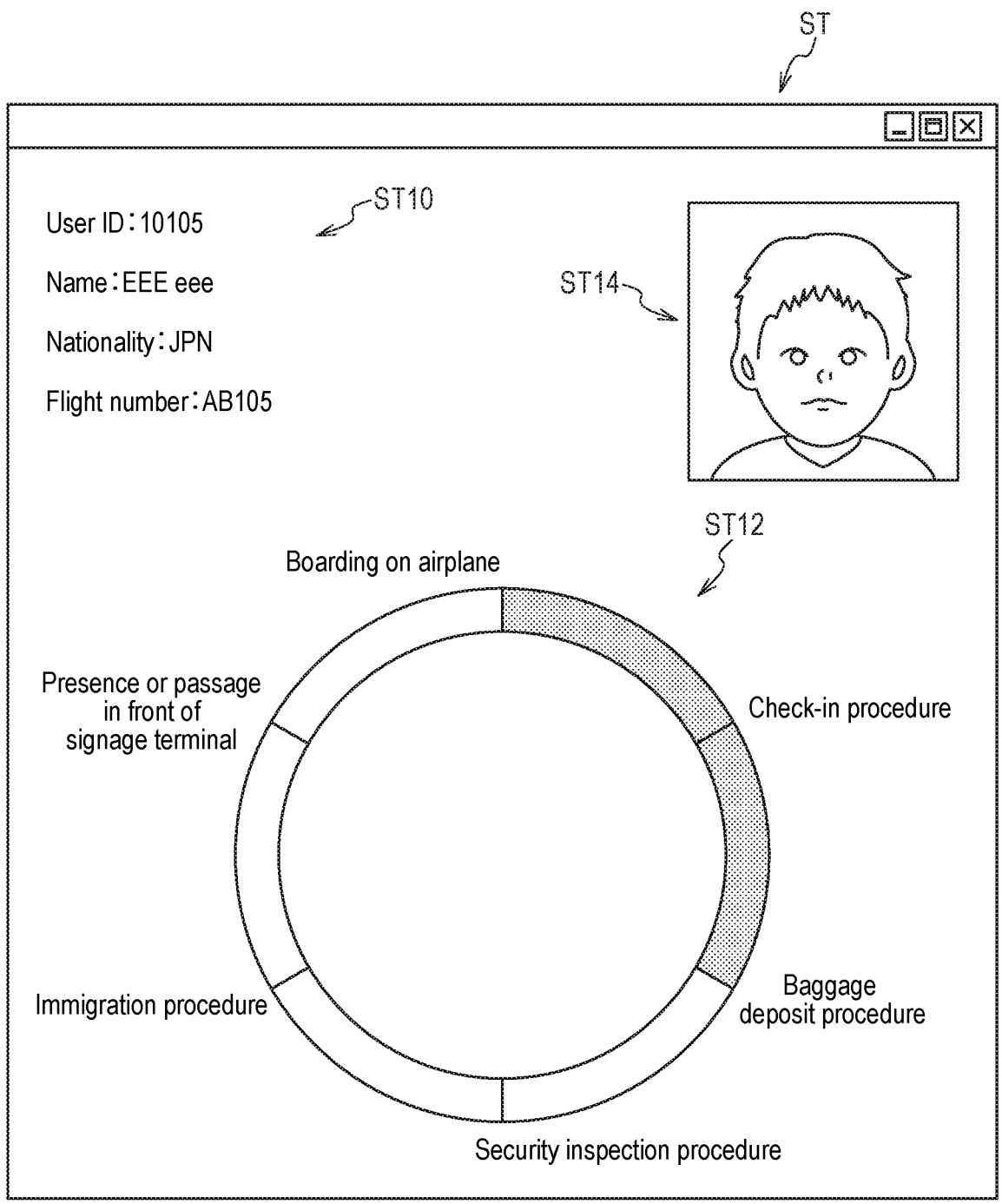
FIG. 25C is a schematic diagram illustrating one example of a status review window displayed on the operation terminal according to the first example embodiment of the present invention.

The operation including a status management operation and an alert operation performed by the management server 10 will be described below by using FIG. 23 to FIG. 25C. FIG. 23 and FIG. 24 are flowcharts illustrating the operation including a status management operation and an alert operation performed by the management server 10. FIG. 25A is a schematic diagram illustrating one example of an alert displayed on the operation terminal 80. FIG. 25B and FIG. 25C are schematic diagrams illustrating an example of a status review window displayed on the operation terminal 80. The management server 10 performs the process illustrated in FIG. 23 and FIG. 24 for each of the plurality of users U.

As illustrated in FIG. 23, the CPU 102 of the management server 10 determines whether or not user information is received from the check-in terminal 20 (step S702) and waits until user information is received from the check-in terminal 20 (step S702, NO).

In response to determining that user information is received from the check-in terminal 20 (step S702, YES), the CPU 102 registers the received user information to the user information DB 106*a* (step S704) Step S704 corresponds to step S118 illustrated in FIG. 10.

Next, the CPU 102 calculates and sets, from the boarding time based on the boarding information included in the user information, deadline time for each procedure of a baggage deposit procedure, a security inspection procedure, an immigration procedure, presence or passage in front of the signage terminal 60, and boarding on an airplane (step S706). Note that CPU 102 can appropriately change and set the deadline time for each procedure in accordance with the degree of congestion of the airport A, which is a facility where the user U boards an airplane. Further, the CPU 102 can record and manage the set deadline time for each procedure in the user information DB 106*a* in association with the user information and the status on the user U in the user information DB 106*a*, for example.

Next, the CPU 102 determines whether or not status information is received from the check-in terminal 20 (step S708) and waits until status information is received from the check-in terminal 20 (step S708, NO).

If the CPU 102 determines that status information is received from the check-in terminal 20 (step S708, YES), the CPU 102 updates the status of the user U of interest regarding the check-in procedure in the user information DB 106*a* from an unfinished state to a completed state (step S710). Step S710 corresponds to step S122 illustrated in FIG. 10. Further, the CPU 102 registers the user information and the status on the user U of interest to the first comparison information DB 106*b*1.

Next, the CPU 102 determines whether or not status information is received from the automatic baggage deposit machine 30 (step S712).

If the CPU 102 determines that status information is not received from the automatic baggage deposit machine 30 (step S712, NO), the CPU 102 determines whether or not the deadline time for the baggage deposit procedure has expired (step S714).

If the CPU 102 determines that the deadline time for the baggage deposit procedure has expired (step S714, YES), the CPU 102 generates an alert indicating that the deadline time for the baggage deposit procedure has expired for the user U of interest and transmits the alert via the network NW (step S716).

The destination of the alert is the operation terminal 80 of one or a plurality of staff members S.

If the CPU 102 determines that the deadline time for the baggage deposit procedure has not expired (step S714, NO), the CPU 102 determines whether or not status information is received from the security inspection apparatus 40 (step S718). Note that this step S718 is provided assuming that some users U have less baggage and do not deposit their baggage. If the CPU 102 determines that status information is received from the security inspection apparatus 40 (step S718, YES), the process proceeds to step S728 described later. Further, if the CPU 102 determines that status information is not received from the security inspection apparatus 40 (step S718, NO), the CPU 102 waits for reception of status information from the automatic baggage deposit machine 30 (step S712).

On the other hand, if the CPU 102 determines that status information is received from the automatic baggage deposit machine 30 (step S712, YES), the CPU 102 updates the status of the user U of interest regarding the baggage deposit procedure in the user information DB 106*a* from an unfinished state to a completed state (step S720). Step S720 corresponds to step S218 illustrated in FIG. 11. Further, the CPU 102 moves and registers the user information and the status on the user U of interest from the first comparison information DB 106*b*1 to the second comparison information DB 106*b*2.

Next, the CPU 102 determines whether or not status information is received from the security inspection apparatus 40 (step S722).

If the CPU 102 determines that status information is not received from the security inspection apparatus 40 (step S722, NO), the CPU 102 determines whether or not the deadline time for the security inspection procedure has expired (step S724).

If the CPU 102 determines that the deadline time for the security inspection procedure has expired (step S724, YES), the CPU 102 generates an alert indicating that the deadline time for the security inspection procedure has expired for the user U of interest and transmits the alert via the network NW (step S726).

The destination of the alert is the operation terminal 80 of one or a plurality of staff members S.

If the CPU 102 determines that the deadline time for the security inspection procedure has not expired (step S724, NO), the CPU 102 waits for reception of status information from the security inspection apparatus 40 (step S722).

On the other hand, if the CPU 102 determines that status information is received from the security inspection apparatus 40 (step S722, YES), the CPU 102 updates the status of the user U of interest regarding the security inspection procedure in the user information DB 106*a* from an unfinished state to a completed state (step S728). Step S728 corresponds to step S318 illustrated in FIG. 12. Further, the CPU 102 moves and registers the user information and the status on the user U of interest from the second comparison information DB 106*b*2 to the third comparison information DB 106*b*3.

Next, as illustrated in FIG. 24, the CPU 102 determines whether or not status information is received from the automated gate apparatus 50 (step S730).

If the CPU 102 determines that status information is not received from the automated gate apparatus 50 (step S730, NO), the CPU 102 determines whether or not the deadline time for the immigration procedure has expired (step S732).

If the CPU 102 determines that the deadline time for the immigration procedure has expired (step S732, YES), the CPU 102 generates an alert indicating that the deadline time for the immigration procedure has expired for the user U of interest and transmits the alert via the network NW (step S734). The destination of the alert is the operation terminal 80 of one or a plurality of staff members S.

If the CPU 102 determines that the deadline time for the immigration procedure has not expired (step S732, NO), the CPU 102 waits for reception of status information from the automated gate apparatus 50 (step S730).

On the other hand, if the CPU 102 determines that status information is received from the automated gate apparatus 50 (step S730, YES), the CPU 102 updates the status of the user U of interest regarding the immigration procedure in the user information DB 106*a* from an unfinished state to a completed state (step S736). Step S736 corresponds to step S418 illustrated in FIG. 13. Further, the CPU 102 moves and registers the user information and the status on the user U of interest from the third comparison information DB 106*b*3 to the fourth comparison information DB 106*b*4.

Next, the CPU 102 compares, at 1:N, a target face image received from the signage terminal 60 with a plurality of registered face images in the user information DB 106*a* and determines for the user U of interest whether or not there is presence or passage in front of the signage terminal 60 (step S738). As a result of the comparison, when a registered face image matching the target face image is found, which means that there is presence or passage in front of the signage terminal 60 for the user U of interest.

If the CPU 102 determines that there is no presence or passage in front of the signage terminal 60 (step S738, NO), the CPU 102 determines whether or not the deadline time for presence or passage in front of the signage terminal 60 has expired (step S740).

If the CPU 102 determines that the deadline time for presence or passage in front of the signage terminal 60 has expired (step S740, YES), the CPU 102 generates an alert and transmits the alert via the network NW (step S742). That is, the CPU 102 generates an alert indicating that the deadline time for presence or passage in front of the signage terminal 60 has expired for the user of interest and transmits the alert via the network NW. The destination of the alert is the operation terminal 80 of one or a plurality of staff members S.

If the CPU 102 determines that the deadline time for presence or passage in front of the signage terminal 60 has not expired (step S740, NO), the process proceeds to step S738.

On the other hand, if the CPU 102 determines that there is presence or passage in front of the signage terminal 60 (step 3738, YES), the CPU 102 updates the status of the user U of interest (step S744). That is, the CPU 102 updates the status of the user U of interest regarding presence or passage in front of the signage terminal 60 in the user information DB 106*a* from an unfinished state to a completed state. Step S744 corresponds to step S512 illustrated in FIG. 14.

Further, the CPU 102 moves and registers the user information and the status on the user U of interest from the fourth comparison information DB 106*b*4 to the fifth comparison information DB 106*b*5.

Next, the CPU 102 determines whether or not status information is received from the boarding gate apparatus 70 (step S746).

If the CPU 102 determines that status information is not received from the boarding gate apparatus 70 (step S746, NO), the CPU 102 determines whether or not the deadline time for the boarding on an airplane has expired (step S748).

If the CPU 102 determines that the deadline time for the boarding on the airplane has expired (step S748, YES), the CPU 102 generates an alert indicating that the deadline time for the boarding on the airplane has expired for the user U of interest and transmits the alert via the network NW (step S750). The destination of the alert is the operation terminal 80 of one or a plurality of staff members S.

If the CPU 102 determines that the deadline time for the boarding on the airplane has not expired (step S748, NO), the CPU 102 waits for reception of status information from the boarding gate apparatus 70 (step S746).

On the other hand, if the CPU 102 determines that status information is received from the boarding gate apparatus 70 (step S746, YES), the CPU 102 updates the status of the user U of interest regarding the boarding on the airplane in the user information DB 106*a* from an unfinished state to a completed state (step S752).

Step S752 corresponds to step S618 illustrated in FIG. 15. Further, the CPU 102 deletes the user information and the status on the user U of interest from the fifth comparison information DB 106*b*5.

Note that, while the CPU 102 determines whether or not the deadline time has expired for respective procedures sequentially in steps S714, S724, S732, 3740, and S748 in the case illustrated in FIG. 23 and FIG. 24 described above, the determination is not necessarily required to be performed sequentially. The CPU 102 may determine whether or not the deadline time has expired for each procedure independently of each other.

In such a way, the management server 10 recognizes and manages the status of the user U regarding each procedure before the user U boards an airplane together with the deadline time and, if there is a procedure for which the deadline time has expired, generates and transmits an alert to the operation terminal 80.

As discussed above, according to the present example embodiment, the first to fifth comparison information DBs 106b1 to 106b5 in which user information is registered in accordance with the status of the user U are used as DBs of a plurality of registered face images to be compared with a target face image in each procedure. Therefore, according to the present example embodiment, it is possible to reduce the number of multiple registered face images, which are populations to be used in comparison with a target face image, and therefore improve the accuracy in comparison of a face image that is biometrics information.

Note that, while the case where the first to fifth comparison information DBs 106b1 to 106b5 are separately used in the comparison with a target face image has been described above, the example embodiment is not limited thereto. For example, one or a plurality of DBs of the first to fifth comparison information DBs 106b1 to 106b5 may be appropriately used in the comparison with a target face image in accordance with the number of users U who have performed a check-in procedure, the degree of congestion of the airport A, the processing capacity of the management server 10, or the like.

For example, in accordance with the degree of congestion of the airport A determined as described above, the CPU 102 of the management server 10 may use a smaller number of DBs when the airport A is more congested and may use a larger number of DBs when the airport A is less congested. Further, similarly, the CPU 102 may appropriately use one or a plurality of DBs of the first to fifth comparison information DBs 106b1 to 106b5 in the comparison with a target face image in accordance with the number of users U who have performed the check-in procedure. That is, when the number of users U who have performed a check-in procedure is larger, the CPU 102 may use a smaller number of DBs so that the number of registered face images to be compared with a target face image is reduced.

Specifically, when the airport A is less congested, the CPU 102 of the management server 10 may compare, at 1:N, a target face image received from the security inspection apparatus 40 with a plurality of registered face images registered in the first and second comparison information DBs 106b1 and 106b2, for example. In the first and second comparison information DBs 106b1 and 106b2 used in comparison, user information on the users U having the unfinished status regarding a security inspection procedure is registered.

Further, in a first case where the airport A is less congested, the CPU 102 may compare, at 1:N, a target face image received from the automated gate apparatus 50 with a plurality of registered face images registered in the first to third comparison information DBs 106b1, 106b2, and 106b3, for example. Further, in a second case where the airport A is less congested, the CPU 102 may compare, at 1:N, a target face image received from the automated gate apparatus 50 with a plurality of registered face images registered in the second and third comparison information DBs 106b2 and 106b3, for example. In the first to third comparison information DBs 106b1, 106b2, and 106b3 used in comparison, user information on the user U having the unfinished status regarding an immigration procedure is registered. Note that the degree of congestion of the airport A is lower in the first case than in the second case.

Further, in the first case where the airport A is less congested, the CPU 102 may compare, at 1:N, a target face image received from the signage terminal 60 with a plurality of registered face images registered in the first to fourth comparison information DBs 106b1, 106b2, 106b3, and 106b4, for example. Further, in the second case where the airport A is less congested, the CPU 102 may compare, at 1:N, a target face image received from the signage terminal 60 with a plurality of registered face images registered in the second to fourth comparison information DBs 106b2, 106b3, and 106b4, for example. Further, in a third case where the airport A is less congested, the CPU 102 may compare, at 1:N, a target face image received from the signage terminal 60 with a plurality of registered face images registered in the third and fourth comparison information DBs 106b3 and 106b4, for example. In the first to fourth comparison information DBs 106b1, 106b2, 106b3, and 106b4 used in comparison, user information on the user U having the unfinished status regarding presence or passage in front of the signage terminal 60 is registered. Note that the degree of congestion of the airport A is lower in the first case than in the second case and is lower in the second case than in the third case.

Further, in the first case where the airport A is less congested, the CPU 102 may compare, at 1:N, a target face image received from the boarding gate apparatus 70 with a plurality of registered face images registered in the first to fifth comparison information DBs 106b1, 106b2, 106b3, 106b4, and 106b5, for example. Further, in the second case where the airport A is less congested, the CPU 102 may compare, at 1:N, a target face image received from the boarding gate apparatus 70 with a plurality of registered face images registered in the second to fifth comparison information DBs 106b2, 106b3, 106b4, and 106b5, for example. Further, in the third case where the airport A is less congested, the CPU 102 may compare, at 1:N, a target face image received from the boarding gate apparatus 70 with a plurality of registered face images registered in the third to fifth comparison information DBs 106b3, 106b4, and 106b5, for example. Further, in a fourth case where the airport A is less congested, the CPU 102 may compare, at 1:N, a target face image received from the boarding gate apparatus 70 with a plurality of registered face images registered in the fourth and fifth comparison information DBs 106b4 and 106b5, for example. In the first to fifth comparison information DBs 106b1, 106b2, 106b3, 106b4, and 106b5 used in comparison, the user information on the user U having the unfinished status regarding boarding on an airplane is registered. Note that the degree of congestion of the airport A is lower in the first case than in the second case, is lower in the second case than in the third case, and is lower in the third case than in the fourth case.

Further, when the staff member S selects alert display on the operation terminal 80, the CPU 802 of the operation terminal 80 acquires, from the management server 10 via the network NW, the user information and the status on the user U who missed the deadline time for the procedure identified by the alert. The CPU 802 acquires the user information and the status on the user U of interest from the user information DB 106a of the management server 10.

The CPU 802 displays the alert on the display 810 based on the acquired user information and status. FIG. 25A is a schematic diagram illustrating one example of an alert displayed on the operation terminal 80. Note that, unlike the case illustrated in FIG. 16, FIG. 25A illustrates a case where the user U whose user ID is 10105 has not yet completed a security inspection procedure while the deadline time for the security inspection procedure has expired.

As illustrated in FIG. 25A, an alert AL includes a user information display field AL10 that displays user information on the user U, a status display field AL12 that displays the status of the user U, and a face image display field AL14 that displays a registered face image of the user U.

The user information display field AL10 displays identity information such as the name, the nationality, or the like of the user U and boarding information such as a flight number of an airplane which the user U is scheduled to board. Note that the user information display filed AL10 may display a part or whole of identity information and may display a part or whole of boarding information.

The status display filed AL12 displays the status of "unfinished" or "completed" for each procedure of the user U. For a procedure for which the deadline time has expired, the status display field AL12 displays the expiration. Note that, when an alert indicating that the deadline time has expired for a certain procedure is transmitted, this means that the deadline for the subsequent procedure expires.

The face image display field AL14 displays a captured face image or a passport face image of the user U captured by the check-in terminal 20 and registered in the user information DB 106a. The staff member S is able to rely on the registered face image of the user U displayed in the alert AL and easily search for the user U who has not yet completed procedures including the procedure in the airport A.

Further, the CPU 802 of the operation terminal 80 can display a status review window used for reviewing the status of the user U on the display 810 regardless of whether or not an alert from the management server 10 is received. In such a case, the CPU 802 acquires, from the user information DB 106a of the management server 10 via the network NW, user information and the status on the user U whose status has to be reviewed. FIG. 25B and FIG. 25C are schematic diagrams illustrating examples of a status review window displayed on the operation terminal 80. FIG. 25B and FIG. 25C are different in the form of a progress bar that displays the status of the user U. Note that, unlike the case illustrated in FIG. 16, FIG. 25B and FIG. 25C illustrate a case where the user U whose user ID is 10105 has not yet completed a security inspection procedure while the deadline time for the security inspection procedure has expired.

As illustrated in FIG. 25B and FIG. 25C, a status review window ST includes a user information display field ST10 that displays user information on the user U, a status display field ST12 that displays the status of the user U, and a face image display field ST14 that displays a registered face image of the user U.

The user information display field ST10 displays the same information as the user information display field AL10 of the alert AL. Further, the face image display field ST14 displays the same registered face image as the face image display field AL14 of the alert AL.

The status display field ST12 displays which procedure or procedures of respective procedures of the user U have been completed so far by using a progress bar whose length changes in accordance with a progress status. FIG. 25B illustrates a case where the status of the user U is displayed by using a bar-like progress bar. FIG. 25C illustrates a case where the status of the user U is displayed by using a circular progress bar.

Note that, also in the alert AL illustrated in FIG. 25A, the status of the user U may be displayed by a progress bar in the same manner as in FIG. 25B and FIG. 25C.

As discussed above, according to the present example embodiment, for the user U who is scheduled to board an airplane, the deadline time for each procedure in the airport A is set based on boarding information acquired by the check-in terminal 20, and the status of the user U regarding each procedure is managed in the management server 10. Therefore, according to the present example embodiment, it is possible to recognize and manage in more detail the status of the user U who is scheduled to board an airplane.

Second Example Embodiment

An information processing system, an information processing apparatus, and an information processing method according to a second example embodiment of the present invention will be described. Note that the same components as those of the information processing system, the information processing apparatus, and the information processing method according to the first example embodiment described above will be labeled with the same references, and the description thereof will be omitted or simplified.

While the case where the CPU 102 of the management server 10 selects the first to fifth comparison information DB 106b1 to 106b5 for comparison with a target face image and uses the selected one or ones for comparison has been described in the first example embodiment described above, the example embodiment is not limited thereto. The CPU 102 is not necessarily required to user the first to fifth comparison information DBs 106b1 to 106b5. In such a case, the CPU 102 can extract the same plurality of registered face images as the first to fifth comparison information DBs 106b1 to 106b5 from the user information DB 106a based on the status of the user U and use the extracted face images for comparison. In the present example embodiment, a case where a plurality of registered face images are extracted from the user information DB 106a based on the status of the user U corresponding to the registered face image and used for comparison will be described below. In the present example embodiment, once the status regarding one procedure in a series of procedures after a check-in procedure becomes a completed state, the CPU 102 as the comparison unit extracts registered face images to be compared with a target face image from a plurality of registered face images based on the status regarding another procedure subsequent to the one procedure.

When a target face image and a comparison request are received from the automatic baggage deposit machine 30, the CPU 102 extracts a registered face image of the user U by filtering from the user information DB 106a. At this time, the CPU 102 extracts a registered face image of the user U having the completed status regarding a check-in procedure and the unfinished status regarding other procedures by filtering with reference to the status of the user U. The CPU 102 compares the received target face image with a plurality of registered face images extracted from the user information DB 106a. Also in the present example embodiment, the CPU 102 neither performs comparison with registered face images of the users U who have not yet finished a check-in procedure, which is the immediately previous procedure of the baggage deposit procedure, nor performs comparison with registered face images of the user U who have already completed the baggage deposit procedure. Therefore, also in the present example embodiment, unnecessary comparison with registered face images can be avoided in the comparison of a target face image acquired in a baggage deposit procedure.

Further, when a target face image and a comparison request are received from the security inspection apparatus 40, the CPU 102 extracts a registered face image of the user U by filtering from the user information DB 106a. At this time, the CPU 102 extracts a registered face image of the user U having the completed status regarding a check-in procedure and a baggage deposit procedure and the unfinished status regarding other procedures by filtering with reference to the status of the user U. The CPU 102 compares the received target face image with a plurality of registered face images extracted from the user information DB 106*a*. Also in the present example embodiment, the CPU 102 neither performs comparison with registered face images of the users U who have not yet finished a baggage deposit procedure, which is the immediately previous procedure of the security inspection procedure, nor performs comparison with registered face images of the user U who have already completed the security inspection procedure. Therefore, also in the present example embodiment, unnecessary comparison with registered face images can be avoided in the comparison of a target face image acquired in a security inspection procedure.

Further, when a target face image and a comparison request are received from the automated gate apparatus 50, the CPU 102 extracts a registered face image of the user U by filtering from the user information DB 106*a*. At this time, the CPU 102 extracts a registered face image of the user U having the completed status regarding a check-in procedure, a baggage deposit procedure, and a security inspection procedure and the unfinished status regarding other procedures by filtering with reference to the status of the user U. The CPU 102 compares the received target face image with a plurality of registered face images extracted from the user information DB 106*a*. Also in the present example embodiment, the CPU 102 neither performs comparison with registered face images of the users U who have not yet finished a security inspection procedure, which is the immediately previous procedure of the immigration procedure, nor performs comparison with registered face images of the user U who have already completed the immigration procedure. Therefore, also in the present example embodiment, unnecessary comparison with registered face images can be avoided in the comparison of a target face image acquired in an immigration procedure.

Further, when a target face image is received from the signage terminal 60, the CPU 102 extracts a registered face image of the user U by filtering from the user information DB 106*a*. At this time, the CPU 102 extracts a registered face image of the user U having the completed status regarding a check-in procedure, a baggage deposit procedure, a security inspection procedure, and an immigration procedure and the unfinished status regarding other procedures by filtering with reference to the status of the user U. The CPU 102 compares the received target face image with a plurality of registered face images extracted from the user information DB 106*a*. Also in the present example embodiment, the CPU 102 neither performs comparison with registered face images of the users U who have not yet finished an immigration procedure, which is the immediately previous procedure of the presence or passage in front of the signage terminal 60, nor performs comparison with registered face images of the user U who have already completed the presence or passage in front of the signage terminal 60. Therefore, also in the present example embodiment, unnecessary comparison with registered face images can be avoided in the comparison of a target face image acquired in presence of passage in front of the signage terminal 60.

Further, when a target face image is received from the boarding gate apparatus 70, the CPU 102 extracts a registered face image of the user U by filtering from the user information DB 106*a*. At this time, the CPU 102 extracts a registered face image of the user U having the unfinished status regarding boarding on an airplane and the completed status regarding other procedures by filtering with reference to the status of the user U. The CPU 102 compares the received target face image with a plurality of registered face images extracted from the user information DB 106*a*. Also in the present example embodiment, the CPU 102 neither performs comparison with registered face images of the users U who have not yet finished presence or passage in front of the signage terminal 60, which is the immediately previous procedure of the boarding on the airplane, nor performs comparison with registered face images of the user U who have already completed the boarding on the airplane. Therefore, also in the present example embodiment, unnecessary comparison with registered face images can be avoided in the comparison of a target face image acquired in boarding on an airplane.

The CPU 102 as the comparison unit extracts registered face images to be compared with a target face image from the user information DB 106*a* in accordance with the status of the user U, in accordance with each procedure as described above. A series of procedures up to boarding on an airplane include one procedure and another procedure subsequent thereto as described above. Also in the present example embodiment, the CPU 102 compares a target face image acquired in another procedure with registered face images of the users U having the completed status regarding one procedure and having the unfinished status regarding another procedure. Thus, also in the present example embodiment, as with the first example embodiment, it is possible to reduce the number of multiple registered face images, which are populations to be compared with a target face image and improve the accuracy in comparison of a face image that is biometrics information.

Further, in the present example embodiment, it is possible to extract a registered face image of the user U from the user information DB 106*a* in accordance with the status of the user U without providing a DB for each status of the user U, such as the first to fifth comparison information DBs 106*b*1 to 106*b*5 used in the first example embodiment.

Note that, in the present example embodiment, the storage device 106 of the management server 10 may store only the user information DB 106*a* or may store both the user information DB 106*a* and the first to fifth comparison information DBs 106*b*1 to 106*b*5 in the same manner as in the first example embodiment.

Note that, in the present example embodiment, the range of registered face images to be extracted from the user information DB 106*a* may be appropriately changed in accordance with the number of users U who have performed a check-in procedure, the degree of congestion of the airport A, the processing capacity of the management server 10, or the like, for example.

For example, the CPU 102 of the management server 10 can extract less registered face images when the airport A is more congested and extract more registered face images when the airport A is less congested and use the extracted registered face images for comparison in accordance with the degree of congestion of the airport A determined as described above. Further, the CPU 102 may change the number of registered face images extracted for comparison with a target face image similarly in accordance with the number of users U who have performed a check-in procedure. That is, the CPU 102 may change the number of registered face images to be extracted such that the number of registered face images to be compared with a target face image is smaller when the number of the users U who have performed a check-in procedure is larger.

Specifically, for example, when the airport A is less congested and when a target face image and a comparison request are received from the security inspection apparatus 40, the CPU 102 of the management server 10 can also extract registered face images of the users U whose status regarding at least a security inspection procedure is an unfinished state. The following users U are included in the users U whose status regarding at least a security inspection procedure is the unfinished state. That is, the users U having the completed status regarding a check-in procedure and a baggage deposit procedure and the unfinished status regarding other procedures are included. Furthermore, the users U having the completed status regarding a check-in procedure and the unfinished status regarding other procedures may be included.

Further, for example, when the airport A is less congested and when a target face image and a comparison request are received from the automated gate apparatus 50, the CPU 102 can extract registered face images of the users U whose status regarding at least an immigration procedure is an unfinished state. The following users U are included in the users U whose status regarding at least an immigration procedure is the unfinished state. That is, the users U having the completed status regarding a check-in procedure, a baggage deposit procedure, and a security inspection procedure and the unfinished status regarding other procedures are included. Further, the users U having the completed status regarding a check-in procedure and a baggage deposit procedure and the unfinished status regarding other procedures may be included. Furthermore, the users U having the completed status regarding a check-in procedure and the unfinished status regarding other procedures may be included.

Further, for example, when the airport A is less congested and when a target face image is received from the signage terminal 60, the CPU 102 can extract registered face images of the users U whose status regarding at least presence or passage in front of the signage terminal 60 is an unfinished state. The following users U are included in the users U whose status regarding at least presence or passage in front of the signage terminal 60 is the unfinished state. That is, the users U having the completed status regarding a check-in procedure, a baggage deposit procedure, a security inspection procedure, and an immigration procedure and the unfinished status regarding other procedures are included. Further, the users U having the completed status regarding a check-in procedure, a baggage deposit procedure, and a security inspection procedure and the unfinished status regarding other procedures may be included. Further, the users U having the completed status regarding a check-in procedure and a baggage deposit procedure and the unfinished status regarding other procedures may be included. Furthermore, the users U having the completed status regarding a check-in procedure and the unfinished status regarding other procedures may be included.

Further, for example, when the airport A is less congested and when a target face image is received from the boarding gate apparatus 70, the CPU 102 can extract registered face images of the users U whose status regarding at least boarding on an airplane is an unfinished state. The users U having the unfinished status regarding boarding on an airplane and the completed status regarding other procedures are included in the users U whose status regarding at least boarding on an airport is the unfinished state. Further, the users U having the completed status regarding a check-in procedure, a baggage deposit procedure, a security inspection procedure, and an immigration procedure and the unfinished status regarding other procedures may be included. Further, the users U having the completed status regarding a check-in procedure, a baggage deposit procedure, and a security inspection procedure and the unfinished status regarding other procedures may be included. Further, the users U having the completed status regarding a check-in procedure and a baggage deposit procedure and the unfinished status regarding other procedures may be included. Furthermore, the users U having the completed status regarding a check-in procedure and the unfinished status regarding other procedures may be included.

Third Example Embodiment

An information processing system, an information processing apparatus, and an information processing method according to a third example embodiment of the present invention will be described by using FIG. 26. Note that the same components as those of the information processing system, the information processing apparatus, and the information processing method according to the first and second example embodiments described above will be labeled with the same references, and the description thereof will be omitted or simplified.

In the present example embodiment, an alert operation performed by the management server 10 that may transmit an alert in which the location of the user U in the airport A is determined will be described by using FIG. 26. FIG. 26 is a flowchart illustrating the alert operation performed by the management server 10 according to the present example embodiment.

Figure 26:
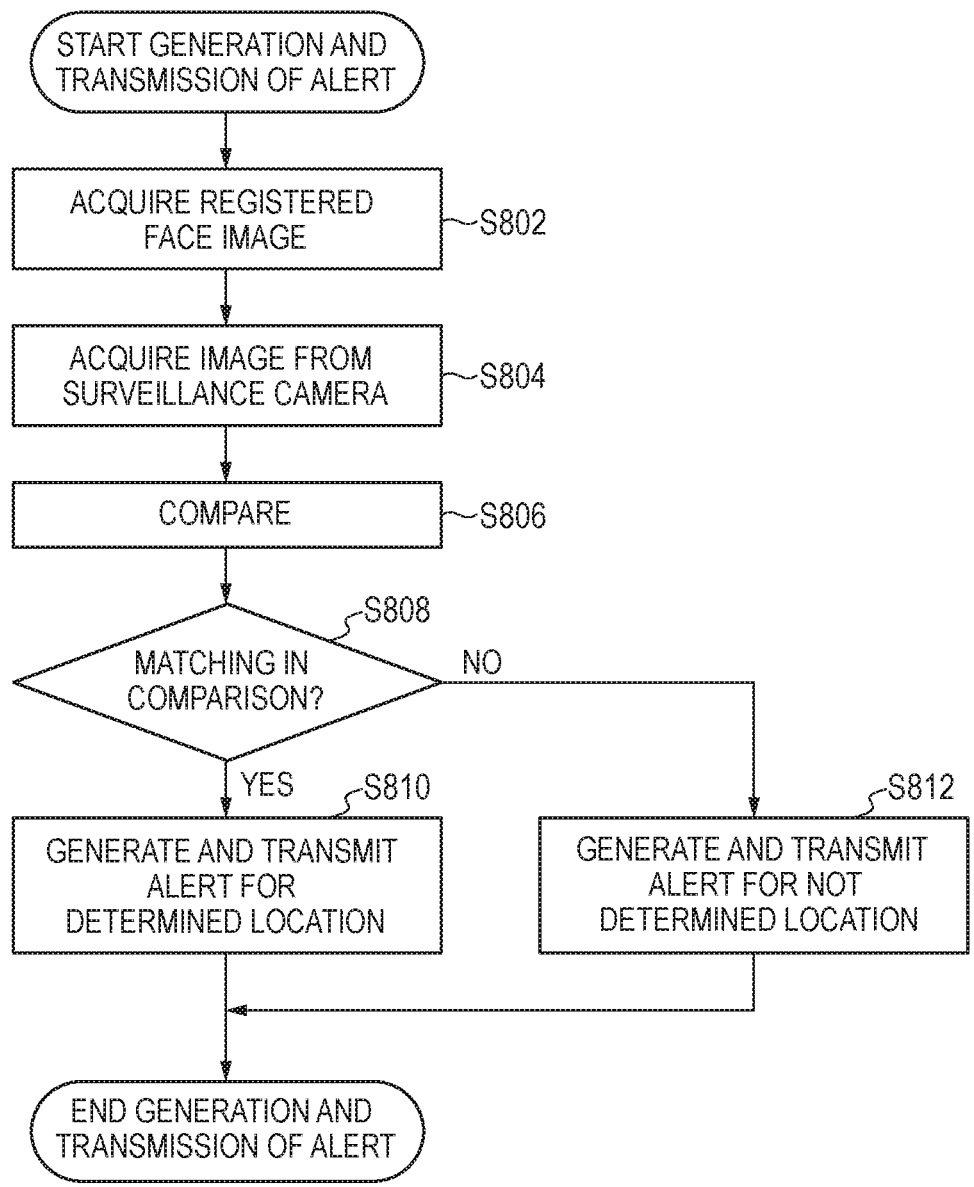
FIG. 26 is a flowchart illustrating an alert operation performed by a management server according to a second example embodiment of the present invention.

The management server 10 according to the present example embodiment performs the process illustrated in FIG. 26 as the process of generating and transmitting the alert of steps S716 and S726 illustrated in FIG. 23 and steps S734, S742, and S750 illustrated in FIG. 24. Note that the process illustrated in FIG. 26 may be performed in all or some of steps S716, S726, S734, S742, and S750.

Further, the management server 10 utilizes a video captured by the plurality of surveillance cameras 90 installed in the airport A in order to determine the location of the user U. Each of the plurality of surveillance cameras 90 functions as a video acquisition unit that captures a predetermined place within the airport A and transmits the captured video to the management server 10 via the network NW.

The CPU 102 of the management server 10 functions as a locating unit that determines the location of the user U. The CPU 102 as the locating unit identifies the user U from a face image in a video captured by the plurality of surveillance cameras 90. The CPU 102 as the locating unit determines, as the location of the user U, the installation place of the surveillance camera 90 which captures a video in which the user U is determined out of the plurality of surveillance cameras 90.

As illustrated in FIG. 26, when determining that the deadline time for a particular procedure has expired, the CPU 102 of the management server 10 acquires a registered face image of the user U of interest from the user information DB 106a (step S802). The particular procedure is a baggage deposit procedure, a security inspection procedure, an immigration procedure, presence or passage in front of a signage terminal 60, or boarding on an airplane.

Further, the CPU 102 acquires a video transmitted from the plurality of surveillance cameras 90 (step S804).

Next, the CPU 102 detects a face from a video captured by the plurality of surveillance cameras 90 and compares a detected face image, which is an image of the detected face, with a registered face image (step S806). In the comparison between a detected face image and a registered face image, the CPU 102 may compare a face feature amount extracted from the detected face image with a face feature amount extracted from the registered face image to compare both face images.

In particular, the CPU 102 can acquire a detected face image by detecting a face image from a video transmitted from the surveillance camera 90 installed between a place where a procedure for which the deadline time has expired is performed and a place where the latest completed procedure was performed.

Thereby, face images to be detected can be narrowed, and comparison accuracy can be improved.

As a result of the comparison, if a detected face image matching a registered face image is found (step S808, YES), the CPU 102 determines the location of the user U, generates an alert indicating that the deadline time has expired, and transmits the alert via the network NW (step S810). In the alert, the CPU 102 determines, as the location of the user U, the installation place of the surveillance camera 90 which captured the matching detected face image. Further, the destination of the alert is the operation terminal 80 of one or a plurality of staff members S. Because the location of the user U is determined in the alert, the staff member S receiving the alert on the operation terminal 80 is able to easily search for the user U who missed the deadline time for the particular procedure.

Further, the destination of an alert can be the operation terminal 80 of the staff member S closest to the location of the user U out of the plurality of staff members S. The operation terminal 80 carried by the staff member 80 transmits position information on the operation terminal 80 based on a position sensor that uses a Global Navigation Satellite System (GNSS), a magnetic sensor that detects geomagnetism, or the like, for example, to the management server 10. The GNSS is not particularly limited and may be, for example, a Global Positioning System (GPS), a Global Navigation Satellite System (GLONASS), a Galileo compass, or the like. The CPU 102 of the management server 10 can identify the operation terminal 80 of the staff member S closest to the location of the user U based on the position information transmitted from the operation terminal 80.

On the other hand, as a result of the comparison, if no detected face image matching a registered face image is found (step S808, NO), the CPU 102 generates an alert indicating that the deadline time has expired but the location of the user U is not determined and transmits the alert via the network NW (step S812).

As with the present example embodiment, the use of a video captured by the plurality of surveillance cameras 90 enables the management server 10 to generate and transmit an alert that determines the location of the user U who missed the deadline time for a particular procedure.

Other Example Embodiments

Figure 27:
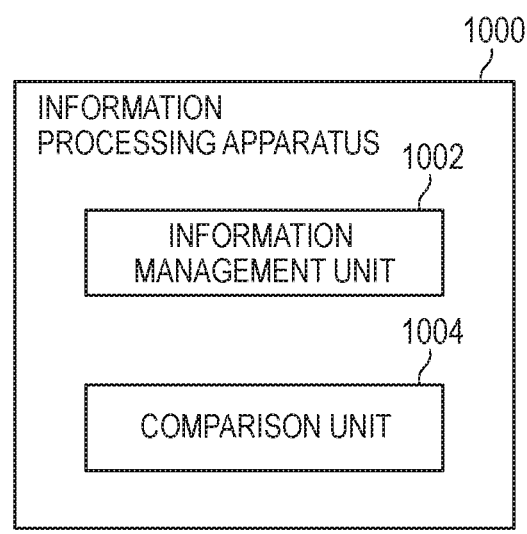
FIG. 27 is a block diagram illustrating a configuration of an information processing apparatus according to another example embodiment of the present invention.
Figure 28:
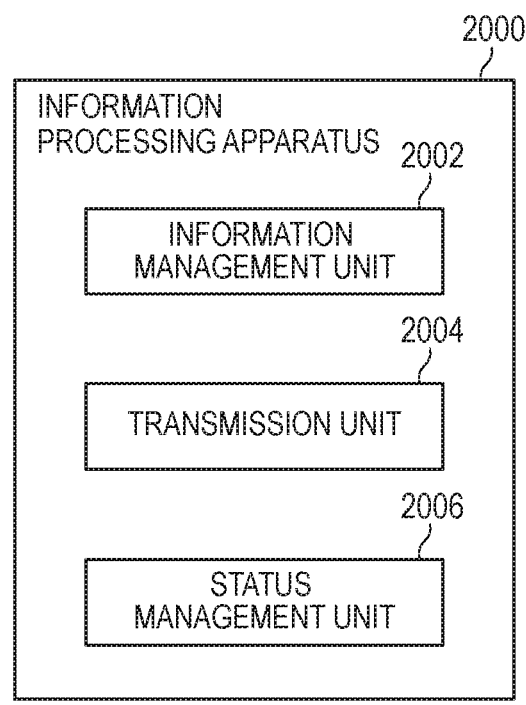
FIG. 28 is a block diagram illustrating a configuration of an information processing apparatus according to yet another example embodiment of the present invention.

According to another example embodiment, the information processing apparatus described in the above example embodiments can be configured as illustrated in FIG. 27 and FIG. 28. FIG. 27 is a block diagram illustrating the configuration of an information processing apparatus according to another example embodiment. FIG. 28 is a block diagram illustrating the configuration of an information processing apparatus according to yet another example embodiment.

As illustrated in FIG. 27, an information processing apparatus 1000 according to another example embodiment has an information management unit 1002 that registers boarding information on users regarding boarding and biometrics information on the users acquired by a check-in procedure of the users in association with each other. Further, the information processing apparatus 1000 has a comparison unit 1004 that compares target biometrics information, which is biometrics information acquired in a procedure up to the boarding for one of the users, with registered biometrics information, which is biometrics information registered by the information management unit 1002.

The comparison unit 1004 selects registered biometrics information to be compared with the target biometrics information based on the status regarding the procedure up to the boarding for the users corresponding to the registered biometrics information.

According to the above another example embodiment, since registered biometrics information to be compared with target biometrics information is selected based on the status of the users corresponding to the registered biometrics information, it is possible to reduce the number of multiple pieces of registered biometrics information, which are populations to be compared with target biometrics information. Therefore, according to such another example embodiment, it is possible to improve the accuracy in comparison of biometrics information.

Further, as illustrated in FIG. 28, an information processing apparatus 2000 according to yet another example embodiment has an information management unit 2002 that registers boarding information and biometrics information on the user regarding boarding acquired by a check-in procedure of the user. Further, the information processing apparatus 2000 has a transmission unit 2004 that transmits, to an apparatus, comparison information obtained by comparing biometrics information received from the apparatus that performs a procedure of the users up to the boarding with biometrics information in which the status regarding the procedure is an unfinished state. Furthermore, the information processing apparatus 2000 has a status management unit that updates the status regarding the procedure in response to receiving status information from the apparatus indicating that the procedure is completed.

According to the above yet another example embodiment, since biometrics information received from an apparatus that performs a procedure of the users up to boarding is compared with biometrics information in which the status regarding the procedure is an unfinished state, it is possible to reduce the number of multiple pieces of registered biometrics information, which are populations to be compared with target biometrics information. Therefore, according to such another example embodiment, it is possible to improve the accuracy in comparison of biometrics information.

Modified Example Embodiments

The present invention can be changed in various manners without being limited to the example embodiments described above.

For example, while the case of managing the status of each procedure of a baggage deposit procedure, a security inspection procedure, an immigration procedure, presence or passage in front of the signage terminal 60, and boarding on an airplane after a check-in procedure has been described in the above example embodiments, the invention is not limited thereto. For example, when the user U boards an airplane of a domestic flight, management of the status regarding the immigration procedure is unnecessary. Further, the signage terminals 60 may be installed at a plurality of places within the airport A, and the status regarding presence or passage in front of each of the plurality of signage terminals 60 can be managed. In addition to the status regarding the procedures described above as examples, various status can be managed.

That is, while the case where the automatic baggage deposit machine 30, the security inspection apparatus 40, the automated gate apparatus 50, the signage terminal 60, and the boarding gate apparatus 70 are installed as the apparatus following the check-in terminal 20 has been described as an example in the above example embodiment, the invention is not limited thereto. It is not necessary that all of the automatic baggage deposit machine 30, the security inspection apparatus 40, the automated gate apparatus 50, the signage terminal 60, and the boarding gate apparatus 70 be installed, and at least some of these apparatuses may be installed. For example, only the signage terminal 60 may be installed as the apparatus subsequent to the check-in terminal 20.

Further, while the case where identity verification is performed by comparison of a target face image in each procedure of a baggage deposit procedure, a security inspection procedure, an immigration procedure, presence or passage in front of the signage terminal 60, and boarding on an airplane has been described as an example in the above example embodiment, the invention is not limited thereto. For example, identity verification using a code symbol such as a barcode, a QR code, or the like may be performed. In such a case, for example, when the user U performs a check-in procedure on the check-in terminal 20, the check-in terminal 20 issues, to the user U, a ticket such as a boarding pass in which a code symbol including information that identifies the user U is printed. The user U is able to perform identity verification by causing a code reader to read the code symbol in each procedure.

Further, while the case where the biometrics information acquisition devices 214, 312, 412, 512, 610, and 712 capture and acquire a face image as biometrics information on the user U has been described as an example in the above example embodiment, the invention is not limited thereto. The biometrics information acquisition device 214 of the check-in terminal 20 may acquire a fingerprint image, an iris image, a finger vein image, a palm image, a palm vein image, or the like other than a face image as biometrics information registered as registered biometrics information in the user information DB 106a or the like. Further, other biometrics information acquisition devices 312, 412, 512, 610, and 712 may acquire a fingerprint image, an iris image, a finger vein image, a palm image, a palm vein image, or the like other than a face image as target biometrics information in accordance with registered biometrics information.

Further, the management server 10 according to the example embodiments described above can be configured as a system formed of one or a plurality of apparatuses. Further, the check-in terminal 20 according to the example embodiments described above can be configured as a system formed of one or a plurality of apparatuses. Further, the automatic baggage deposit machine 30 according to the example embodiments described above can be configured as a system formed of one or a plurality of apparatuses. Further, the security inspection apparatus 40 according to the example embodiments described above can be configured as a system formed of one or a plurality of apparatuses. Further, the automated gate apparatus 50 according to the example embodiments described above can be configured as a system formed of one or a plurality of apparatuses. Further, the signage terminal 60 according to the example embodiments described above can be configured as a system formed of one or a plurality of apparatuses. Further, the boarding gate apparatus 70 according to the example embodiments described above can be configured as a system formed of one or a plurality of apparatuses.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on (operating system) OS to perform a process in cooperation with another software or a function of an add-in board without being limited to an example that performs a process by an individual program stored in the storage medium.

An example advantage according to the invention is that it is possible to improve accuracy in comparison of biometrics information.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

An information processing apparatus comprising:

an information management unit that registers boarding information on users regarding boarding and biometrics information on the users acquired by a check-in procedure of the users in association with each other; and a comparison unit that compares target biometrics information, which is biometrics information acquired in at least one procedure up to the boarding for one of the users, with registered biometrics information, which is the biometrics information registered by the information management unit, wherein the comparison unit selects the registered biometrics information to be compared with the target biometrics information based on status regarding the procedure up to the boarding of the user corresponding to the registered biometrics information.

(Supplementary Note 2)

The information processing apparatus according to supplementary note 1, wherein the comparison unit compares the target biometrics information with the registered biometrics information of the user in which the status regarding the procedure is an unfinished state.

(Supplementary Note 3)

The information processing apparatus according to supplementary note 1 or 2 further comprising a status management unit that updates the status corresponding to the procedure based on status information that is received from an external apparatus and indicates that the procedure is completed.

(Supplementary Note 4)

The information processing apparatus according to supplementary note 3, wherein, for a plurality of procedure of the users up to the boarding, in response to receiving status information indicating that a certain procedure is completed in order of the procedures, the status management unit updates the status corresponding to the certain procedure.

(Supplementary Note 5)

The information processing apparatus according to any one of supplementary notes 1 to 4, wherein the procedure includes one procedure and another procedure subsequent to the one procedure, and wherein the comparison unit compares the target biometrics information acquired in the another procedure with the registered biometrics information of the users in which the status regarding the one procedure is a completed state and the status regarding the another procedure is an unfinished state.

(Supplementary Note 6)

The information processing apparatus according to any one of supplementary notes 1 to 5, wherein the information management unit registers the registered biometrics information to a plurality of databases in accordance with the status of the user corresponding to the registered biometrics information, and wherein the comparison unit compares the target biometrics information with the registered biometrics information registered in a database selected from the plurality of databases.

(Supplementary Note 7)

The information processing apparatus according to supplementary note 6, wherein the procedure includes one procedure and another procedure subsequent to the one procedure, and wherein when the status regarding the one procedure becomes a completed state, the information management unit moves and registers the registered biometrics information of the user of interest from one of the databases in accordance with the one procedure to another one of the databases in accordance with the another procedure.

(Supplementary Note 8)

The information processing apparatus according to any one of supplementary notes 1 to 5, wherein the comparison unit compares the target biometrics information with the registered biometrics information extracted from a plurality of pieces of the registered biometrics information based on the states of the users.

(Supplementary Note 9)

The information processing apparatus according to supplementary note 8, wherein the procedure includes one procedure and another procedure subsequent to the one procedure, and wherein when the status regarding the one procedure becomes a completed state, the comparison unit extracts the registered biometrics information from a plurality of pieces of the registered biometrics information based on the status regarding the another procedure.

(Supplementary Note 10)

The information processing apparatus according to any one of supplementary notes 1 to 9, wherein the comparison unit changes the number of pieces of the registered biometrics information selected from the status of the users corresponding to the registered biometrics information in accordance with the number of the users who have performed the check-in procedure.

(Supplementary Note 11)

The information processing apparatus according to supplementary note 10, wherein when the number of the users who have performed the check-in procedure is larger, the comparison unit reduces the number of pieces of the registered biometrics information selected based on the status of the users corresponding to the registered biometrics information.

(Supplementary Note 12)

The information processing apparatus according to supplementary note 3 or 4, wherein the status management unit manages the status based on a result of a comparison between the target biometrics information and the registered biometrics information.

(Supplementary Note 13)

The information processing apparatus according to supplementary note 12, wherein the status management unit updates the status when there is a matching in the comparison.

(Supplementary Note 14)

The information processing apparatus according to any one of supplementary notes 1 to 13, wherein the procedure is at least any one of a baggage deposit procedure, a security inspection procedure, an immigration procedure, and presence or passage in front of a signage terminal.

(Supplementary Note 15)

An information processing apparatus comprising:

an information management unit that registers boarding information regarding boarding and biometrics information on users acquired by a check-in procedure of the users;

a transmission unit that transmits comparison information obtained by comparing biometrics information received from an apparatus that performs a procedure of the user up to the boarding with biometrics information in which status regarding the procedure is an unfinished state to the apparatus; and a status management unit that, in response to receiving status information indicating a certain procedure is completed from the apparatus, updates the status regarding the certain procedure.

(Supplementary Note 16)

An information processing method comprising:

registering boarding information on users regarding boarding and biometrics information on the users acquired by a check-in procedure of the users in association with each other;

comparing target biometrics information, which is biometrics information acquired in a procedure up to the boarding for one of the users, with the registered biometrics information; and selecting the registered biometrics information to be compared with the target biometrics information based on status regarding the procedure up to the boarding of the user corresponding to the registered biometrics information.

(Supplementary Note 17)

A non-transitory storage medium storing a program that causes a computer to perform:

registering boarding information on users regarding boarding and biometrics information on the users acquired by a check-in procedure of the users in association with each other;

comparing target biometrics information, which is biometrics information acquired in a procedure up to the boarding for one of the users, with the registered biometrics information; and selecting the registered biometrics information to be compared with the target biometrics information based on status regarding the procedure up to the boarding of the user corresponding to the registered biometrics information.

What is claimed is:

1. An information processing apparatus comprising:
a memory configured to store instructions; and
a processor configured to execute the instructions to:
receive facial images of a plurality of users from a plurality of stages between a check-in stage and a boarding stage, wherein the plurality of stages include a first stage and a second stage subsequent to the first stage, and each of the plurality of stages corresponds to a procedure in a boarding process between the check-in stage and the boarding stage;
compare a first facial image of a first user, among the facial images of the plurality of users, at the first stage with a plurality of registered facial images;
update, based on the comparison, status information of the first user to a first status, the first status indicating that the first user was identified at the first stage;
register the first facial image of the first user to a first list, among a plurality of lists, based on the first status indicating that the first user was identified at the first stage, each of the plurality of lists corresponding to one of the plurality of stages;
move the registered first facial image of the first user from the first list associated with the first stage to a second list associated with the second stage based on the first status indicating that the first stage is completed; and
display list information indicating the first facial image of the first user moved from the first list to the second list according to completion of the first stage.

2. The information processing apparatus according to claim 1, wherein the processor is further configured to execute the instructions to:
identify one or more users, among the plurality of users, having the first status regarding the first stage as completed and a second status regarding the second stage as unfinished; and
display a list of users, including the first user, having the first stage completed and the second stage unfinished.

3. The information processing apparatus according to claim 2, wherein the at least one user is identified based on a difference between the first status for the first stage and the second status for the second stage.

4. The information processing apparatus according to claim 1, wherein the processor is further configured to execute the instructions to:
display a graphical user interface comprising a list including a flight number and status of each of the plurality of users.

5. The information processing apparatus according to claim 4, wherein the processor is further configured to execute the instructions to:
update the status information corresponding to a certain stage of the plurality of stages before boarding in response to receiving status information indicating that the certain stage is completed in order of the plurality of stages.

6. The information processing apparatus according to claim 1, wherein the processor is further configured to execute the instructions to:
update the status information of the first user regarding the plurality of stages based on information that is received from an external apparatus that indicates that a respective stage is completed.

7. The information processing apparatus according to claim 1, wherein the processor is further configured to execute the instructions to:
compare one or more of the received facial images with one or more facial images registered one of the plurality of lists.

8. The information processing apparatus according to claim 1, wherein the processor is further configured to execute the instructions to:
compare the first facial image of the first user with a registered facial image, wherein the registered facial image is extracted from the plurality of the registered facial images based on a state of the at least one user regarding the plurality of stages.

9. The information processing apparatus according to claim 1, wherein the processor is further configured to execute the instructions to:
extract the registered facial image from the plurality of the registered facial images when the status information indicates that the first stage is completed.

10. The information processing apparatus according to claim 1, wherein the processor is further configured to execute the instructions to:
manage the status information of the first user regarding the plurality of stages based on a result of the comparison between the first facial image and the registered facial image.

11. The information processing apparatus according to claim 10, wherein the processor is further configured to execute the instructions to:
update the status information when there is a matching in the comparison.

12. The information processing apparatus according to claim 1, wherein the at least one stage is at least one of a baggage deposit procedure, a security inspection procedure, an immigration procedure, or presence or passage in front of a signage terminal.

13. The information processing apparatus according to claim 1, wherein the plurality of stages are each associated with a respective list of the plurality of lists, and wherein facial image stored in each of the plurality of lists is different.

14. An information processing method comprising:
receiving facial images of a plurality of users from a plurality of stages between a check-in stage and a boarding stage, wherein the plurality of stages include a first stage and a second stage subsequent to the first stage, and each of the plurality of stages corresponds to a procedure in a boarding process between the check-in stage and the boarding stage;
comparing a first facial image of a first user, among the facial images of the plurality of users, at the first stage with a plurality of registered facial images;
updating, based on the comparison, status information of the first user to a first status, the first status indicating that the first user was identified at the first stage;
registering the first facial image of the first user to a first list, among a plurality of lists, based on the first status indicating that the first user was identified at the first stage, each of the plurality of lists corresponding to one of the plurality of stages;

moving the registered first facial image of the first user from the first list associated with the first stage to a second list associated with the second stage based on the first status indicating that the first stage is completed; and displaying list information indicating the first facial image of the first user moved from the first list to the second list according to completion of the first stage.

15. A non-transitory storage medium storing a program that causes a computer to perform operations of:

receiving facial images of a plurality of users from a plurality of stages between a check-in stage and a boarding stage, wherein the plurality of stages include a first stage and a second stage subsequent to the first stage, and each of the plurality of stages corresponds to a procedure in a boarding process between the check-in stage and the boarding stage;

comparing a first facial image of a first user, among the facial images of the plurality of users, at the first stage with a plurality of registered facial images;

updating, based on the comparison, status information of the first user to a first status, the first status indicating that the first user was identified at the first stage;

registering the first facial image of the first user to a first list, among a plurality of lists, based on the first status indicating that the first user was identified at the first stage, each of the plurality of lists corresponding to one of the plurality of stages;

moving the registered first facial image of the first user from the first list associated with the first stage to a second list associated with the second stage based on the first status indicating that the first stage is completed; and displaying list information indicating the first facial image of the first user moved from the first list to the second list according to completion of the first stage.

* * * * *